US012738263B2

(12) United States Patent
Yin et al.

(10) Patent No.: US 12,738,263 B2
(45) Date of Patent: Sep. 15, 2026

(54) METHOD AND SYSTEM FOR CONSTRUCTING SPEECH RECOGNITION MODEL AND SPEECH PROCESSING

(71) Applicant: Huawei Technologies Co., Ltd., Shenzhen (CN)

(72) Inventors: Shi Yin, Shenzhen (CN); Tao Huang, Beijing (CN); Yibin Zhai, Shenzhen (CN); Zhaohui Wu, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 324 days.

(21) Appl. No.: 18/557,213

(22) PCT Filed: Mar. 25, 2022

(86) PCT No.: PCT/CN2022/083190
§ 371 (c)(1),
(2) Date: Oct. 25, 2023

(87) PCT Pub. No.: WO2022/227973
PCT Pub. Date: Nov. 3, 2022

(65) Prior Publication Data

US 2024/0242709 A1 Jul. 18, 2024

(30) Foreign Application Priority Data

Apr. 27, 2021 (WO) ................ PCT/CN2021/090353

(51) Int. Cl.
*G10L 15/06* (2013.01)
*G10L 15/08* (2006.01)
(Continued)

(52) U.S. Cl.
CPC ............ *G10L 15/063* (2013.01); *G10L 15/08* (2013.01); *G10L 15/083* (2013.01);
(Continued)

(58) Field of Classification Search
None
See application file for complete search history.

(56) References Cited

U.S. PATENT DOCUMENTS 8,370,146 B1 * 2/2013 Schalkwyk ......... G10L 15/1815 704/235
9,256,596 B2 * 2/2016 Nissan .................... G06F 40/42
(Continued)

FOREIGN PATENT DOCUMENTS

CN 103325370 A 9/2013
CN 105764185 A 7/2016
(Continued)

OTHER PUBLICATIONS

EPO EP22794446 Search Opinion dated Jun. 26, 2024. (Year: 2024).*

(Continued)

*Primary Examiner* — Richard Z Zhu
(74) *Attorney, Agent, or Firm* — Conley Rose, P.C.

(57) ABSTRACT

A method for constructing a speech recognition model includes obtaining a target keyword; determining a synonym group semantically associated with the target keyword; training a language model based on the target keyword and the synonym group; to obtain a target language model; generating a first decoding graph based on the target language model, where the first decoding graph indicates a plurality of decoding paths that satisfy a syntax constraint rule that is based on the target keyword and the synonym group; and determining the speech recognition model based on the first decoding graph.

20 Claims, 28 Drawing Sheets

(51) Int. Cl.
*G10L 15/18* (2013.01)
*G10L 15/22* (2006.01)
*G10L 15/065* (2013.01)

(52) U.S. Cl.
CPC ...... *G10L 15/1815* (2013.01); *G10L 15/1822* (2013.01); *G10L 15/22* (2013.01); *G10L 15/065* (2013.01); *G10L 2015/081* (2013.01); *G10L 2015/085* (2013.01); *G10L 2015/225* (2013.01)

(56) References Cited

U.S. PATENT DOCUMENTS

| | | | | |
|---|---|---|---|---|
| 10,515,637 | B1 * | 12/2019 | Devries | G10L 15/1822 |
| 10,748,528 | B2 * | 8/2020 | Itsui | G06F 40/247 |
| 10,943,583 | B1 * | 3/2021 | Gandhe | G10L 15/183 |
| 11,164,561 | B2 * | 11/2021 | Wang | G10L 15/19 |
| 11,314,940 | B2 * | 4/2022 | Ray | G06F 9/453 |
| 11,545,144 | B2 * | 1/2023 | Yadav | G10L 15/1815 |
| 11,798,542 | B1 * | 10/2023 | Ryabov | G10L 15/197 |
| 2014/0163975 | A1 * | 6/2014 | Lee | G10L 15/01 704/231 |
| 2020/0035230 | A1 * | 1/2020 | Yadav | G06F 40/247 |
| 2020/0118545 | A1 * | 4/2020 | Wang | G10L 15/19 |
| 2021/0225366 | A1 * | 7/2021 | Chen | G10L 15/02 |
| 2023/0076658 | A1 * | 3/2023 | Li | G10L 15/197 |

FOREIGN PATENT DOCUMENTS

| | | | | |
|---|---|---|---|---|
| CN | 107066497 A | | 8/2017 | |
| CN | 108140019 A | | 6/2018 | |
| CN | 111933129 A | | 11/2020 | |
| EP | 4310837 A1 | * | 1/2024 | G10L 15/22 |

OTHER PUBLICATIONS

SIPO PCTCN2021090353 Written opinion dated Oct. 31, 2022. (Year: 2022).*

Written Opinion for Chinese application CN202280004497 dated Apr. 1, 2026. (Year: 2026).*

* cited by examiner

1100

0
1
2
3
4
5
6
7
8
9
10
11
12
13
0
<s>
Increase
Raise
Turn up
Lift
Turn
up
sound
volume
volume a bit
</s>

METHOD AND SYSTEM FOR CONSTRUCTING SPEECH RECOGNITION MODEL AND SPEECH PROCESSING

CROSS-REFERENCE TO RELATED APPLICATIONS

This is a U.S. National Stage of International Patent Application No. PCT/CN2022/083190 filed on Mar. 25, 2022, which claims priority to International Patent Application No. PCT/CN2021/090353 filed on Apr. 27, 2021. Both of the aforementioned applications are hereby incorporated by reference in their entireties.

TECHNICAL FIELD

Embodiments of this disclosure mainly relate to the computer field, and more specifically, to a method and system for constructing a speech recognition model and speech processing.

BACKGROUND

With development of computer technologies, a speech recognition technology has been widely applied to all aspects of people's life. In a process of speech recognition, semantic understanding is an important technology to implement speech interaction. Especially for a lite device (for example, a smart home device) with a limited computing capability, semantic understanding is a key to implementing speech control due to the limited computing capability.

However, currently, a lite device that supports speech recognition usually cannot support customized semantics, and cannot process speech input with same or similar semantics, which greatly affects speech interaction experience of a user.

SUMMARY

Embodiments of this disclosure provide a solution for constructing a speech recognition model and speech processing.

According to a first aspect of this disclosure, a method for constructing a speech recognition model is provided. The method includes: obtaining a target keyword; obtaining a synonym group semantically associated with the target keyword; training a language model based on the target keyword and the synonym group, to obtain a target language model; generating a first decoding graph based on the target language model, where the first decoding graph indicates a plurality of decoding paths that satisfy a syntax constraint rule determined based on the target keyword and the synonym group; and determining the speech recognition model based on the first decoding graph.

In some embodiments of the first aspect, for example, the method may be performed by a first computing device with a strong computing capability. For example, the first computing device may include a cloud-side or embedded heavy device, and the first computing device may have the strong computing capability, to execute the construction of the speech recognition model. For example, the first computing device may further include a user terminal device. In some embodiments of the first aspect, for example, one or more steps in the method may alternatively collaboratively be performed by a user terminal and a cloud.

In some embodiments of the first aspect, for example, the obtained speech recognition model may be deployed on a second computing device. For example, the second computing device may include an embedded lite device with a weak computing capability, to perform speech processing by using the deployed speech recognition model. Examples of the second computing device may include, but are not limited to, a smart home device (for example, an air conditioner, a refrigerator, a washing machine, a television, or a speaker), an intelligent wearable device (for example, a band, a watch, or glasses), a vehicle-mounted device, or the like.

Based on this manner, in embodiments of this disclosure, a speech recognition model with a keyword generalization recognition capability can be constructed, so that the second computing device with, for example, small computing power can have the keyword generalization recognition capability, thereby improving interaction experience of a user.

In some embodiments of the first aspect, the target keyword includes a keyword of a speech input from an audio collector, and the audio collector is located at a user terminal. In some other embodiments of the first aspect, the target keyword includes a keyword of a text input from a text collector, and the text collector is located at a user terminal.

For example, if the first computing device is a user terminal, for example, the user may directly provide a speech input or a text input for the user terminal, so that the user terminal can extract a keyword from the speech input or the text input, to construct the speech recognition model.

For example, if the first computing device is a computing device different from the user terminal, for example, a cloud device or an edge computing device, the user may input speech or text, for example, through an interface provided by the user terminal. The speech input or text input may be sent to the first computing device, so that the first computing device can obtain the keyword, to construct the speech recognition model.

Based on this manner, the user can customize a keyword that can be supported by the speech recognition model, so that a degree of personalization of the speech recognition model can be improved.

In some embodiments of the first aspect, the determining a synonym group semantically associated with the target keyword includes: determining semantics of the target keyword; and determining the synonym group at least based on the semantics of the target keyword, where a difference between semantics of each synonym in the synonym group and the semantics of the target keyword is less than a difference threshold.

Based on this manner, the first computing device can automatically extend an associated synonym group based on the semantics without depending on an input of a user, thereby reducing interaction overheads of the user.

In some embodiments of the first aspect, the determining the synonym group at least based on the semantics of the target keyword includes: determining the synonym group based on the semantics of the target keyword and a length of the target keyword, where a difference between a length of each synonym in the synonym group and the length of the target keyword is less than a length threshold. For example, a length of a keyword may indicate a quantity of characters or a quantity of words included in the keyword. Based on this manner, the synonyms in the synonym group can be made to have a similar length, and complexity of performing decoding search by using the decoding graph can be reduced.

In some embodiments of the first aspect, the determining the synonym group at least based on the semantics of the target keyword includes: obtaining a plurality of candidate synonyms based on the semantics of the target keyword; providing the plurality of candidate synonyms for a user; and determining the synonym group from the plurality of candidate synonyms based on a user input received from the user, where the user input indicates that at least one candidate synonym in the plurality of candidate synonyms is excluded or confirmed.

Based on this manner, the synonym group used for training the speech recognition model may be further adjusted based on a user feedback, so that the obtained speech recognition model can better conform to a usage habit of the user.

In some embodiments of the first aspect, the target keyword at least includes a first keyword and a second keyword, and the determining the speech recognition model based on the first decoding graph includes: obtaining a first group of decoding paths and a second group of decoding paths from the first decoding graph, where the first group of decoding paths includes decoding paths corresponding to the first keyword and a first synonym group semantically associated with the first keyword, and the second group of decoding paths includes decoding paths corresponding to the second keyword and a second synonym group semantically associated with the second keyword; generating a first subgraph based on the first group of decoding paths; generating a second subgraph based on the second group of decoding paths; and determining the speech recognition model at least based on the first subgraph and the second subgraph. Based on this manner, the generated decoding graph has low complexity and can support faster decoding search, thereby reducing computing overheads and storage overheads.

In some embodiments of the first aspect, the first subgraph indicates a first decoding path and a second decoding path, the first decoding path is a decoding path corresponding to the first keyword, the second decoding path is a decoding path corresponding to a synonym in the first synonym group, and the first decoding path and each second decoding path have a same weight in the first subgraph. Based on this manner, faster decoding search for the extended synonym can be implemented, thereby reducing computing overheads and storage overheads.

In some embodiments of the first aspect, the obtaining a target keyword includes: obtaining a first keyword group based on a pre-stored historical keyword and a received keyword; and in response to determining that a quantity of keywords in the first keyword group exceeds a predetermined threshold, obtaining the target keyword from the first keyword group based on the predetermined threshold. For example, the first computing device may retain only a predetermined threshold quantity of keywords in the first keyword group as the target keyword.

Based on this manner, it can be avoided that a quantity of keywords used for training the language model is too large, thereby ensuring that the decoding graph is lightweight, and can be applied to a device with few computing resources.

In some embodiments of the first aspect, the obtaining the target keyword from the first keyword group based on the predetermined threshold includes: obtaining the target keyword from the first keyword group based on an attribute of a keyword in the target keyword, where a quantity of target keywords is the predetermined threshold. For example, one or more earliest created historical keywords may be deleted from the first keyword group, to obtain a predetermined threshold quantity of keywords.

In some embodiments of the first aspect, the obtaining the target keyword from the first keyword group based on the predetermined threshold includes: obtaining the target keyword from the first keyword group based on a user indication, where a quantity of target keywords is the predetermined threshold. For example, keywords in the first keyword group to be retained as the target keyword may be selected based on a user input.

In some embodiments of the first aspect, the first computing device may further indicate to provide the speech recognition model for a target computing device (for example, the second computing device) for deployment of the speech recognition model on the target computing device. Based on this manner, automatic deployment of the speech recognition model can be supported.

According to a second aspect of this disclosure, a method for speech processing is provided. The method includes: receiving a speech input, and determining, by using a speech recognition model, text representation associated with the speech input, where the speech recognition model is obtained based on a process of: obtaining a target keyword; obtaining a synonym group semantically associated with the target keyword; training a language model based on the target keyword and the synonym group, to obtain a target language model; generating a first decoding graph based on the target language model, where the first decoding graph indicates a plurality of decoding paths that satisfy a syntax constraint rule determined based on the target keyword and the synonym group; and determining the speech recognition model based on the first decoding graph.

In some embodiments of the second aspect, the speech recognition model may be obtained by a first computing device. For example, the first computing device may include a cloud-side or embedded heavy device, and the first computing device may have a strong computing capability, to execute construction of the speech recognition model. For example, the first computing device may further include a user terminal device.

In some embodiments of the second aspect, the step of obtaining the speech recognition model may alternatively collaboratively be performed by a user terminal and a cloud.

In some embodiments of the second aspect, for example, the method for speech processing may be performed by a second computing device. For example, the second computing device may include an embedded lite device with a weak computing capability, to perform speech processing by using the deployed speech recognition model. Examples of the second computing device may include, but are not limited to, a smart home device (for example, an air conditioner, a refrigerator, a washing machine, a television, or a speaker), an intelligent wearable device (for example, a band, a watch, or glasses), a vehicle-mounted device, or the like.

Based on this manner, in embodiments of this disclosure, for example, the second computing device with small computing power can have a keyword generalization recognition capability, thereby improving speech interaction experience of a user.

In some embodiments of the second aspect, the target keyword includes a keyword of a speech input from an audio collector, and the audio collector is located at a user terminal. In some other embodiments of the second aspect, the target keyword includes a keyword of a text input from a text collector, and the text collector is located at a user terminal.

For example, if the first computing device is a user terminal, for example, the user may directly provide a speech input or a text input for the user terminal, so that the user terminal can extract a keyword from the speech input or the text input, to construct the speech recognition model.

For example, if the first computing device is a computing device different from the user terminal, for example, a cloud device or an edge computing device, the user may input speech or text, for example, through an interface provided by the user terminal. The speech input or text input may be sent to the first computing device, so that the first computing device can obtain the keyword, to construct the speech recognition model.

Based on this manner, the user can customize a keyword that can be supported by the speech recognition model, so that a degree of personalization of the speech recognition model can be improved.

In some embodiments of the second aspect, the determining a synonym group semantically associated with the target keyword includes: determining semantics of the target keyword; and determining the synonym group at least based on the semantics of the target keyword, where a difference between semantics of each synonym in the synonym group and the semantics of the target keyword is less than a difference threshold.

Based on this manner, the first computing device can automatically extend an associated synonym group based on the semantics without depending on an input of a user, thereby reducing interaction overheads of the user.

In some embodiments of the second aspect, the determining the synonym group at least based on the semantics of the target keyword includes: determining the synonym group based on the semantics of the target keyword and a length of the target keyword, where a difference between a length of each synonym in the synonym group and the length of the target keyword is less than a length threshold. For example, a length of a keyword may indicate a quantity of characters or a quantity of words included in the keyword. Based on this manner, the synonyms in the synonym group can be made to have a similar length, and complexity of performing decoding search by using the decoding graph can be reduced.

In some embodiments of the second aspect, the determining the synonym group at least based on the semantics of the target keyword includes: obtaining a plurality of candidate synonyms based on the semantics of the target keyword; providing the plurality of candidate synonyms for a user; and determining the synonym group from the plurality of candidate synonyms based on a user input received from the user, where the user input indicates that at least one candidate synonym in the plurality of candidate synonyms is excluded or confirmed.

Based on this manner, the synonym group used for training the speech recognition model may be further adjusted based on a user feedback, so that the obtained speech recognition model can better conform to a usage habit of the user.

In some embodiments of the second aspect, the target keyword at least includes a first keyword and a second keyword, and the determining the speech recognition model based on the first decoding graph includes: obtaining a first group of decoding paths and a second group of decoding paths from the first decoding graph, where the first group of decoding paths includes decoding paths corresponding to the first keyword and a first synonym group semantically associated with the first keyword, and the second group of decoding paths includes decoding paths corresponding to the second keyword and a second synonym group semantically associated with the second keyword; generating a first subgraph based on the first group of decoding paths; generating a second subgraph based on the second group of decoding paths; and determining the speech recognition model at least based on the first subgraph and the second subgraph. Based on this manner, the generated decoding graph has low complexity and can support faster decoding search, thereby reducing computing overheads and storage overheads.

In some embodiments of the second aspect, the first subgraph indicates a first decoding path and a second decoding path, the first decoding path is a decoding path corresponding to the first keyword, the second decoding path is a decoding path corresponding to a synonym in the first synonym group, and the first decoding path and each second decoding path have a same weight in the first subgraph. Based on this manner, faster decoding search for the extended synonym can be implemented, thereby reducing computing overheads and storage overheads.

In some embodiments of the second aspect, the obtaining a target keyword includes: obtaining a first keyword group based on a pre-stored historical keyword and a received keyword; and in response to determining that a quantity of keywords in the first keyword group exceeds a predetermined threshold, obtaining the target keyword from the first keyword group based on the predetermined threshold. For example, only a predetermined threshold quantity of keywords in the first keyword group may be retained as the target keyword.

Based on this manner, it can be avoided that a quantity of keywords used for training the language model is too large, thereby ensuring that the decoding graph is lightweight, and can be applied to a device with few computing resources.

In some embodiments of the second aspect, the obtaining the target keyword from the first keyword group based on the predetermined threshold includes; obtaining the target keyword from the first keyword group based on an attribute of a keyword in the target keyword, where a quantity of target keywords is the predetermined threshold. For example, one or more earliest created historical keywords may be deleted from the first keyword group, to obtain a predetermined threshold quantity of keywords.

In some embodiments of the second aspect, the obtaining the target keyword from the first keyword group based on the predetermined threshold includes: obtaining the target keyword from the first keyword group based on a user indication, where a quantity of target keywords is the predetermined threshold. For example, keywords in the first keyword group to be retained as the target keyword may be selected based on a user input.

In some embodiments of the second aspect, the second computing device may further perform an action corresponding to the text representation. Alternatively, the second computing device may further generate a corresponding control command based on the text representation, and send the control command to a third computing device, so that the third computing device performs a corresponding action.

In some embodiments of the second aspect, the text representation corresponds to the target keyword or a synonym in the synonym group.

According to a third aspect of this disclosure, a system for constructing a speech model is provided. The system includes: a keyword obtaining unit, configured to obtain a target keyword; a synonym obtaining unit, configured to obtain a synonym group semantically associated with the target keyword; a model training unit, configured to train a language model based on the target keyword and the synonym group, to obtain a target language model; a decoding graph generation unit, configured to generate a first decoding graph based on the target language model, where the first decoding graph indicates a plurality of decoding paths that satisfy a syntax constraint rule determined based on the target keyword and the synonym group; and a model determining unit, configured to determine the speech recognition model based on the first decoding graph.

In some embodiments of the third aspect, for example, the system for constructing a speech model may include a first computing device with a strong computing capability. For example, the first computing device may include a cloud-side or embedded heavy device, and the first computing device may have the strong computing capability, to execute construction of the speech recognition model. For example, the first computing device may further include a user terminal device. In some embodiments of the third aspect, for example, the method may alternatively collaboratively be performed by a user terminal and a cloud.

In some embodiments of the third aspect, for example, the obtained speech recognition model may be deployed on a second computing device. For example, the second computing device may include an embedded lite device with a weak computing capability, to perform speech processing by using the deployed speech recognition model. Examples of the second computing device may include, but are not limited to, a smart home device (for example, an air conditioner, a refrigerator, a washing machine, a television, or a speaker), an intelligent wearable device (for example, a band, a watch, or glasses), a vehicle-mounted device, or the like.

Based on this manner, in embodiments of this disclosure, a speech recognition model with a keyword generalization recognition capability can be constructed, so that the second computing device with, for example, small computing power can have the keyword generalization recognition capability, thereby improving interaction experience of a user.

In some embodiments of the third aspect, the target keyword includes a keyword of a speech input from an audio collector, and the audio collector is located at a user terminal. In some other embodiments of the third aspect, the target keyword includes a keyword of a text input from a text collector, and the text collector is located at a user terminal.

For example, if the first computing device is a user terminal, for example, the user may directly provide a speech input or a text input for the user terminal, so that the user terminal can extract a keyword from the speech input or the text input, to construct the speech recognition model.

For example, if the first computing device is a computing device different from the user terminal, for example, a cloud device or an edge computing device, the user may input speech or text, for example, through an interface provided by the user terminal. The speech input or text input may be sent to the first computing device, so that the first computing device can obtain the keyword, to construct the speech recognition model.

Based on this manner, the user can customize a keyword that can be supported by the speech recognition model, so that a degree of personalization of the speech recognition model can be improved.

In some embodiments of the third aspect, the synonym obtaining unit is further configured to: determine semantics of the target keyword; and determine the synonym group at least based on the semantics of the target keyword, where a difference between semantics of each synonym in the synonym group and the semantics of the target keyword is less than a difference threshold.

Based on this manner, the first computing device can automatically extend an associated synonym group based on the semantics without depending on an input of a user, thereby reducing interaction overheads of the user.

In some embodiments of the third aspect, the synonym obtaining unit is further configured to: determine the synonym group based on the semantics of the target keyword and a length of the target keyword, where a difference between a length of each synonym in the synonym group and the length of the target keyword is less than a length threshold. For example, a length of a keyword may indicate a quantity of characters or a quantity of words included in the keyword. Based on this manner, the synonyms in the synonym group can be made to have a similar length, and complexity of performing decoding search by using the decoding graph can be reduced.

In some embodiments of the third aspect, the synonym obtaining unit is further configured to: obtain a plurality of candidate synonyms based on the semantics of the target keyword; provide the plurality of candidate synonyms for a user; and determine the synonym group from the plurality of candidate synonyms based on a user input received from the user, where the user input indicates that at least one candidate synonym in the plurality of candidate synonyms is excluded or confirmed.

Based on this manner, the synonym group used for training the speech recognition model may be further adjusted based on a user feedback, so that the obtained speech recognition model can better conform to a usage habit of the user.

In some embodiments of the third aspect, the target keyword at least includes a first keyword and a second keyword, and a model combining unit is further configured to: obtain a first group of decoding paths and a second group of decoding paths from the first decoding graph, where the first group of decoding paths includes decoding paths corresponding to the first keyword and a first synonym group semantically associated with the first keyword, and the second group of decoding paths includes decoding paths corresponding to the second keyword and a second synonym group semantically associated with the second keyword; generate a first subgraph based on the first group of decoding paths; generate a second subgraph based on the second group of decoding paths; and determine the speech recognition model at least based on the first subgraph and the second subgraph. Based on this manner, the generated decoding graph has low complexity and can support faster decoding search, thereby reducing computing overheads and storage overheads.

In some embodiments of the third aspect, the first subgraph indicates a first decoding path and a second decoding path, the first decoding path is a decoding path corresponding to the first keyword, the second decoding path is a decoding path corresponding to a synonym in the first synonym group, and the first decoding path and each second decoding path have a same weight in the first subgraph. Based on this manner, faster decoding search for the extended synonym can be implemented, thereby reducing computing overheads and storage overheads.

In some embodiments of the third aspect, the keyword obtaining unit is further configured to: obtain a first keyword group based on a pre-stored historical keyword and a received keyword; and in response to determining that a quantity of keywords in the first keyword group exceeds a predetermined threshold, obtain the target keyword from the first keyword group based on the predetermined threshold.

Based on this manner, it can be avoided that a quantity of keywords used for training the language model is too large, thereby ensuring that the decoding graph is lightweight, and can be applied to a device with few computing resources.

In some embodiments of the third aspect, the keyword obtaining unit is further configured to: obtain the target keyword from the first keyword group based on an attribute of a keyword in the target keyword, where a quantity of target keywords is the predetermined threshold. For example, one or more earliest created historical keywords may be deleted from the first keyword group, to obtain a predetermined threshold quantity of keywords.

In some embodiments of the third aspect, the keyword obtaining unit is further configured to: obtain the target keyword from the first keyword group based on a user indication, where a quantity of target keywords is the predetermined threshold. For example, keywords in the first keyword group to be retained as the target keyword may be selected based on a user input.

In some embodiments of the third aspect, the system for constructing a speech model may further indicate to provide the speech recognition model for a target computing device (for example, the second computing device) for deployment of the speech recognition model on the target computing device. Based on this manner, automatic deployment of the speech recognition model can be supported.

According to a fourth aspect of this disclosure, a system for speech processing is provided. The system includes: a speech input unit, configured to receive a speech input; a speech processing unit, configured to determine, by using a speech recognition model, text representation associated with the speech input, where the speech recognition model is obtained based on a process of obtaining a target keyword; obtaining a synonym group semantically associated with the target keyword; training a language model based on the target keyword and the synonym group, to obtain a target language model; generating a first decoding graph based on the target language model, where the first decoding graph indicates a plurality of decoding paths that satisfy a syntax constraint rule determined based on the target keyword and the synonym group; and determining the speech recognition model based on the first decoding graph.

In some embodiments of the fourth aspect, the speech recognition model may be obtained by a first computing device. For example, the first computing device may include a cloud-side or embedded heavy device, and the first computing device may have a strong computing capability, to execute construction of the speech recognition model. For example, the first computing device may further include a user terminal device.

In some embodiments of the fourth aspect, the step of obtaining the speech recognition model may alternatively collaboratively be performed by a user terminal and a cloud.

In some embodiments of the fourth aspect, for example, the system for speech processing may include a second computing device. For example, the second computing device may include an embedded lite device with a weak computing capability, to perform speech processing by using the deployed speech recognition model. Examples of the second computing device may include, but are not limited to, a smart home device (for example, an air conditioner, a refrigerator, a washing machine, a television, or a speaker), an intelligent wearable device (for example, a band, a watch, or glasses), a vehicle-mounted device, or the like.

Based on this manner, in embodiments of this disclosure, for example, the second computing device with small computing power can have a keyword generalization recognition capability, thereby improving speech interaction experience of a user.

In some embodiments of the fourth aspect, the target keyword includes a keyword of a speech input from an audio collector, and the audio collector is located at a user terminal. In some other embodiments of the fourth aspect, the target keyword includes a keyword of a text input from a text collector, and the text collector is located at a user terminal.

For example, if the first computing device is a user terminal, for example, the user may directly provide a speech input or a text input for the user terminal, so that the user terminal can extract a keyword from the speech input or the text input, to construct the speech recognition model.

For example, if the first computing device is a computing device different from the user terminal, for example, a cloud device or an edge computing device, the user may input speech or text, for example, through an interface provided by the user terminal. The speech input or text input may be sent to the first computing device, so that the first computing device can obtain the keyword, to construct the speech recognition model.

Based on this manner, the user can customize a keyword that can be supported by the speech recognition model, so that a degree of personalization of the speech recognition model can be improved.

In some embodiments of the fourth aspect, the determining a synonym group semantically associated with the target keyword includes: determining semantics of the target keyword; and determining the synonym group at least based on the semantics of the target keyword, where a difference between semantics of each synonym in the synonym group and the semantics of the target keyword is less than a difference threshold.

Based on this manner, the first computing device can automatically extend an associated synonym group based on the semantics without depending on an input of a user, thereby reducing interaction overheads of the user.

In some embodiments of the fourth aspect, the determining the synonym group at least based on the semantics of the target keyword includes: determining the synonym group based on the semantics of the target keyword and a length of the target keyword, where a difference between a length of each synonym in the synonym group and the length of the target keyword is less than a length threshold. For example, a length of a keyword may indicate a quantity of characters or a quantity of words included in the keyword. Based on this manner, the synonyms in the synonym group can be made to have a similar length, and complexity of performing decoding search by using the decoding graph can be reduced.

In some embodiments of the fourth aspect, the determining the synonym group at least based on the semantics of the target keyword includes: obtaining a plurality of candidate synonyms based on the semantics of the target keyword; providing the plurality of candidate synonyms for a user; and determining the synonym group from the plurality of candidate synonyms based on a user input received from the user, where the user input indicates that at least one candidate synonym in the plurality of candidate synonyms is excluded or confirmed.

Based on this manner, the synonym group used for training the speech recognition model may be further adjusted based on a user feedback, so that the obtained speech recognition model can better conform to a usage habit of the user.

In some embodiments of the fourth aspect, the target keyword at least includes a first keyword and a second keyword, and the determining the speech recognition model based on the first decoding graph includes: obtaining a first group of decoding paths and a second group of decoding paths from the first decoding graph, where the first group of decoding paths includes decoding paths corresponding to the first keyword and a first synonym group semantically associated with the first keyword, and the second group of decoding paths includes decoding paths corresponding to the second keyword and a second synonym group semantically associated with the second keyword; generating a first subgraph based on the first group of decoding paths; generating a second subgraph based on the second group of decoding paths; and determining the speech recognition model at least based on the first subgraph and the second subgraph. Based on this manner, the generated decoding graph has low complexity and can support faster decoding search, thereby reducing computing overheads and storage overheads.

In some embodiments of the fourth aspect, the first subgraph indicates a first decoding path and a second decoding path, the first decoding path is a decoding path corresponding to the first keyword, the second decoding path is a decoding path corresponding to a synonym in the first synonym group, and the first decoding path and each second decoding path have a same weight in the first subgraph. Based on this manner, faster decoding search for the extended synonym can be implemented, thereby reducing computing overheads and storage overheads.

In some embodiments of the fourth aspect, the obtaining a target keyword includes: obtaining a first keyword group based on a pre-stored historical keyword and a received keyword; and in response to determining that a quantity of keywords in the first keyword group exceeds a predetermined threshold, obtaining the target keyword from the first keyword group based on the predetermined threshold.

Based on this manner, it can be avoided that a quantity of keywords used for training the language model is too large, thereby ensuring that the decoding graph is lightweight, and can be applied to a device with few computing resources.

In some embodiments of the fourth aspect, the obtaining the target keyword from the first keyword group based on the predetermined threshold includes: obtaining the target keyword from the first keyword group based on an attribute of a keyword in the target keyword, where a quantity of target keywords is the predetermined threshold. For example, one or more earliest created historical keywords may be deleted from the first keyword group, to obtain a predetermined threshold quantity of keywords.

In some embodiments of the fourth aspect, the obtaining the target keyword from the first keyword group based on the predetermined threshold includes: obtaining the target keyword from the first keyword group based on a user indication, where a quantity of target keywords is the predetermined threshold. For example, keywords in the first keyword group to be retained as the target keyword may be selected based on a user input.

In some embodiments of the fourth aspect, the system for speech processing may further perform an action corresponding to the text representation. Alternatively, the second computing device may further generate a corresponding control command based on the text representation, and send the control command to a third computing device, so that the third computing device performs a corresponding action.

In some embodiments of the fourth aspect, the text representation corresponds to the target keyword or a synonym in the synonym group.

According to a fifth aspect of this disclosure, a method for constructing a speech recognition model is provided. The method includes, obtaining target language information; obtaining a synonymous phoneme sequence group associated with the target language information, where the synonymous phoneme sequence group includes at least one synonymous phoneme sequence, and the at least one synonymous phoneme sequence is a phoneme sequence corresponding to a word semantically similar to the target language information; training a language model by using the synonymous phoneme sequence group, to obtain a target language model; generating a first decoding graph based on the target language model, where the first decoding graph indicates a plurality of decoding paths that satisfy a syntax constraint rule determined based on the synonymous phoneme sequence group; and determining the speech recognition model based on the first decoding graph.

In some embodiments of the fifth aspect, for example, the method may be performed by a first computing device with a strong computing capability. For example, the first computing device may include a cloud-side or embedded heavy device, and the first computing device may have the strong computing capability, to execute construction of the speech recognition model. For example, the first computing device may further include a user terminal device. In some embodiments of the fifth aspect, for example, one or more steps in the method may alternatively collaboratively be performed by a user terminal and a cloud.

In some embodiments of the fifth aspect, for example, the obtained speech recognition model may be deployed on a second computing device. For example, the second computing device may include an embedded lite device with a weak computing capability, to perform speech processing by using the deployed speech recognition model. Examples of the second computing device may include, but are not limited to, a smart home device (for example, an air conditioner, a refrigerator, a washing machine, a television, or a speaker), an intelligent wearable device (for example, a band, a watch, or glasses), a vehicle-mounted device, or the like.

Based on this manner, in embodiments of this disclosure, a speech recognition model with a phoneme sequence generalization recognition capability associated with the target language information can be constructed, so that the second computing device with, for example, small computing power can have the phoneme sequence generalization recognition capability, thereby improving interaction experience of a user.

In some embodiments of the fifth aspect, the target language information may include speech or text. In some embodiments, the target language information includes a speech input from an audio collector, and the audio collector is located at a user terminal. In some other embodiments, a keyword of a text input is obtained from a text collector at a user terminal. In some embodiments, the target language information may be some short instruction words or instruction statements, for example, "turn off", "stop", "pause", "increase volume", "turn up volume", or the like.

For example, if the first computing device is a user terminal, for example, the user may directly provide a speech input or a text input for the user terminal, so that the user terminal can extract target language information from the speech input or the text input, to construct the speech recognition model.

For example, if the first computing device is a computing device different from the user terminal, for example, a cloud device or an edge computing device, the user may input speech or text, for example, through an interface provided by the user terminal. The speech input or text input may be sent to the first computing device, so that the first computing device can obtain the target language information, to construct the speech recognition model. Based on this manner, the user can customize a phoneme sequence that can be supported by the speech recognition model, so that a degree of personalization of the speech recognition model can be improved.

In some embodiments of the fifth aspect, the obtaining a synonymous phoneme sequence group associated with the target language information includes: determining semantics of the target language information; and determining the synonymous phoneme sequence group at least based on the semantics of the target language information, where a difference between semantics of each synonymous phoneme sequence in the synonymous phoneme sequence group and the semantics of the target language information is less than a difference threshold.

Based on this manner, the first computing device can automatically extend an associated synonymous phoneme sequence group based on the semantics without depending on an input of a user, thereby reducing interaction overheads of the user.

In some embodiments of the fifth aspect, the determining the synonymous phoneme sequence group at least based on the semantics of the target language information includes, determining a target phoneme sequence corresponding to the target language information; and determining the synonymous phoneme sequence group based on the semantics of the target phoneme sequence and a length of the target phoneme sequence, where a difference between a length of each synonymous phoneme sequence in the synonymous phoneme sequence group and the length of the target phoneme sequence is less than a length threshold. For example, the length of the phoneme sequence may indicate a quantity of phonemes (for example, initials or finals) included in the phoneme sequence. In some embodiments, if the target language information is text, a phoneme sequence corresponding to the text may be obtained by using a pronunciation dictionary and used as the target phoneme sequence. If the target language information is speech, a phoneme sequence of the speech may be obtained by using an acoustic model and used as the target phoneme sequence.

Based on this manner, the synonymous phoneme sequences in the synonymous phoneme sequence group can be made to have a similar length, and complexity of performing decoding search by using the decoding graph can be reduced.

In some embodiments of the fifth aspect, the obtaining a synonymous phoneme sequence group associated with the target language information includes: obtaining a plurality of candidate synonyms based on semantics of a target keyword corresponding to the target language information; providing the plurality of candidate synonyms for a user; determining a synonym group from the plurality of candidate synonyms based on a user input received from the user, where the user input indicates that at least one candidate synonym in the plurality of candidate synonyms is excluded or confirmed; and obtaining the synonymous phoneme sequence group based on a pronunciation dictionary and the synonym group.

Based on this manner, the synonymous phoneme sequence group used for training the speech recognition model may be further adjusted based on a user feedback, so that the obtained speech recognition model can better conform to a usage habit of the user.

In some embodiments of the fifth aspect, the obtaining a synonymous phoneme sequence group semantically associated with the target phoneme sequence includes: receiving a speech input from a user, and generating the synonymous phoneme sequence group based on the speech input. For example, semantics of a speech input is obtained based on a keyword corresponding to the speech input, to generate the synonymous phoneme sequence group.

Based on this manner, the synonymous phoneme sequence group used for training the speech recognition model may be further supplemented based on a user feedback in a speech input form, so that the obtained speech recognition model can better conform to a usage habit of the user.

In some embodiments of the fifth aspect, the target language information at least includes first language information and second language information, and the determining the speech recognition model based on the first decoding graph includes: obtaining a first group of decoding paths and a second group of decoding paths from the first decoding graph, where the first group of decoding paths includes a decoding path of a first synonymous phoneme sequence group associated with the first language information, and the second group of decoding paths includes a decoding path of a second synonymous phoneme sequence group associated with the second language information; generating a first subgraph based on the first group of decoding paths; generating a second subgraph based on the second group of decoding paths; and determining the speech recognition model at least based on the first subgraph and the second subgraph. Based on this manner, the generated decoding graph has low complexity and can support faster decoding search, thereby reducing computing overheads and storage overheads.

In some embodiments of the fifth aspect, the first subgraph indicates a first decoding path and a second decoding path, the first decoding path and the second decoding path are decoding paths in the first synonymous phoneme sequence group, and the first decoding path and the second decoding path have a same weight in the first subgraph. Based on this manner, faster decoding search for the extended synonymous phoneme sequence can be implemented, thereby reducing computing overheads and storage overheads.

In some embodiments of the fifth aspect, the obtaining target language information includes: obtaining a first language information group based on pre-stored historical language information and received language information; and in response to determining that a quantity of pieces of language information in the first language information group exceeds a predetermined threshold, obtaining the target language information from the first language information group based on the predetermined threshold.

Based on this manner, it can be avoided that a quantity of pieces of language information used for training the language model is too large, thereby ensuring that the decoding graph is lightweight, and can be applied to a device with few computing resources.

In some embodiments of the fifth aspect, the obtaining the target language information from the first language information group based on the predetermined threshold includes: obtaining the target language information from the first language information group based on an attribute of language information in the target language information, where a quantity of pieces of target language information is the predetermined threshold. For example, one or more pieces of earliest created historical language information may be deleted from the first language information group, to obtain a predetermined threshold quantity of pieces of language information.

In some embodiments of the fifth aspect, the obtaining the target language information from the first language information group based on the predetermined threshold includes: obtaining the target language information from the first language information group based on a user indication, where a quantity of pieces of target language information is the predetermined threshold. For example, language information in the first language information group to be retained as the target language information may be selected based on a user input.

In some embodiments of the fifth aspect, the first computing device may further indicate to provide the speech recognition model for a target computing device (for example, the second computing device) for deployment of the speech recognition model on the target computing device. Based on this manner, automatic deployment of the speech recognition model can be supported.

According to a sixth aspect of this disclosure, a method for speech processing is provided. The method includes: receiving a speech instruction input; obtaining phoneme sequence representation of the speech input by using a speech recognition model, where the speech recognition model is configured to recognize the speech instruction based on a synonymous phoneme sequence group of semantics of the instruction; and when the phoneme sequence representation corresponds to a phoneme sequence in the phoneme sequence group, executing an instruction corresponding to the phoneme sequence representation.

In some embodiments of the sixth aspect, the speech recognition model may be obtained by a first computing device. For example, the first computing device may include a cloud-side or embedded heavy device, and the first computing device may have a strong computing capability, to execute construction of the speech recognition model. For example, the first computing device may further include a user terminal device.

In some embodiments of the sixth aspect, the step of obtaining the speech recognition model may alternatively collaboratively be performed by a user terminal and a cloud.

In some embodiments of the sixth aspect, for example, the method for speech processing may be performed by a second computing device. For example, the second computing device may include an embedded lite device with a weak computing capability, to perform speech processing by using the deployed speech recognition model. Examples of the second computing device may include, but are not limited to, a smart home device (for example, an air conditioner, a refrigerator, a washing machine, a television, or a speaker), an intelligent wearable device (for example, a band, a watch, or glasses), a vehicle-mounted device, or the like.

Based on this manner, in embodiments of this disclosure, for example, the second computing device with small computing power can have a phoneme sequence generalization recognition capability, and does not need to perform natural language understanding by recognizing a keyword, thereby reducing a requirement on device performance, and improving speech interaction experience of a user.

In some embodiments of the sixth aspect, the speech recognition model is obtained based on a process of, obtaining target language information; obtaining a synonymous phoneme sequence group associated with the target language information, where the synonymous phoneme sequence group includes at least one synonymous phoneme sequence, and the synonymous phoneme sequence is a phoneme sequence corresponding to a word semantically similar to the target language information; training a language model by using the synonymous phoneme sequence group, to obtain a target language model; generating a first decoding graph based on the target language model, where the first decoding graph indicates a plurality of decoding paths that satisfy a syntax constraint rule determined based on the synonymous phoneme sequence group; and determining the speech recognition model based on the first decoding graph.

Based on this manner, the constructed speech recognition model can implement a generalization recognition capability of customized target language information.

In some embodiments of the sixth aspect, if the phoneme sequence representation does not match any phoneme sequence in the phoneme sequence group, providing a notification of no recognition result. Based on this manner, user speech can be recognized in real time and efficiently, thereby improving speech interaction experience of the user.

In some embodiments of the sixth aspect, the speech recognition model is configured to recognize a first phoneme sequence group synonymous with first semantics and a second phoneme sequence group synonymous with second semantics. The method may further include: if the phoneme sequence representation corresponds to a first phoneme sequence in the first phoneme sequence group, executing a first instruction; and if the phoneme sequence representation corresponds to a second phoneme sequence in the second phoneme sequence group, executing a second instruction different from the first action. Based on this manner, phoneme sequences in the phoneme sequence group having different semantics can be recognized by using the speech recognition model. Therefore, an instruction corresponding to an intention of a user can be executed.

In some embodiments of the sixth aspect, the obtaining phoneme sequence representation of the speech instruction by using a speech recognition model includes: generating an emission probability of a speech feature of the speech instruction input to a phoneme by using an acoustic model; recognizing the speech instruction input by inputting the emission probability to the speech recognition model; and enabling the speech recognition model to output the phoneme sequence representation. Based on this manner, a corresponding phoneme sequence may be obtained from an instruction in a speech form, to match a phoneme sequence in a phoneme sequence group that can be recognized by the speech recognition model. According to a seventh aspect of this disclosure, a system for constructing a speech model is provided. The system includes: a target language information obtaining unit, configured to obtain target language information; a synonymous phoneme sequence group obtaining unit, configured to obtain a synonymous phoneme sequence group associated with the target language information, where the synonymous phoneme sequence group includes at least one synonymous phoneme sequence, and the at least one synonymous phoneme sequence is a phoneme sequence corresponding to a word semantically similar to the target language information; a model training unit, configured to train a language model by using the synonymous phoneme sequence group, to obtain a target language model; a decoding graph generation unit, configured to generate a first decoding graph based on the target language model, where the first decoding graph indicates a plurality of decoding paths that satisfy a syntax constraint rule determined based on the synonymous phoneme sequence group; and a model determining unit, configured to determine the speech recognition model based on the first decoding graph.

In some embodiments of the seventh aspect, for example, the system for constructing a speech model according to the seventh aspect may be implemented by a first computing device with a strong computing capability. For example, the first computing device may include a cloud-side or embedded heavy device, and the first computing device may have the strong computing capability, to execute construction of the speech recognition model. For example, the first computing device may further include a user terminal device. In some embodiments of the seventh aspect, the system may alternatively collaboratively be performed by a user terminal and a cloud.

In some embodiments of the seventh aspect, for example, the obtained speech recognition model may be deployed on a second computing device. For example, the second computing device may include an embedded lite device with a weak computing capability, to perform speech processing by using the deployed speech recognition model. Examples of the second computing device may include, but are not limited to, a smart home device (for example, an air conditioner, a refrigerator, a washing machine, a television, or a speaker), an intelligent wearable device (for example, a band, a watch, or glasses), a vehicle-mounted device, or the like.

Based on this manner, in embodiments of this disclosure, a speech recognition model with a phoneme sequence generalization recognition capability associated with the target language information can be constructed, so that the second computing device with, for example, small computing power can have the phoneme sequence generalization recognition capability, thereby improving interaction experience of a user.

In some embodiments of the seventh aspect, the target language information may include speech or text. In some embodiments, the target language information includes a speech input from an audio collector, and the audio collector is located at a user terminal. In some other embodiments, a keyword of a text input is obtained from a text collector at a user terminal. In some embodiments, the target language information may be some short instruction words or instruction statements, for example, "turn off", "stop", "pause", "increase volume", "turn up volume", or the like.

For example, if the first computing device is a user terminal, for example, the user may directly provide a speech input or a text input for the user terminal, so that the user terminal can extract target language information from the speech input or the text input, to construct the speech recognition model.

For example, if the first computing device is a computing device different from the user terminal, for example, a cloud device or an edge computing device, the user may input speech or text, for example, through an interface provided by the user terminal. The speech input or text input may be sent to the first computing device, so that the first computing device can obtain the target language information, to construct the speech recognition model. Based on this manner, the user can customize a phoneme sequence that can be supported by the speech recognition model, so that a degree of personalization of the speech recognition model can be improved.

In some embodiments of the seventh aspect, the synonymous phoneme sequence group obtaining unit may be further configured to: determine semantics of the target language information; and determine the synonymous phoneme sequence group at least based on the semantics of the target language information, where a difference between semantics of each synonymous phoneme sequence in the synonymous phoneme sequence group and the semantics of the target language information is less than a difference threshold.

Based on this manner, the first computing device can automatically extend an associated synonymous phoneme sequence group based on the semantics without depending on an input of a user, thereby reducing interaction overheads of the user.

In some embodiments of the seventh aspect, the synonymous phoneme sequence group obtaining unit may be further configured to: determine a target phoneme sequence corresponding to the target language information; and determine the synonymous phoneme sequence group based on the semantics of the target phoneme sequence and a length of the target phoneme sequence, where a difference between a length of each synonymous phoneme sequence in the synonymous phoneme sequence group and the length of the target phoneme sequence is less than a length threshold. For example, the length of the phoneme sequence may indicate a quantity of phonemes (for example, initials or finals) included in the phoneme sequence. In some embodiments, if the target language information is text, a phoneme sequence corresponding to the text may be obtained by using a pronunciation dictionary and used as the target phoneme sequence. If the target language information is speech, a phoneme sequence of the speech may be obtained by using an acoustic model and used as the target phoneme sequence.

Based on this manner, the synonymous phoneme sequences in the synonymous phoneme sequence group can be made to have a similar length, and complexity of performing decoding search by using the decoding graph can be reduced.

In some embodiments of the seventh aspect, the synonymous phoneme sequence group obtaining unit may be further configured to: obtain a plurality of candidate synonyms based on semantics of a target keyword corresponding to the target language information; provide the plurality of candidate synonyms for a user; determine a synonym group from the plurality of candidate synonyms based on a user input received from the user, where the user input indicates that at least one candidate synonym in the plurality of candidate synonyms is excluded or confirmed; and obtain the synonymous phoneme sequence group based on a pronunciation dictionary and the synonym group.

Based on this manner, the synonymous phoneme sequence group used for training the speech recognition model may be further adjusted based on a user feedback, so that the obtained speech recognition model can better conform to a usage habit of the user.

In some embodiments of the seventh aspect, the synonymous phoneme sequence group obtaining unit may be further configured to: receive a speech input from a user; and generate the synonymous phoneme sequence group based on the speech input. For example, semantics of a speech input is obtained based on a keyword corresponding to the speech input, to generate the synonymous phoneme sequence group.

Based on this manner, the synonymous phoneme sequence group used for training the speech recognition model may be further supplemented based on a user feedback in a speech input form, so that the obtained speech recognition model can better conform to a usage habit of the user.

In some embodiments of the seventh aspect, the target language information at least includes first language information and second language information, and the model determining unit may be further configured to: obtain a first group of decoding paths and a second group of decoding paths from the first decoding graph, where the first group of decoding paths includes a decoding path of a first synonymous phoneme sequence group associated with the first language information, and the second group of decoding paths includes a decoding path of a second synonymous phoneme sequence group associated with the second language information; generate a first subgraph based on the first group of decoding paths; generate a second subgraph based on the second group of decoding paths; and determine the speech recognition model at least based on the first subgraph and the second subgraph. Based on this manner, the generated decoding graph has low complexity and can support faster decoding search, thereby reducing computing overheads and storage overheads.

In some embodiments of the seventh aspect, the first subgraph indicates a first decoding path and a second decoding path, the first decoding path and the second decoding path are decoding paths in the first synonymous phoneme sequence group, and the first decoding path and the second decoding path have a same weight in the first subgraph. Based on this manner, faster decoding search for the extended synonymous phoneme sequence can be implemented, thereby reducing computing overheads and storage overheads.

In some embodiments of the seventh aspect, the target language information obtaining unit may be further configured to: obtain a first language information group based on pre-stored historical language information and received language information; and in response to determining that a quantity of pieces of language information in the first language information group exceeds a predetermined threshold, obtain the target language information from the first language information group based on the predetermined threshold.

Based on this manner, it can be avoided that a quantity of pieces of language information used for training the language model is too large, thereby ensuring that the decoding graph is lightweight, and can be applied to a device with few computing resources.

In some embodiments of the seventh aspect, the target language information obtaining unit may be further configured to: obtain the target language information from the first language information group based on an attribute of language information in the target language information, where a quantity of pieces of target language information is the predetermined threshold. For example, one or more pieces of earliest created historical language information may be deleted from the first language information group, to obtain a predetermined threshold quantity of pieces of language information.

In some embodiments of the seventh aspect, the target language information obtaining unit may be further configured to: obtain the target language information from the first language information group based on a user indication, where a quantity of pieces of target language information is the predetermined threshold. For example, language information in the first language information group to be retained as the target language information may be selected based on a user input.

In some embodiments of the seventh aspect, the first computing device may further indicate to provide the speech recognition model for a target computing device (for example, the second computing device) for deployment of the speech recognition model on the target computing device. Based on this manner, automatic deployment of the speech recognition model can be supported.

According to an eighth aspect of this disclosure, a system for speech processing is provided. The system includes: a speech instruction input unit, configured to receive a speech instruction input; and a speech processing unit, configured to: obtain phoneme sequence representation of the speech instruction input by using a speech recognition model, where the speech recognition model is configured to recognize the speech instruction input based on a synonymous phoneme sequence group of semantics of the instruction, and when the phoneme sequence representation corresponds to a phoneme sequence in the phoneme sequence group, execute an instruction corresponding to the phoneme sequence representation.

In some embodiments of the eighth aspect, the speech recognition model may be obtained by a first computing device. For example, the first computing device may include a cloud-side or embedded heavy device, and the first computing device may have a strong computing capability, to execute construction of the speech recognition model. For example, the first computing device may further include a user terminal device.

In some embodiments of the eighth aspect, for example, the system for speech processing may be performed by a second computing device. For example, the second computing device may include an embedded lite device with a weak computing capability, to perform speech processing by using the deployed speech recognition model. Examples of the second computing device may include, but are not limited to, a smart home device (for example, an air conditioner, a refrigerator, a washing machine, a television, or a speaker), an intelligent wearable device (for example, a band, a watch, or glasses), a vehicle-mounted device, or the like.

Based on this manner, in embodiments of this disclosure, for example, the second computing device with small computing power can have a phoneme sequence generalization recognition capability, and does not need to perform natural language understanding by recognizing a keyword, thereby reducing a requirement on device performance, and improving speech interaction experience of a user.

In some embodiments of the eighth aspect, the speech recognition model is obtained based on a process of: obtaining target language information; obtaining a synonymous phoneme sequence group associated with the target language information, where the synonymous phoneme sequence group includes at least one synonymous phoneme sequence, and the synonymous phoneme sequence is a phoneme sequence corresponding to a word semantically similar to the target language information; training a language model by using the synonymous phoneme sequence group, to obtain a target language model; generating a first decoding graph based on the target language model, where the first decoding graph indicates a plurality of decoding paths that satisfy a syntax constraint rule determined based on the synonymous phoneme sequence group; and determining the speech recognition model based on the first decoding graph.

Based on this manner, the constructed speech recognition model can implement a generalization recognition capability of customized target language information.

In some embodiments of the eighth aspect, the speech processing unit may be further configured to: if the phoneme sequence representation does not match any phoneme sequence in the phoneme sequence group, provide a notification of no recognition result. Based on this manner, user speech can be recognized in real time and efficiently, thereby improving speech interaction experience of the user.

In some embodiments of the eighth aspect, the speech recognition model is configured to recognize a first phoneme sequence group synonymous with first semantics and a second phoneme sequence group synonymous with second semantics. The speech processing unit may be further configured to: if the phoneme sequence representation corresponds to a first phoneme sequence in the first phoneme sequence group, execute a first instruction; and if the phoneme sequence representation corresponds to a second phoneme sequence in the second phoneme sequence group, execute a second instruction different from the first action. Based on this manner, phoneme sequences in the phoneme sequence group having different semantics can be recognized by using the speech recognition model. Therefore, an instruction corresponding to an intention of a user can be executed.

In some embodiments of the eighth aspect, the speech processing unit may be further configured to: generate an emission probability of a speech feature of the speech instruction input to a phoneme by using an acoustic model; recognize the speech instruction input by inputting the emission probability to the speech recognition model; and enable the speech recognition model to output the phoneme sequence representation. Based on this manner, a corresponding phoneme sequence may be obtained from an instruction in a speech form, to match a phoneme sequence in a phoneme sequence group that can be recognized by the speech recognition model.

According to a ninth aspect of this disclosure, a first computing device is provided. The first computing device includes at least one computing unit; and at least one memory, where the at least one memory is coupled to the at least one computing unit and stores instructions executed by the at least one computing unit, and when the instructions are executed by the at least one computing unit, the first computing device is enabled to perform some or all of the steps of the method according to the first aspect or any implementation of the first aspect, or perform some or all of the steps of the method according to the fifth aspect or any implementation of the fifth aspect.

According to a tenth aspect of this disclosure, a second computing device is provided. The second computing device includes at least one computing unit; and at least one memory, where the at least one memory is coupled to the at least one computing unit and stores instructions executed by the at least one computing unit, and when the instructions are executed by the at least one computing unit, the second computing device is enabled to perform some or all of the steps of the method according to the second aspect or any implementation of the second aspect, or perform some or all of the steps of the method according to the sixth aspect or any implementation of the sixth aspect.

According to an eleventh aspect of this disclosure, a computer-readable storage medium is provided. The computer-readable storage medium stores one or more computer instructions, and when the one or more computer instructions are executed by a processor, the method according to the first aspect or any implementation of the first aspect is implemented, or some or all of the steps of the method according to the fifth aspect or any implementation of the fifth aspect are performed.

According to a twelfth aspect of this disclosure, a computer-readable storage medium is provided. The computer-readable storage medium stores one or more computer instructions, and when the one or more computer instructions are executed by a processor, the method according to the second aspect or any implementation of the second aspect is implemented, or some or all of the steps of the method according to the sixth aspect or any implementation of the sixth aspect are performed.

According to a thirteenth aspect of this disclosure, a computer program product is provided. When the computer program product runs on a computer, the computer is enabled to perform instructions of some or all of the steps of the method according to the first aspect or any implementation of the first aspect, or perform some or all of the steps of the method according to the fifth aspect or any implementation of the fifth aspect.

According to a fourteenth aspect of this disclosure, a computer program product is provided. When the computer program product runs on a computer, the computer is enabled to perform instructions of some or all of the steps of the method according to the second aspect or any implementation of the second aspect, or perform some or all of the steps of the method according to the sixth aspect or any implementation of the sixth aspect.

It may be understood that the first computing device according to the ninth aspect, the computer storage medium according to the eleventh aspect, or the computer program product according to the thirteenth aspect is configured to perform the method according to the first aspect. Therefore, the explanation or description of the first aspect is also applicable to the ninth aspect, the eleventh aspect, and the thirteenth aspect. In addition, for beneficial effect that can be achieved in the ninth aspect, the eleventh aspect, and the thirteenth aspect, refer to beneficial effect in a corresponding method. Details are not described herein again.

It may be understood that the second computing device according to the tenth aspect, the computer storage medium according to the twelfth aspect, or the computer program product according to the fourteenth aspect is configured to perform the method according to the second aspect. Therefore, the explanation or description of the second aspect is also applicable to the tenth aspect, the twelfth aspect, and the fourteenth aspect. In addition, for beneficial effect that can be achieved in the tenth aspect, the twelfth aspect, and the fourteenth aspect, refer to beneficial effect in a corresponding method. Details are not described herein again.

BRIEF DESCRIPTION OF DRAWINGS

With reference to accompanying drawings and the following detailed descriptions, the foregoing and other features, advantages, and aspects of the implementations of this disclosure become more apparent. In the accompanying drawings, same or similar reference numerals indicate same or similar elements.

In the accompanying drawings, same or similar reference numbers indicate same or similar elements.

DESCRIPTION OF EMBODIMENTS

Figure 1A:
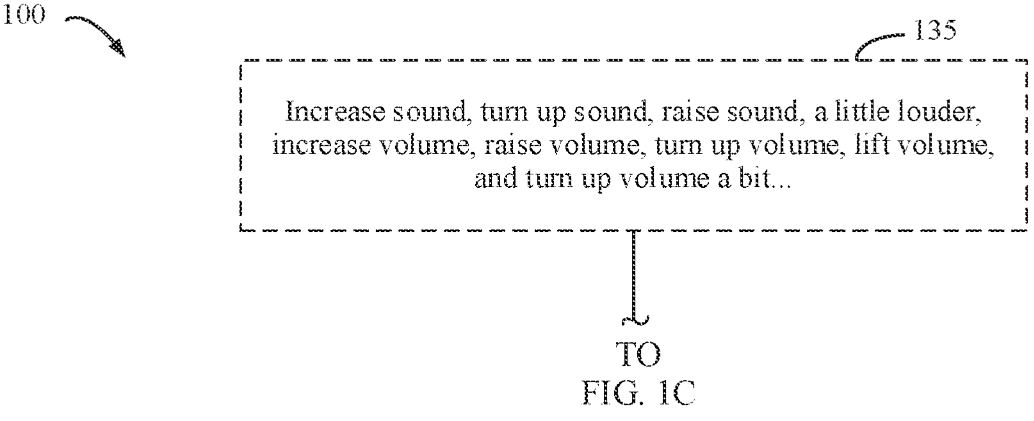
FIG. 1A to FIG. 1D are a schematic block diagram of an example environment in which embodiments of this disclosure can be implemented.
Figure 1B:
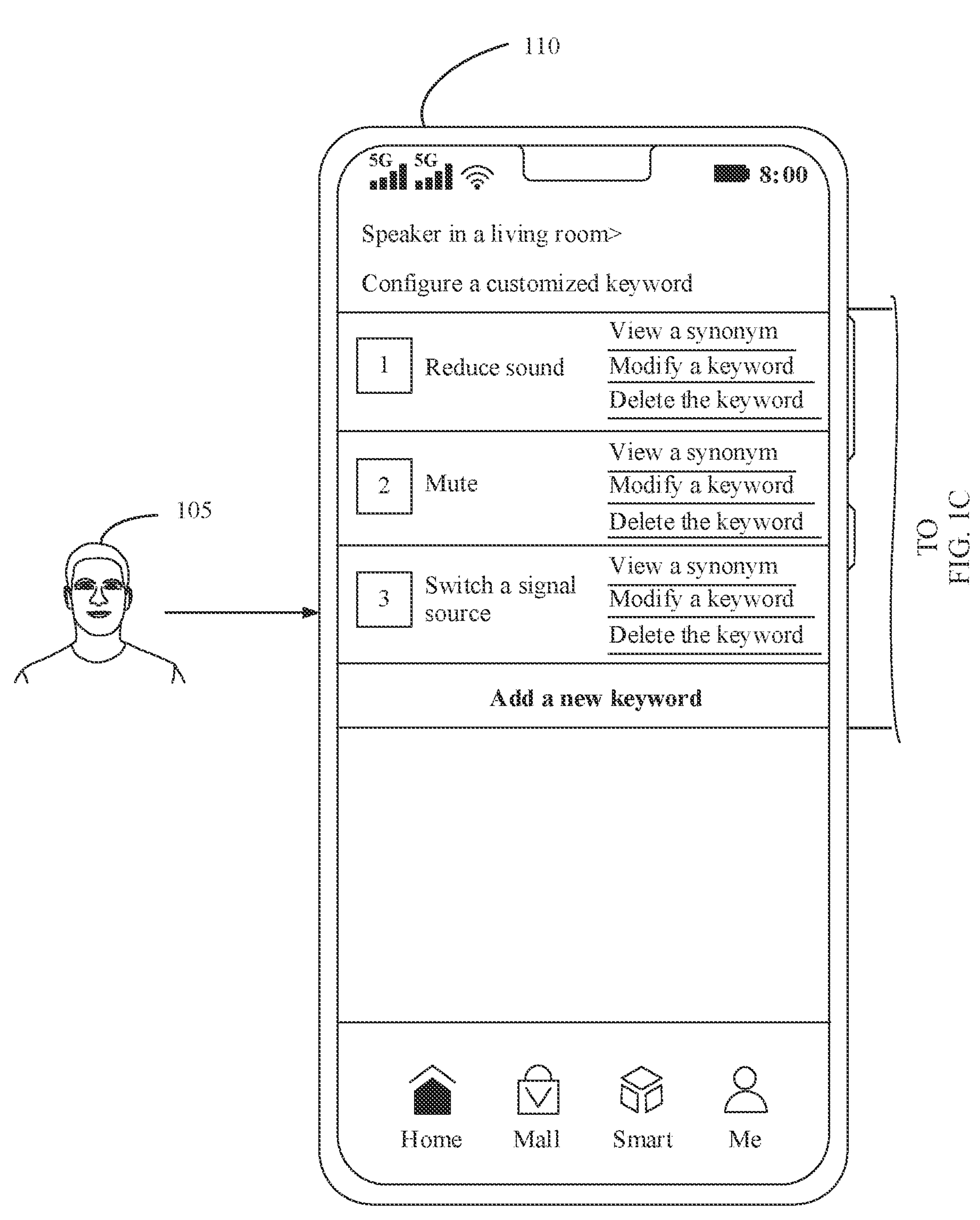
Figure 1C:
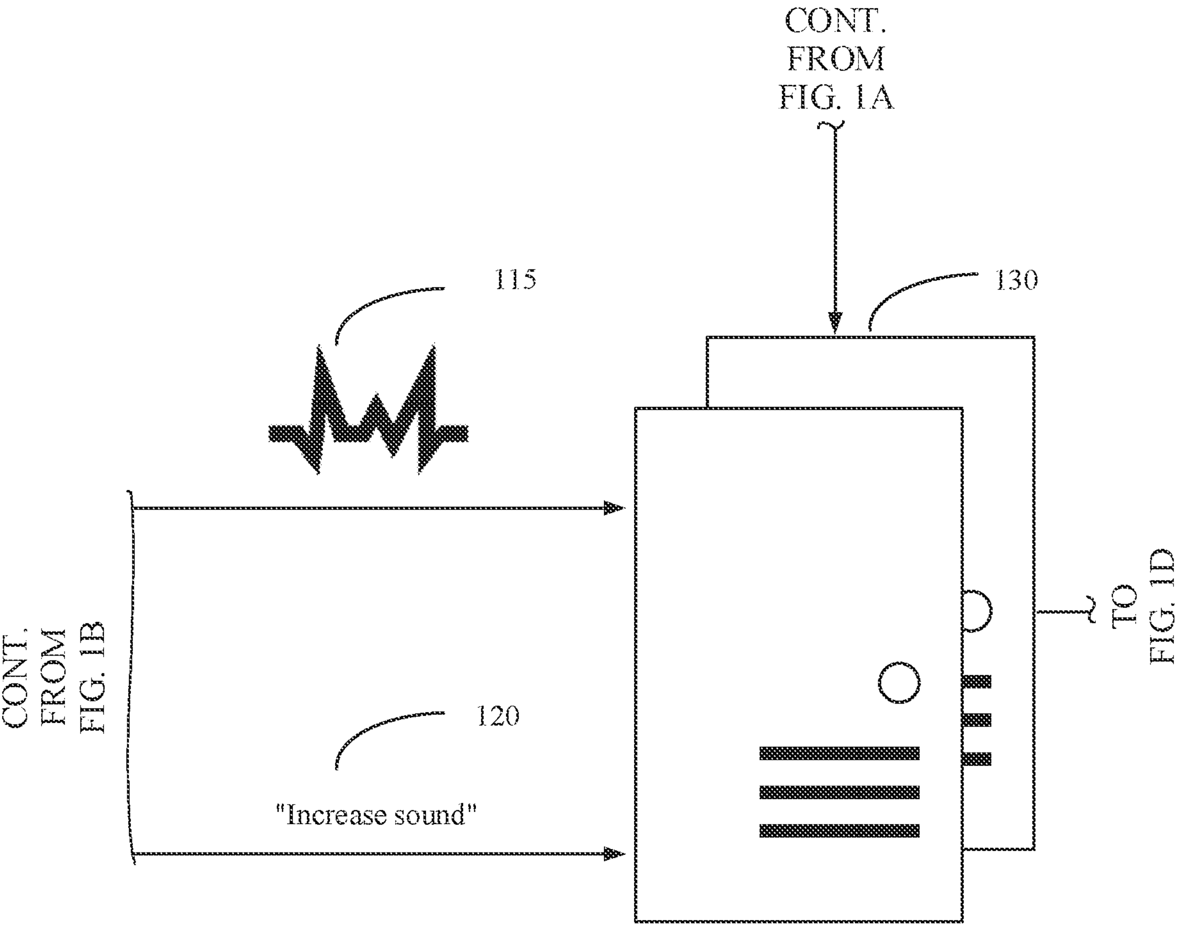
Figure 1D:
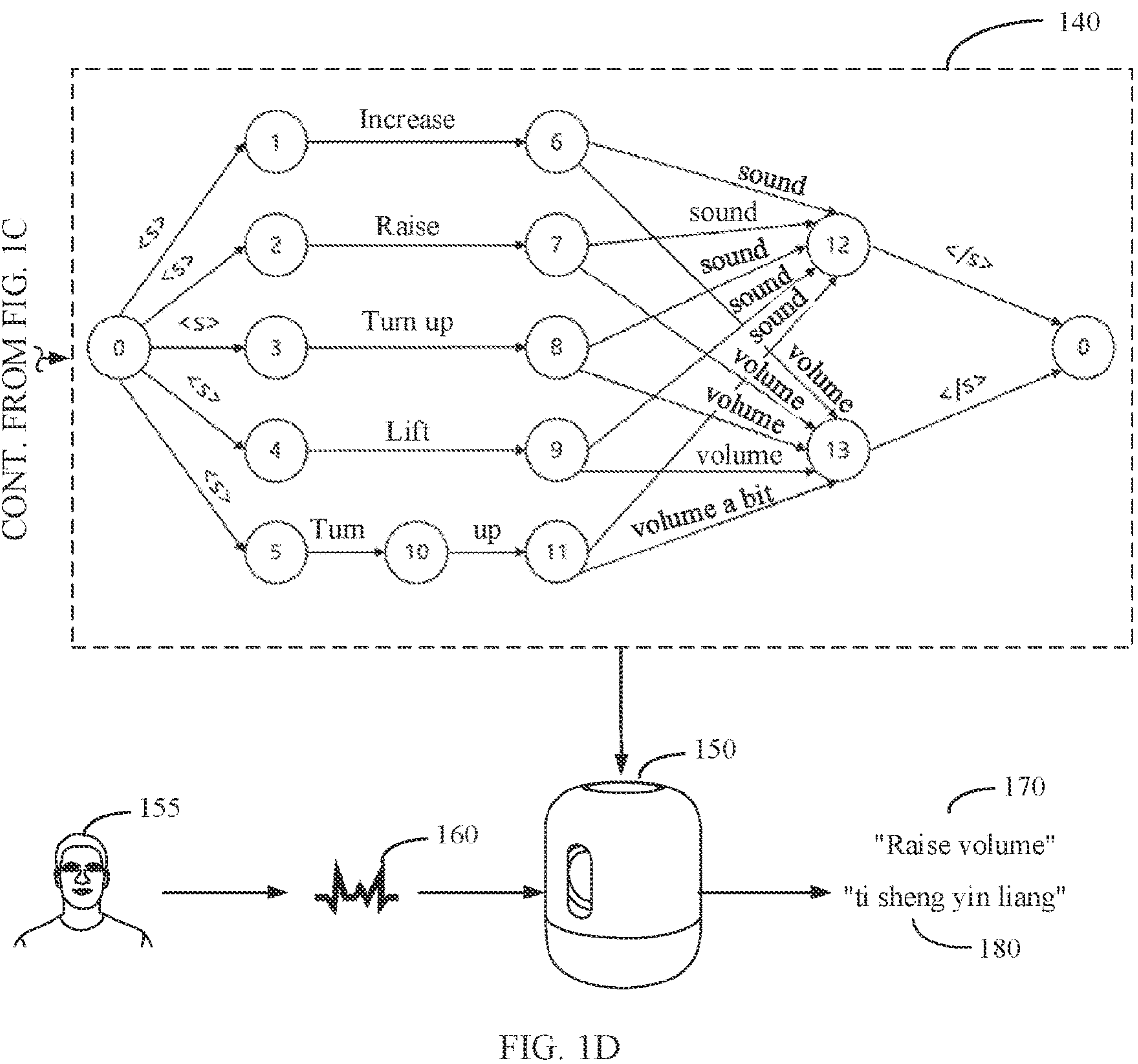

The following describes in more detail embodiments of this disclosure with reference to accompanying drawings. Although some embodiments of this disclosure are shown in the accompanying drawings, it should be understood that this disclosure may be implemented in various forms, and should not be construed as being limited to embodiments described herein. On the contrary, these embodiments are provided so that this disclosure will be thoroughly and completely understood. It should be understood that the accompanying drawings and embodiments of this disclosure are merely used as examples, but are not intended to limit the protection scope of this disclosure.

In descriptions of embodiments of this disclosure, terms "include" and similar terms thereof should be understood as open inclusion, that is, "include but are not limited to". A term "based on" should be understood as "at least partially based on". A terms "one embodiment" or "the embodiment" should be understood as "at least one embodiment". Terms "first", "second", and the like may indicate different or same objects. Other explicit and implicit definitions may also be included below.

As discussed above, for a lite device (for example, a smart home device) with a limited computing capability, some conventional speech recognition solutions usually rely on another device (for example, a mobile phone or a cloud server) with a stronger computing capability to implement semantic understanding of a speech input. Alternatively, some lite devices may deploy a lightweight speech recognition model to implement local semantic understanding. However, such a speech recognition model cannot support semantics customized by a user, and cannot process a speech input of same semantics. This greatly affects speech interaction experience of the user.

Embodiments of this disclosure provide a keyword-based speech recognition model and a phoneme sequence-based speech recognition model. Herein, the keyword may be text representation of a language, and the phoneme sequence may be a sequence of phonetic units divided based on a natural attribute of speech. Depending on a type of language (for example, Chinese, English, or the like), the phoneme may be, for example, a final, a phonetic symbol, or any other form.

Example Environment 1

FIG. 1A to FIG. 1D are a schematic diagram of an example environment 100 in which a plurality of embodiments of this disclosure can be implemented. As shown in FIG. 1A to FIG. 1D, the environment 100 includes a first computing device 130. For example, the first computing device 130 may be a device with a strong computing capability. Examples of the first computing device 130 include but are not limited to a cloud-side server, a smartphone, a notebook computer, a tablet computer, a desktop computer, an edge computing device, or the like. In this disclosure, such a first computing device 130 may also be referred to as a heavy device. In the example in FIG. 1A to FIG. 1D, for example, such a first computing device 130 may include a cloud-side device.

According to this embodiment of this disclosure, the first computing device 130 may obtain a target keyword, train a language model based on a synonym group semantically associated with the target keyword, and further obtain a speech recognition model. In some embodiments, for example, the target keyword may include a keyword input by a user 105. As shown in FIG. 1A to FIG. 1D, for example, the user 105 may configure a keyword by using a user terminal 110. For example, the user 105 desires to configure a second computing device 150, to enable speech recognition of a keyword "increase sound".

According to this embodiment of this disclosure, the first computing device 130 may further obtain target language information, train a language model based on a synonymous phoneme sequence group associated with the target language information, and further obtain a speech recognition model. In some embodiments, for example, a target phoneme sequence may include speech 115 provided by the user 105. As shown in FIG. 1A to FIG. 1D, for example, the user 105 may configure a synonymous phoneme sequence group by using the user terminal 110. For example, the user 105 desires to configure the second computing device 150, to enable speech recognition of a phoneme sequence corresponding to "increase sound".

In the example in FIG. 1A to FIG. 1D, the second computing device 150 is shown as a smart speaker. It should be understood that the smart speaker is merely an example of the second computing device 150, and the second computing device 150 may further include another appropriate device, for example, a smart home device (for example, an air conditioner, a refrigerator, a washing machine, or a television), an intelligent wearable device (for example, a band, a watch, or glasses), a vehicle-mounted device, or the like. The second computing device 150 typically has a weak computing capability and is also referred to as a lite device in this disclosure. This disclosure is not intended to limit a specific form of the second computing device 150.

Figure 2A:
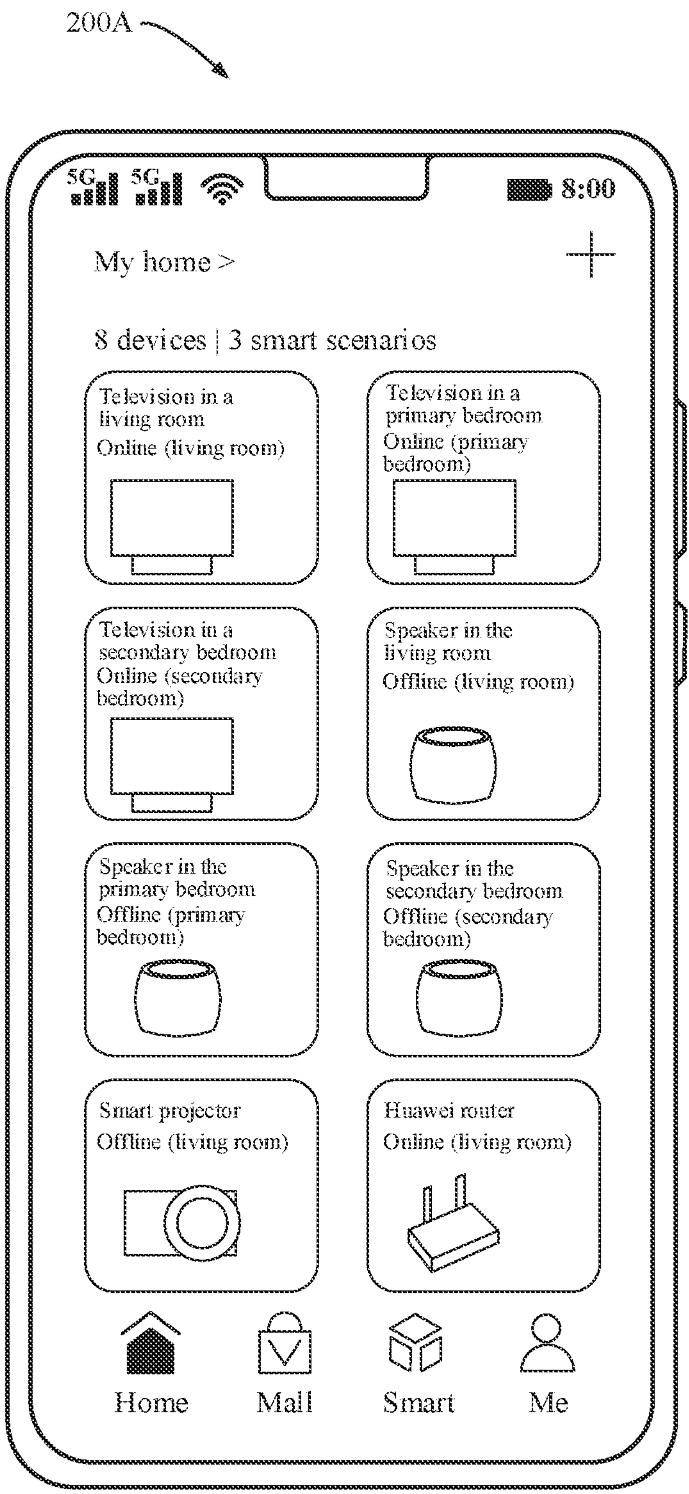
FIG. 2A to FIG. 2D show example user interfaces according to some embodiments of this disclosure.

In some embodiments, as shown in FIG. 2A, for example, the user 105 may enter a user interface 200A for configuring the smart home by using the user terminal 110, and may select, for example, "speaker in the living room" to configure the smart speaker. It should be understood that, for example, the user 105 may also select another appropriate smart home for configuration. For a purpose of description only, "speaker in the living room" is used as an example in scenarios of FIG. 1A to FIG. 1D and FIG. 2A to FIG. 2D.

Figure 2B:
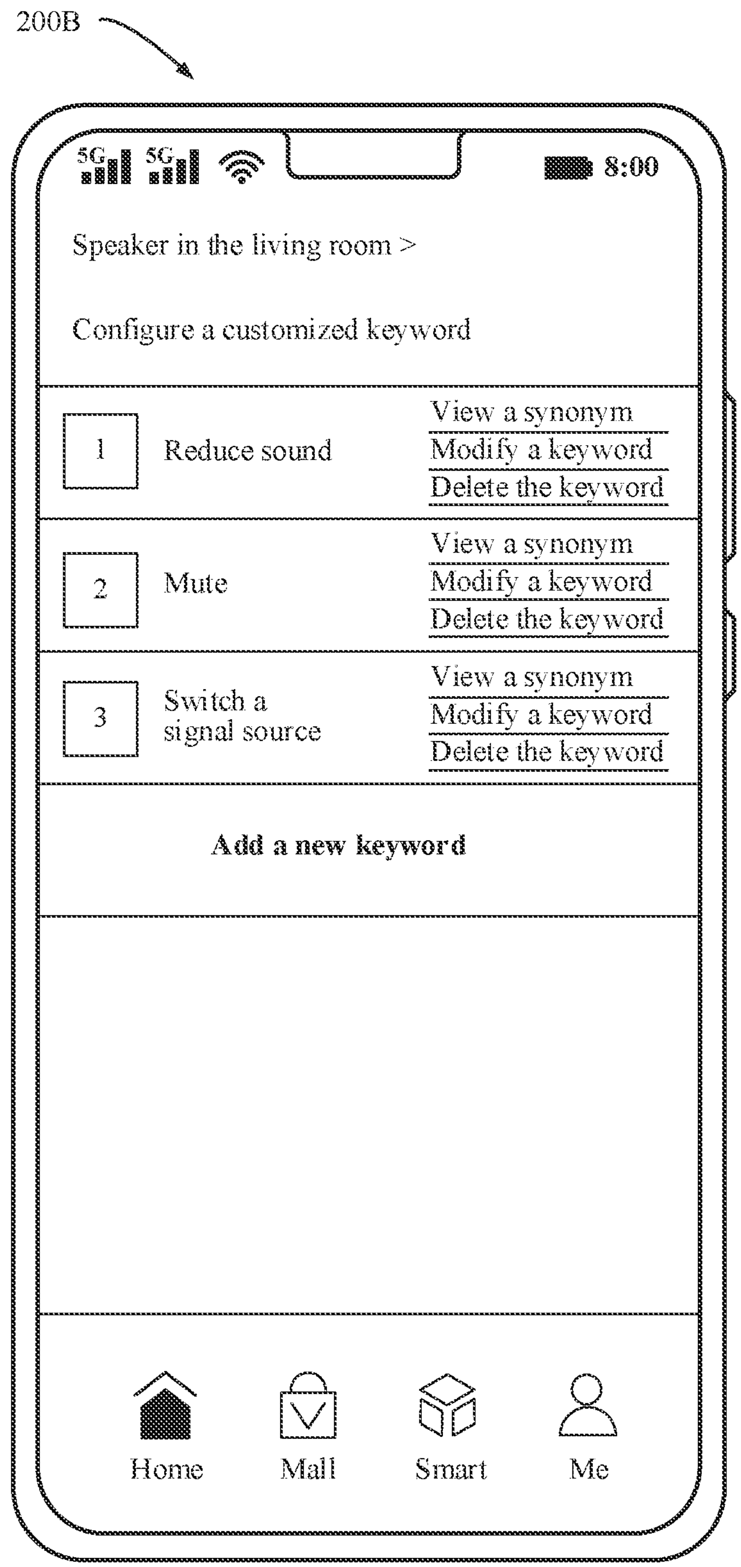

As shown in FIG. 2B, for example, the user terminal 110 may provide the user 105 with a user interface 200B for configuring a customized keyword, so that the user 105 can modify, add, or delete a keyword that can be recognized by the smart speaker through speech. As shown in FIG. 2B, for example, the smart speaker adds three customized keywords previously created by the user 105, which are respectively: "reduce sound", "mute", and "switch a signal source".

Figure 2C:
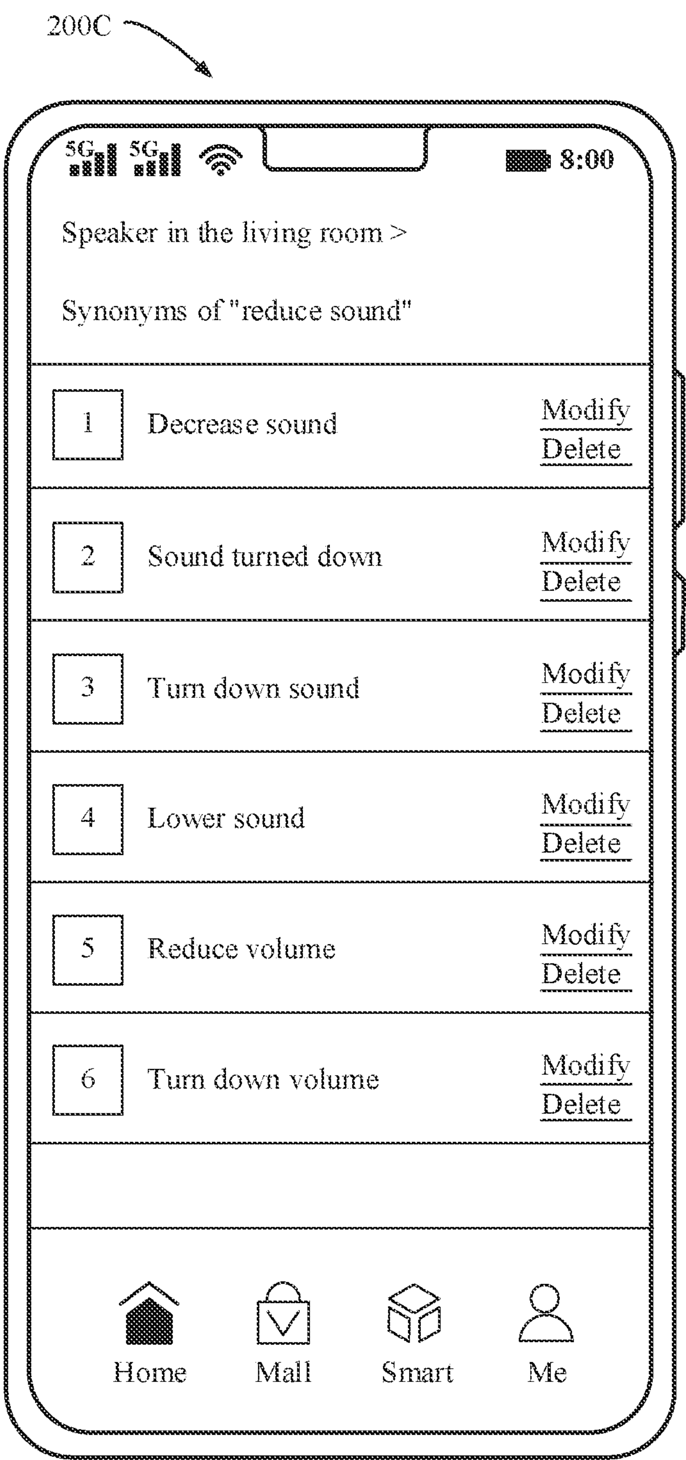

For each customized keyword, for example, the user 105 may view synonyms supported by the smart speaker. "Reduce sound" is used as an example. For example, the user 105 may tap "view a synonym" to view a synonym group of "reduce sound" supported by the smart speaker, for example, "decrease sound" and "turn down sound", as shown in FIG. 2C.

In some embodiments, for example, the user 105 may also edit the synonym group supported by the smart speaker, to delete a synonym or modify a synonym.

Figure 2D:
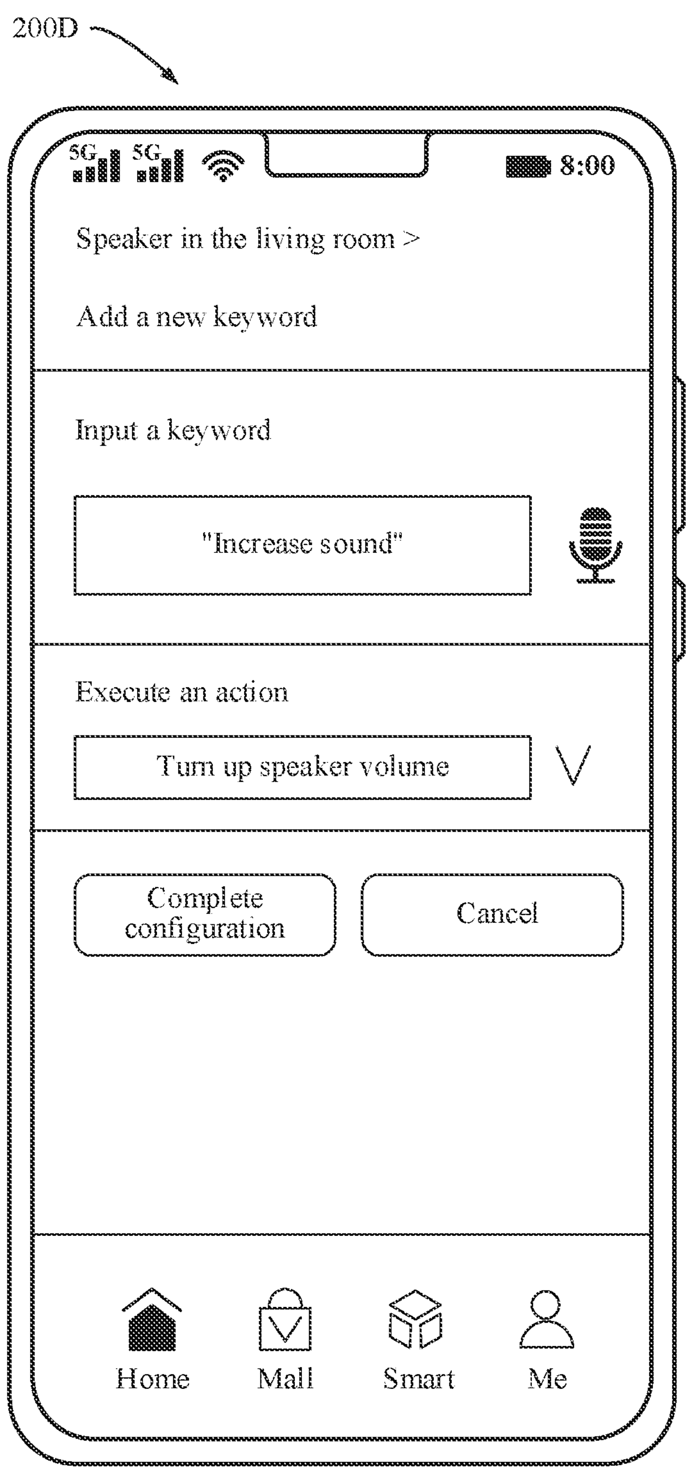

As shown in FIG. 2D, for example, the user 105 may further configure a new keyword. In some embodiments, for example, the user 105 may input text "increase sound" by using a touchscreen provided by the user terminal 110. Alternatively, for example, the user 105 may directly input speech corresponding to "increase sound" by tapping a microphone button.

As shown in FIG. 2D, for example, the user 105 may further customize an execution action corresponding to the keyword, namely, an operation that should be performed when the smart speaker recognizes the keyword. In the example in FIG. 2D, according to a configured rule, for example, after recognizing the keyword "increase sound", the smart speaker may perform the action of "increase speaker volume".

In some embodiments, a pronunciation dictionary may be used to convert the keyword and the keywords having same semantics that are obtained in the foregoing manners into a corresponding phoneme sequence, to obtain the synonym phoneme sequence group.

Still refer to FIG. 1A to FIG. 1D. The user terminal 110 may provide the received speech input 115 or a text input 120 for the first computing device 130, for example, the cloud-side server, through wireless communication.

As shown in FIG. 1A to FIG. 1D, the first computing device 130 may obtain, from the speech input 115 or the text input 120, the keyword "increase sound" or the corresponding phoneme sequence (for example, by using the pronunciation dictionary) input by the user, and thereby determine the target keyword or a corresponding target phoneme sequence used for training the language model. In some embodiments, for example, the target keyword may include a default system keyword, a keyword previously customized by the user, and a new keyword expected by the user.

Alternatively, for example, the target keyword may include only a keyword associated with personalized customization of the user, and the default system keyword may not be repeatedly obtained in response to a customized operation of the user, so that a generated speech recognition model 140 is only used to support speech recognition of the keyword customized by the user. Similarly, the target phoneme sequence may include only a phoneme sequence associated with the personalized customization of the user.

After obtaining the target keyword, the first computing device 130 may determine the synonym group semantically associated with the target keyword, train the language model based on the target keyword and the synonym group, and further obtain the speech recognition model 140. Similarly, after obtaining the target language information, the first computing device 130 may determine the synonymous phoneme sequence group associated with the target language information, train the language model by using the synonymous phoneme sequence group, and further obtain the speech recognition model 140. The process of obtaining the speech recognition model 140 is described in detail below with reference to FIG. 2A to FIG. 2D, and details are not described herein.

In some embodiments, the speech recognition model 140 obtained based on the target keyword and the synonym group may be deployed on a smart speaker specified by the user 105. After the speech recognition model 140 is deployed on the smart speaker, the smart speaker can support the speech recognition for the target keyword and the associated synonym group. For example, a user 155 (which may be a user the same as or different from the user 105) may provide a speech input 160, for example, "raise volume" for the smart speaker. Correspondingly, the smart speaker can use the speech recognition model 140 to process the speech input 160 and determine text representation 170, that is, "raise volume" corresponding to the speech input 160.

It should be understood that the text representation 170 may be text corresponding to all speech segments of the speech input 160, or the text representation 170 may be text corresponding to some speech segments of the speech input 160. For example, the user 155 may input "please raise volume" through speech. Correspondingly, the smart speaker can recognize, by using the speech recognition model 140, a keyword "raise volume" included thereof.

In some embodiments, the speech input 160 received by the smart speaker may correspond to the customized keyword, for example, "increase sound" configured by the user 105, or may correspond to a synonym, for example, "raise volume" automatically determined by the first computing device 130.

In some embodiments, the smart speaker may perform, according to a preconfigured rule, an action corresponding to the text representation 170. For example, the user 105 has previously configured a corresponding execution action as "increase speaker volume". This may enable the smart speaker to perform the action of "increasing speaker volume" after recognizing the keyword "raising volume".

In some embodiments, for example, the text representation 170 may further trigger another device different from the smart speaker to perform a corresponding action. For example, the user may also configure the corresponding execution action as "increase volume of a television in a living room". Correspondingly, when recognizing "raise volume", the smart speaker may send a command to the "television in a living room" to increase television volume.

In some embodiments, the speech recognition model 140 obtained by using the synonymous phoneme sequence group may also be deployed on the smart speaker specified by the user 105. After the speech recognition model 140 is deployed on the smart speaker, the smart speaker can support the speech recognition for the synonymous phoneme sequence group. For example, the user 155 (which may be the user the same as or different from the user 105) may provide the speech input 160, for example, "raise volume" for the smart speaker. Correspondingly, the smart speaker can use the speech recognition model 140 to process the speech input 160 and determine phoneme sequence representation 180, that is, "ti sheng yin liang" of the speech input 160 of the user.

It should be understood that, when the speech input is recognized based on the phoneme sequence, the phoneme sequence representation 180 may be a phoneme sequence corresponding to all the speech segments of the speech input 160, or the phoneme sequence representation 180 may be a phoneme sequence corresponding to some of the speech segments of the speech input 160. For example, the user 155 may input "qing ti sheng yin liang" (please raise volume) through speech. Correspondingly, the smart speaker can recognize, by using the speech recognition model 140, a phoneme sequence "ti sheng yin liang" included thereof.

In some embodiments, the speech input 160 received by the smart speaker may correspond to a customized phoneme sequence, for example, "ti gao sheng yin" (increase sound) configured by the user 105, or may correspond to a synonymous phoneme sequence, for example, "ti sheng yin liang" (raise volume) automatically determined by the first computing device 130.

In some embodiments, the smart speaker may perform, according to the preconfigured rule, an action corresponding to the phoneme sequence representation 180. For example, the user 105 has previously configured a corresponding execution action as "increase speaker volume". This may enable the smart speaker to perform the action of "increasing speaker volume" after recognizing the phoneme sequence representation "ti sheng yin liang".

In some embodiments, for example, the phoneme sequence representation 180 may further trigger another device different from the smart speaker to perform a corresponding action. For example, the user may also configure the corresponding execution action as "increase volume of a television in a living room". Correspondingly, when recognizing "ti sheng yin liang", the smart speaker may send a command to the "television in a living room" to increase television volume.

Example Environment 2

Figure 3A:
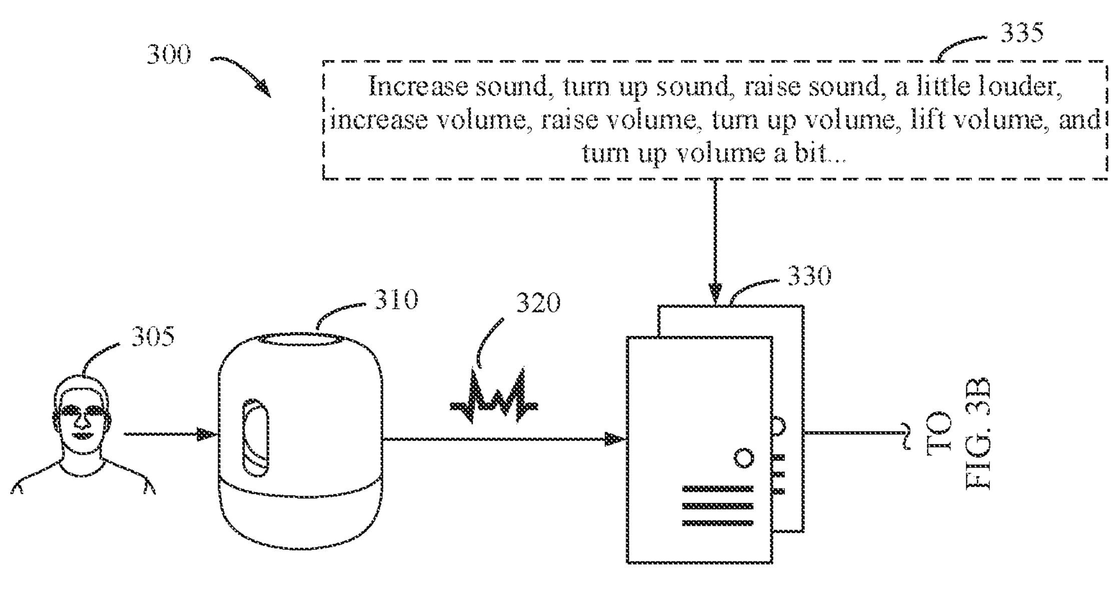
FIG. 3A and FIG. 3B are a schematic block diagram of another example environment in which embodiments of this disclosure can be implemented.
Figure 3B:
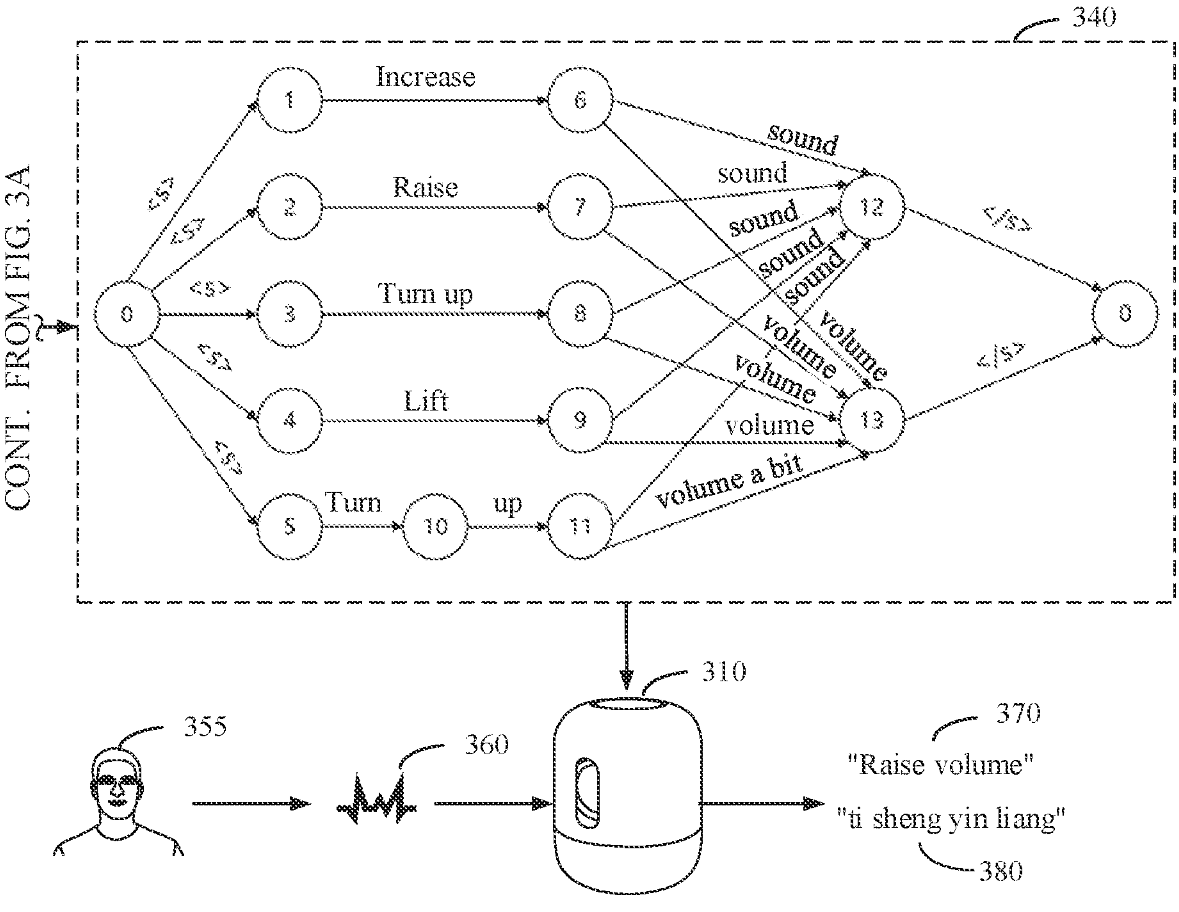
Figure 4A:
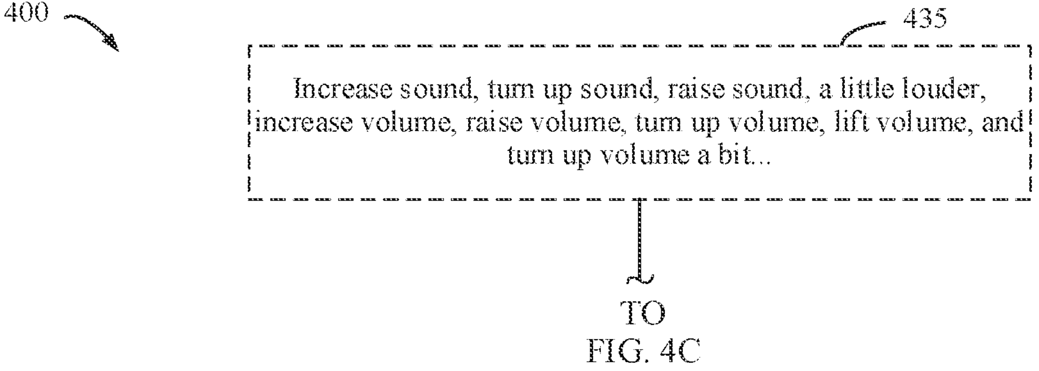
FIG. 4A to FIG. 4D are a schematic block diagram of still another example environment in which embodiments of this disclosure can be implemented.
Figure 4B:
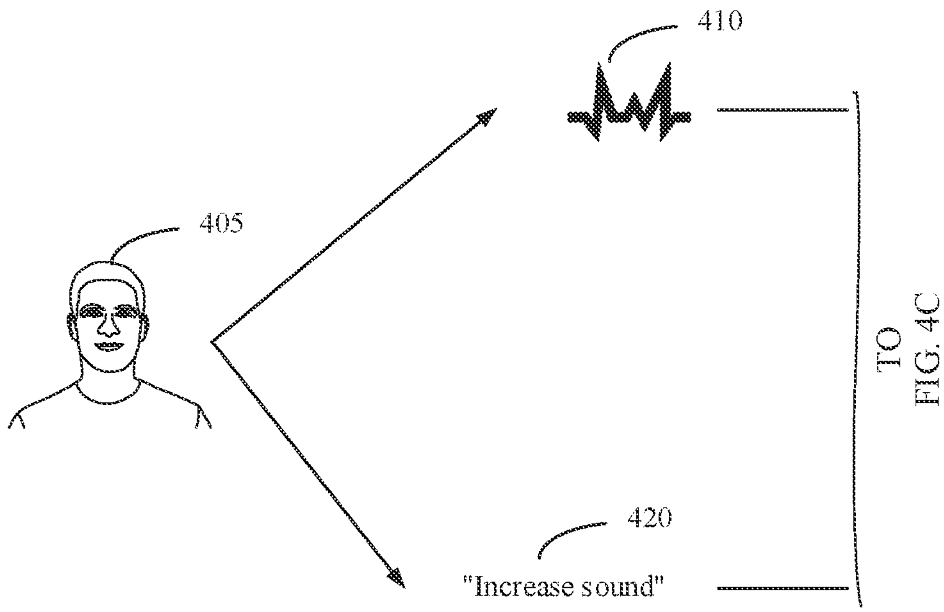
Figure 4C:
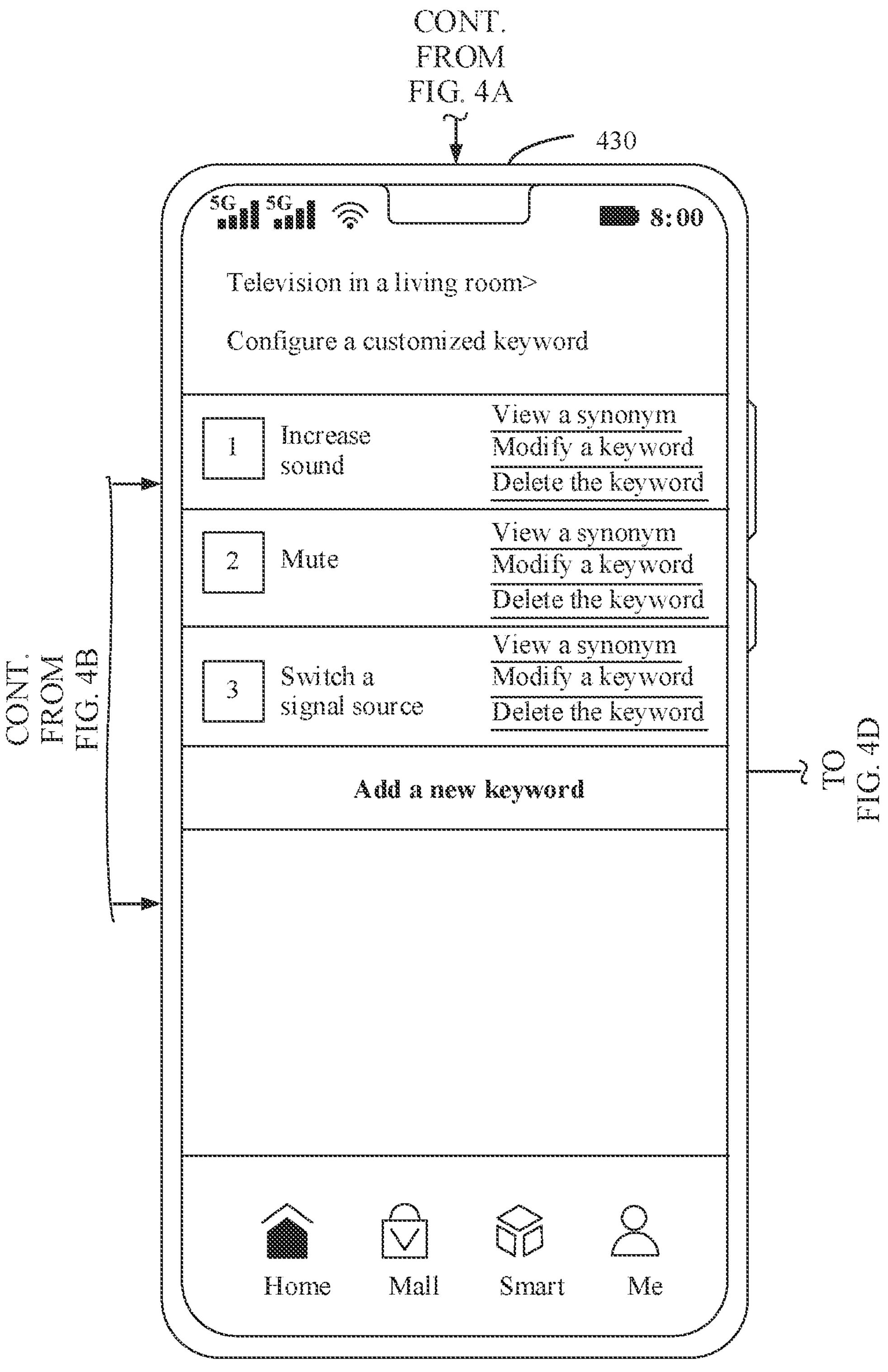
Figure 4D:
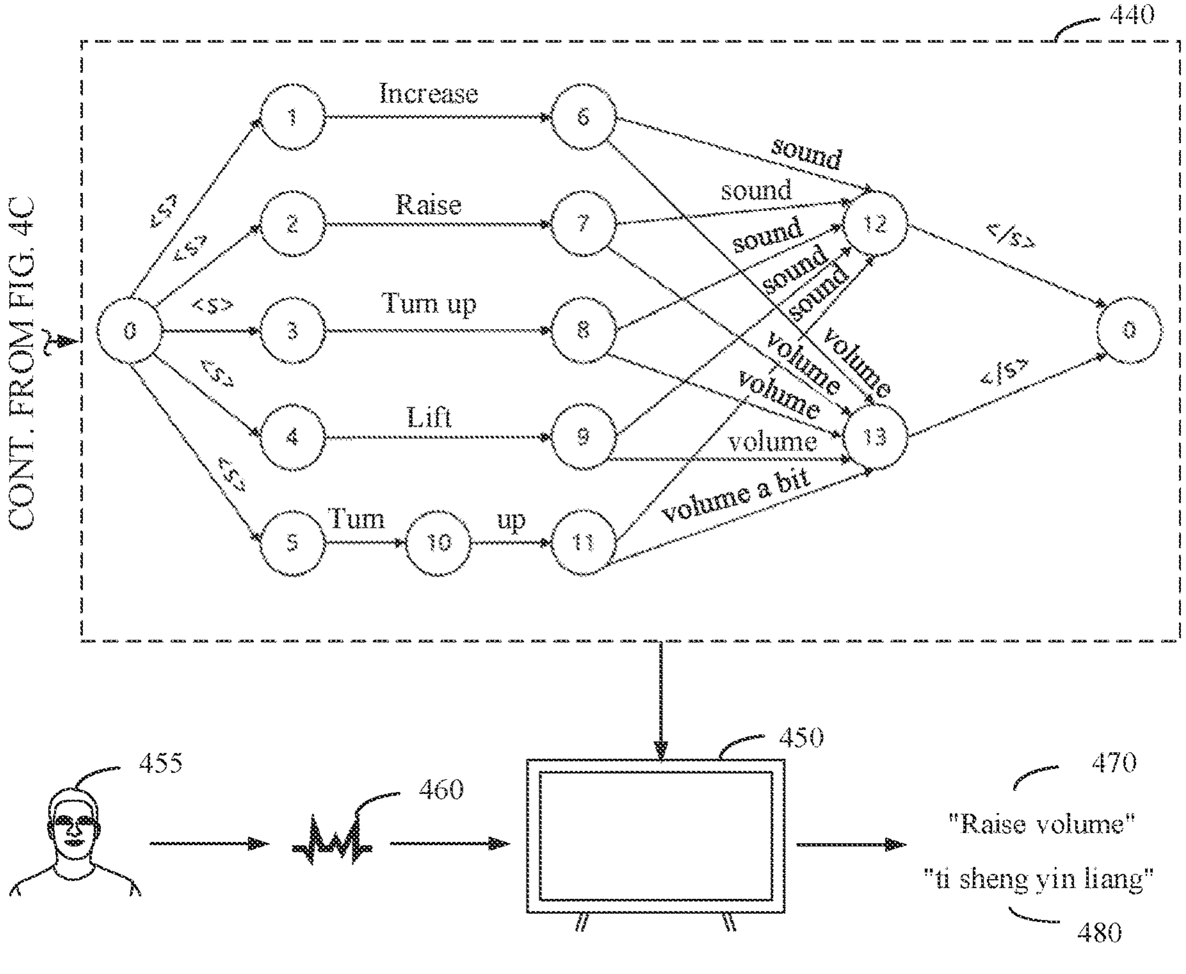

FIG. 3A and FIG. 3B are a schematic diagram of an example environment 300 in which a plurality of embodiments of this disclosure can be implemented. As shown in FIG. 3A and FIG. 3B, the environment 300 includes a first computing device 330. In the example in FIG. 3A and FIG. 3B, for example, such a first computing device 330 may include a cloud-side device.

Unlike the environment 100 shown in FIG. 1A to FIG. 1D, for example, a user 305 may directly provide a speech input 320 for a second computing device 310 to be configured, to configure a customized keyword that the second computing device 310 is expected to be capable of recognizing through speech. In the example in FIG. 3A and FIG. 3B, the second computing device 310 is shown as a smart speaker. It should be understood that the smart speaker is merely an example of the second computing device 310, and the second computing device 310 may further include another appropriate device, for example, a smart home device (for example, an air conditioner, a refrigerator, a washing machine, or a television), an intelligent wearable device (for example, a band, a watch, or glasses), a vehicle-mounted device, or the like.

Correspondingly, for example, the speech input 320 may be sent to the first computing device 330 through a wired or wireless network. For example, the first computing device 330 may use an appropriate speech recognition technology and a pre-specified syntax rule to extract a keyword "increase sound" or phoneme sequence representation "ti gao sheng yin" from the speech input 320.

Similar to the process discussed with reference to FIG. 1A to FIG. 1D, the first computing device 330 may obtain a target keyword including "increase sound" and may further obtain a synonym group 335 semantically associated with the target keyword. The first computing device 330 may further use the target keyword and the synonym group 335 to obtain a speech recognition model 340.

The first computing device 330 may also obtain a target language input including "ti gao sheng yin" and may further obtain a synonymous phoneme sequence group (not shown in the figure) associated with the target language input. The first computing device 330 may further use the synonymous phoneme sequence group to obtain the speech recognition model 340.

In some embodiments, the speech recognition model 340 may be further deployed on the smart speaker, so that the smart speaker has a capability to perform speech recognition on a keyword "increase volume" defined by the user 305 and a corresponding synonym group. For example, a user 355 (which may be a user the same as or different from the user 305) may provide a speech input 360, for example, "raise volume" for the smart speaker. Correspondingly, the smart speaker can use the speech recognition model 340 to process the speech input 360 and determine text representation 370, that is, "raise volume" corresponding to the speech input 360, or determine phoneme sequence representation 380, that is, "ti sheng yin liang" corresponding to the speech input 360.

It should be understood that the text representation 370 may be text corresponding to all speech segments of the speech input 360, or the text representation 370 may be text corresponding to some speech segments of the speech input 360. For example, the user 355 may input "please raise volume" through speech. Correspondingly, the smart speaker can recognize, by using the speech recognition model 340, a keyword "raise volume" included thereof. In some embodiments, the speech input 360 received by the smart speaker may correspond to a customized keyword, for example, "increase sound" configured by the user 305, or may correspond to a synonym, for example, "raise volume" automatically determined by the first computing device 330. In some embodiments, the smart speaker may further perform, according to a preconfigured rule, an action corresponding to the text representation 370.

Similarly, the phoneme sequence representation 380 may be a phoneme sequence corresponding to all the speech segments of the speech input 360, or the phoneme sequence representation 380 may be text corresponding to some of the speech segments of the speech input 360. For example, the user 355 may input "qing ti sheng yin liang" (please raise volume) through speech. Correspondingly, the smart speaker can recognize, by using the speech recognition model 340, a phoneme sequence "ti sheng yin liang" (raise volume) included thereof.

In some embodiments, the speech input 360 received by the smart speaker may correspond to a customized phoneme sequence, for example, "ti gao sheng yin" (increase sound) configured by the user 305, or may correspond to a synonymous phoneme sequence, for example, "ti sheng yin liang" (raise volume) automatically determined by the first computing device 330. In some embodiments, the smart speaker may further perform, according to the preconfigured rule, an action corresponding to the phoneme sequence representation 380.

Example Environment 3

FIG. 4A to FIG. 4D are a schematic diagram of still another example environment 400 in which a plurality of embodiments of this disclosure can be implemented. As shown in FIG. 4A to FIG. 4D, the environment 400 includes a first computing device 430. In the example in FIG. 4A to FIG. 4D, for example, the first computing device 430 may be a user terminal, for example, a smartphone or a tablet computer.

Unlike the environment 100 shown in FIG. 1A to FIG. 1D, for example, a user 405 may configure a second computing device 450 through an interface provided by the user terminal. In FIG. 4A to FIG. 4D, the second computing device 450 is shown as a smart television. It should be understood that the smart television is merely an example of the second computing device 450, and the second computing device 450 may further include another appropriate device, for example, a smart home device (for example, an air conditioner, a refrigerator, a washing machine, or a speaker), an intelligent wearable device (for example, a band, a watch, or glasses), a vehicle-mounted device, or the like.

Unlike the process 100 discussed with reference to FIG. 1A to FIG. 1D, in the environment 400 of FIG. 4A to FIG. 4D, a keyword "increase sound" or a corresponding phoneme sequence may be determined directly by the user terminal from a speech input 410 or a text input 420, and the speech input 410 or the text input 420 does not need to be sent to a cloud-side device.

Further, the user terminal may further obtain a target keyword. For example, such a target keyword may include a keyword determined based on the speech input 410 or the text input 420, and may further include a keyword previously defined by the user. The user terminal may further obtain a synonym group 435 semantically associated with the target keyword, and obtain a speech recognition model 440 based on a process similar to that of FIG. 1A to FIG. 1D.

Similarly, the user terminal may further obtain target language information (for example, text or speech). For example, such target language information may include a phoneme sequence determined based on the speech input 410 or the text input 420, and may further include a phoneme sequence previously defined by the user. The user terminal may further obtain a synonymous phoneme sequence (not shown in the figure) associated with the target language information, and obtain the speech recognition model 440 based on a process similar to that of FIG. 1A to FIG. 1D.

In some embodiments, the speech recognition model 440 obtained based on the target keyword and the synonym group 435 may be deployed on a smart television specified by the user 405.

After the speech recognition model 440 is deployed on the smart television, the smart television can support semantic recognition for the target keyword and the associated synonym group 435. For example, a user 455 (which may be a user the same as or different from the user 405) may provide a speech input 460, for example, "raise volume" for the smart television. Correspondingly, the smart television can use the speech recognition model 440 to process the speech input 460 and determine text representation 470, that is, "raise volume" corresponding to the speech input 460.

It should be understood that the text representation 470 may be text corresponding to all speech segments of the speech input 460, or the text representation 470 may be text corresponding to some speech segments of the speech input 460. For example, the user 455 may input "please raise volume" through speech. Correspondingly, the smart television can recognize, by using the speech recognition model 440, a keyword "raise volume" included thereof.

In some embodiments, the speech input 460 received by the smart television may correspond to a customized keyword, for example, "increase sound" configured by the user 405, or may correspond to a synonym, for example. "raise volume" automatically determined by the first computing device 430.

In some embodiments, the smart television may perform, according to a preconfigured rule, an action corresponding to the text representation 470. For example, the user 405 has previously configured a corresponding execution action as "increase television volume". This may enable the smart television to perform the action of "increasing television volume" after recognizing the keyword "raising volume".

In some embodiments, for example, the text representation 470 may further trigger another device different from the smart television to perform a corresponding action. For example, the user may also configure the corresponding execution action as "increase volume of a speaker in the living room". Correspondingly, when recognizing "raise volume", the smart television may send a command to the "speaker in the living room" to increase speaker volume.

In some other embodiments, the speech recognition model 440 obtained by using the synonymous phoneme sequence group may be deployed on the smart television specified by the user 405.

After the speech recognition model 440 is deployed on the smart television, the smart television can support the semantic recognition for the synonymous phoneme sequence group. For example, the user 455 (which may be the user the same as or different from the user 405) may provide the speech input 460, for example, "ti sheng yin liang" (raise volume) for the smart television. Correspondingly, the smart television can use the speech recognition model 440 to process the speech input 460 and determine phoneme sequence representation 480, that is, "ti sheng yin liang" corresponding to the speech input 460.

It should be understood that the phoneme sequence representation 480 may be text corresponding to all speech segments of the speech input 460, or the phoneme sequence representation 480 may be text corresponding to some speech segments of the speech input 460. For example, the user 455 may input "qing ti sheng yin liang" (please raise volume) through speech. Correspondingly, the smart television can recognize, by using the speech recognition model 440, a phoneme sequence "ti sheng yin liang" included thereof.

In some embodiments, the speech input 460 received by the smart television may correspond to a customized phoneme sequence, for example, "ti gao sheng yin" (increase sound) configured by the user 405, or may correspond to a synonymous phoneme sequence, for example, "ti sheng yin liang" (raise volume) automatically determined by the first computing device 430.

In some embodiments, the smart television may perform, according to the preconfigured rule, an action corresponding to the phoneme sequence representation 480. For example, the user 405 has previously configured a corresponding execution action as "increase television volume". This may enable the smart television to perform the action of "increasing television volume" after recognizing the phoneme sequence "ti sheng yin liang" (raise volume).

In some embodiments, for example, the phoneme sequence representation 480 may further trigger another device different from the smart television to perform a corresponding action. For example, the user may also configure the corresponding execution action as "increase volume of a speaker in the living room". Correspondingly, after recognizing "ti sheng yin liang", the smart television may send a command to the "speaker in the living room" to increase speaker volume.

Construction of Speech Recognition Model

According to embodiments of this disclosure, a solution for constructing a speech recognition model is provided. The solution constructs the speech recognition model based on a keyword. In embodiments of this disclosure, a target keyword is obtained, and a synonym group semantically associated with the target keyword is determined. Then, a language model is trained based on the target keyword and the synonym group, to obtain a target language model. The target language model, an acoustic model, and a pronunciation dictionary are combined to obtain the speech recognition model, where the speech recognition model is a decoding graph. In this way, according to embodiments of this disclosure, a speech recognition model with a keyword generalization recognition capability can be constructed.

Figure 5:
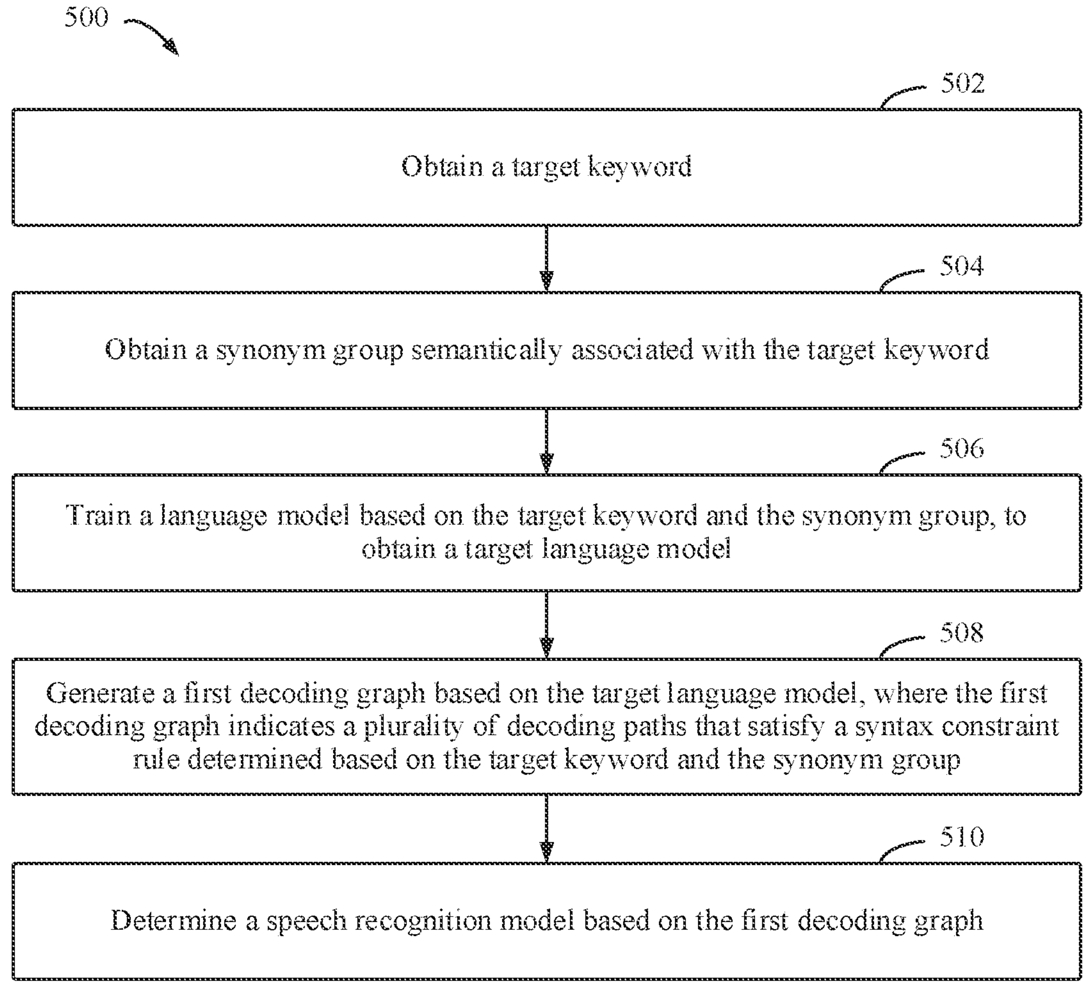
FIG. 5 is a flowchart of a process for constructing a speech recognition model according to some embodiments of this disclosure.

The following describes a process of speech processing according to some embodiments of this disclosure with reference to FIG. 5 to FIG. 11. FIG. 5 is a flowchart of an example process 500 of speech processing according to some embodiments of this disclosure. For example, the process 500 may be performed by the first computing device as discussed above, such as the first computing device 130 in FIG. 1A to FIG. 1D, the first computing device 330 in FIG. 3A and FIG. 3B, or the first computing device 430 in FIG. 3A and FIG. 3B. For example, the process 500 may also collaboratively be performed by a terminal device and a cloud-side device. For ease of description, the following describes the process 500 by using the first computing device as an example.

As shown in FIG. 5, in block 502, a first computing device obtains a target keyword.

Figure 6:
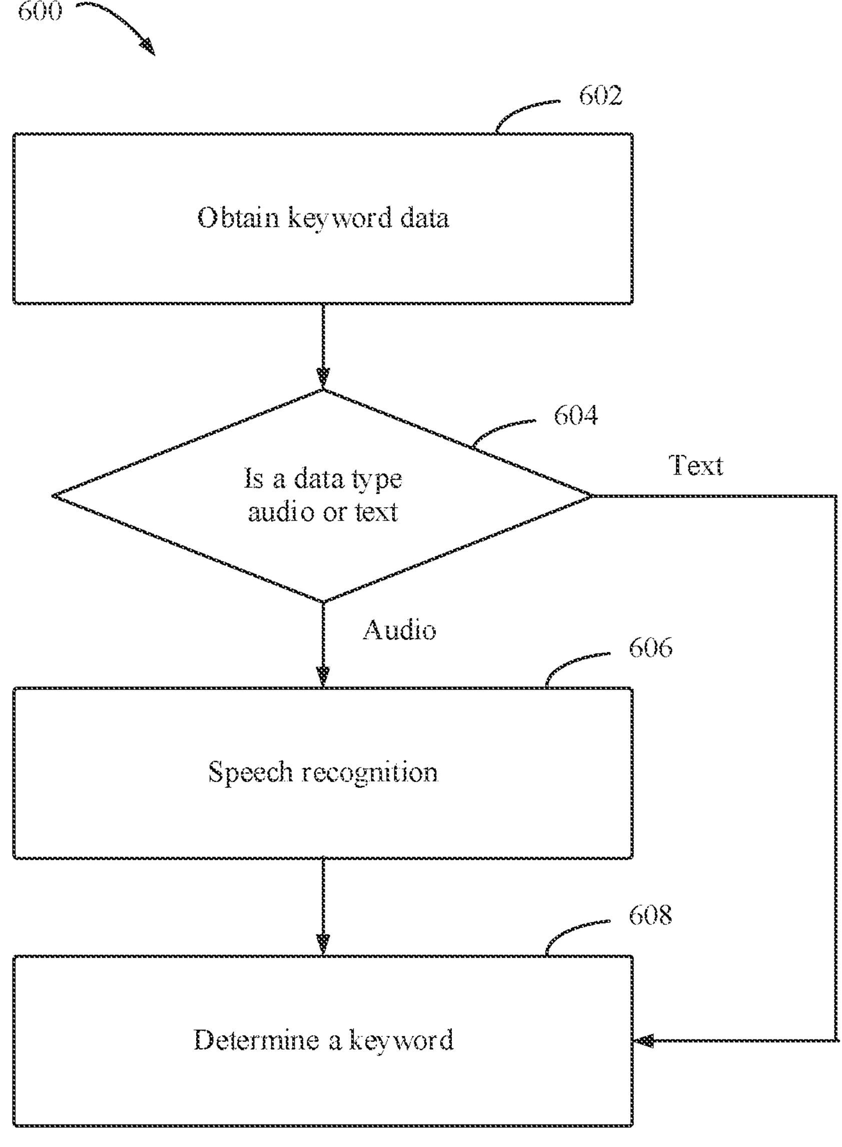
FIG. 6 is a flowchart of an example process for obtaining a target keyword according to some embodiments of this disclosure.

Refer to the content discussed above. The target keyword may include a keyword input by a user. In some embodiments, the first computing device may determine, from different types of data (for example, text data or audio data), the keyword input by the user. The following describes a detailed process of determining the keyword input by the user with reference to FIG. 6. FIG. 6 is a flowchart of an example process 600 for determining a keyword according to an embodiment of this disclosure.

As shown in FIG. 6, in block 602, the first computing device may obtain target keyword data. In some embodiments, the first computing device may obtain a speech input from an audio collector. In the example in FIG. 1A to FIG. 1D, the first computing device 130 may obtain the speech input 115 from the user terminal 110. In the example in FIG. 3A and FIG. 3B, for example, the first computing device 130 may obtain the speech input 320 from the second computing device 310 to which a speech recognition model is to be deployed. In the example in FIG. 4A to FIG. 4D, the first computing device 430 may be the terminal device, which may use a speech collector (for example, a microphone) to directly obtain the speech input 410.

Alternatively or additionally, the first computing device may also obtain a text input through a text collector. In the example in FIG. 1A to FIG. 1D, the first computing device 130 may obtain the text input 120 from the user terminal 110. In the example in FIG. 4A to FIG. 4D, the first computing device 430 may be the terminal device, which may use a text collector (for example, a touchscreen) to directly obtain the text input 420.

In block 604, the first computing device may determine whether a type of the keyword data is an audio or text. If the type is the text, the process 600 may proceed to block 608 in which the first computing device may determine a keyword directly from the text input, for example.

If it is determined in block 604 that the type of the target keyword data is the audio, the process 600 may proceed to block 606, that is, for example, the first computing device may use an ASR (automatic speech recognition) to recognize the speech input. Correspondingly, the speech input may be converted into corresponding text. Further, in block 608, the first computing device may determine, based on the text of the speech input 110, the keyword input by a user.

Alternatively or additionally, the target keyword may further include a pre-stored historical keyword. For example, such a historical keyword may include a default system keyword. For example, the system keyword may be specified by a manufacturer of a second computing device. Alternatively, the pre-stored historical keyword may further include a historical keyword customized by the user, for example, the keyword "reduce sound" shown in FIG. 2B.

In some embodiments, to avoid that a generated speech recognition model is too complex, the first computing device may further limit a quantity of keywords in a keyword group used for training a language model.

After determining the keyword input by the user, the first computing device may determine to obtain a first keyword group based on the keyword input by the user and the pre-stored historical keyword. If a quantity of keywords in the first keyword group exceeds a predetermined threshold, the first computing device obtains the target keyword from the first keyword group based on the predetermined threshold. For example, the first computing device may retain only a predetermined threshold quantity of keywords in the first keyword group as the target keyword. Based on this manner, it can be avoided that the quantity of keywords used for training the language model is too large, thereby ensuring that a decoding graph is lightweight, and can be applied to a device with few computing resources.

In some embodiments, the first computing device may obtain the target keyword from the first keyword group based on an attribute of a keyword in the target keyword, where a quantity of target keywords is the predetermined threshold. For example, such an attribute may include a keyword type (for example, created by the system or customized by the user) or keyword creation time. For example, the predetermined threshold quantity of keywords may be retained from the first keyword group based on the keyword creation time, so that a keyword whose creation time is the earliest is deleted.

Alternatively, when the target keyword includes default system keywords, these system keywords may always be used as the target keyword. Correspondingly, the first computing device may further select, based on a difference between the predetermined threshold and a quantity of system key words, one or more keywords from keywords customized by the user, to use the one or more keywords as the target keyword.

Alternatively, the pre-stored historical keyword may include only the keyword customized by the user. Correspondingly, the predetermined threshold may be used to limit a quantity of user-customized keywords supported by the speech recognition model. In this way, if the first keyword group already includes a predetermined quantity of user-customized keywords, for example, the first computing device may select a predetermined threshold quantity of user-customized keywords from the first keyword group as the target keyword.

In some embodiments, the first computing device may obtain the target keyword from the first keyword group based on a user input. FIG. 2B is used as an example. For example, the first computing device may allow the user to configure a maximum of three customized keywords. After the three customized keywords have been configured, if the user further expects to add a new customized keyword, the user terminal may require the user to select, from the three customized keywords that have been configured, which keywords should be retained/deleted, to ensure that the quantity of target keywords used for training is the predetermined threshold.

Based on this manner, embodiments of this disclosure can support personalized customization of the speech recognition model deployed on the second computing device.

Still refer to FIG. 5, in block 504, the first computing device obtains a synonym group semantically associated with the target keyword. For a received new keyword, the first computing device may determine the synonym group from the lexicon based on semantics of the keyword. In some embodiments, the lexicon may be maintained locally at the first computing device, or may be maintained at a remote device that is different from the first computing device. For the pre-stored historical keyword, for example, the first computing device may directly obtain a previously stored synonym group, without re-determining the synonym group from the lexicon.

Figure 7:
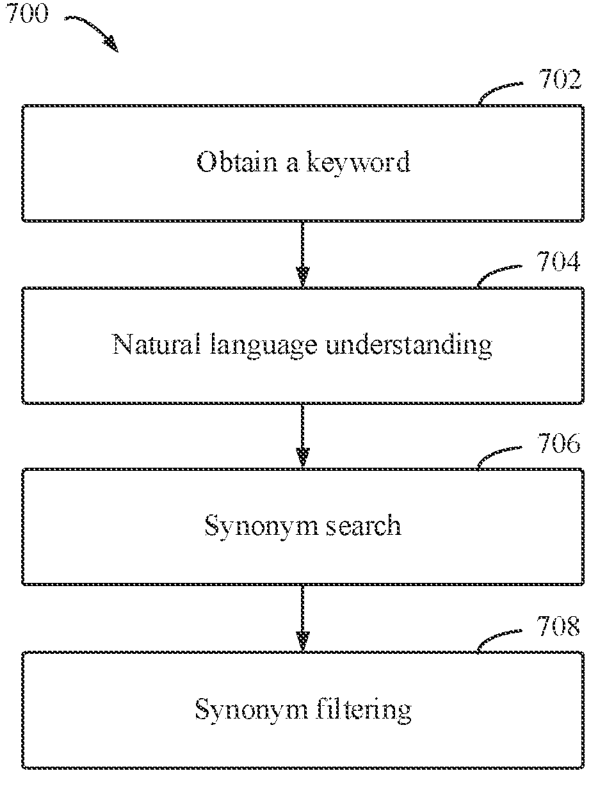
FIG. 7 is a flowchart of an example process for determining a synonym group according to some embodiments of this disclosure.

The following describes a detailed process of determining the synonym group with reference to FIG. 7. FIG. 7 is a flowchart of an example process 700 for determining a synonym group according to an embodiment of this disclosure.

As shown in FIG. 7, in block 702, the first computing device may obtain a keyword. In block 704, for example, the first computing device may use a natural language understanding technology to determine first semantics of the target keyword. In block 706, the first computing device may search the lexicon for a plurality of candidate synonyms similar to the first semantics based on the first semantics. Specifically, a difference between semantics of each determined candidate synonym and the first semantics is less than a predetermined difference threshold.

In some embodiments, the plurality of candidate synonyms may be directly determined as a synonym group for training the language model.

In some embodiments, the process 700 may also include block 708 in which the first computing device may filter the plurality of candidate synonyms. In some embodiments, the first computing device may perform filtering based on a length difference between the candidate synonym and the target keyword, so that a length difference between each synonym in the determined synonym group and the keyword is less than a length threshold.

For example, the first computing device may determine only candidate synonyms that are in the plurality of candidate synonyms and have a same length as the target keyword as the synonym group to be used for training. Based on this manner, the generated decoding graph can have a simpler structure, and is more suitable for deployment on the second computing device with a low computing capability.

In some embodiments, the first computing device may further provide a plurality of candidate synonyms for the user; and determine the synonym group from the plurality of candidate synonyms based on a user input received from the user, where the user input indicates that at least one candidate synonym in the plurality of candidate synonyms is excluded or confirmed.

For example, the first computing device may provide the plurality of candidate synonyms for the user, for example, in an appropriate manner (for example, voice broadcast or screen display), and receive feedback information of the user for the plurality of candidate synonyms. For example, such feedback information may indicate that at least one candidate synonym is confirmed or at least one candidate synonym is excluded. For example, the user may determine, by performing a tap operation on the screen on the displayed plurality of candidate synonyms, a synonym that should be retained or excluded and that is in the plurality of candidate synonyms. Alternatively, the user indicates, through a speech input, a candidate synonym that should be retained or excluded and that is the plurality of candidate words.

Based on this manner, in this embodiment of this disclosure, the synonym group used for training the speech recognition model can be adjusted based on the user feedback, so that the obtained speech recognition model can better conform to a usage habit of the user, and automatic extension of some synonyms that are not expected by the user can be avoided.

In some embodiments, to avoid that the constructed speech recognition model is too complex, the first computing device may further enable a quantity of synonyms included in the synonym group 135 to not exceed a predetermined quantity. Correspondingly, when a quantity of a plurality of candidate synonyms exceeds the predetermined quantity, for example, the first computing device may select, as the synonym group 135, candidate synonyms that are the most semantically similar and that are of the predetermined quantity.

Still refer to FIG. 5. In block 506, the first computing device trains the training model based on the target keyword and the synonym group, to obtain a target language model.

Figure 8:
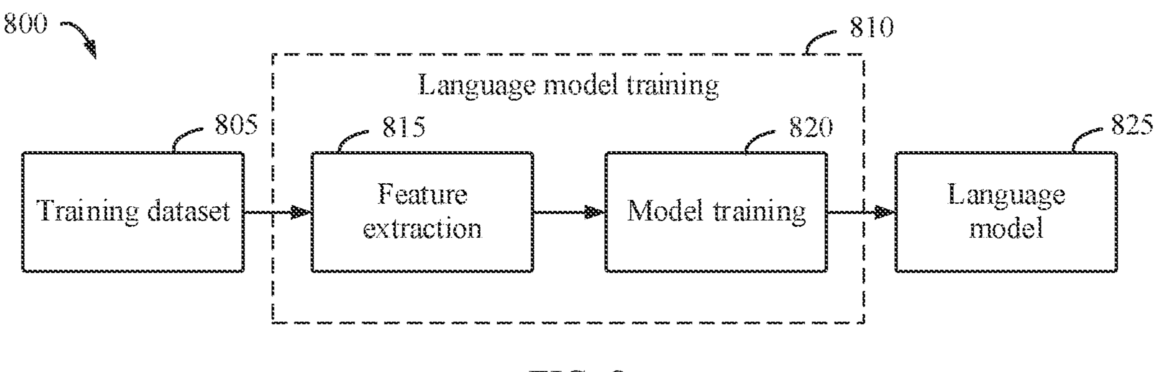
FIG. 8 is a flowchart of an example process for training a language model according to some embodiments of this disclosure.

Specifically, the first computing device may construct, based on the target keyword and the synonym group, a training dataset used to train the language model, and obtain the target language model based on the training dataset. FIG. 8 is a flowchart 800 of an example process for training a language model according to some embodiments of this disclosure.

As shown in FIG. 8, a training dataset 805 constructed based on the target keyword and the synonym group may be provided for a language model training module 810. Specifically, the language model training module 810 may include a feature extraction module 815, configured to: generate an input feature based on the training dataset 805, and provide the input feature for a model training module 820, to obtain a target language model 825. The target language model 825 can indicate a syntax constraint rule determined based on the target keyword and the synonym group.

Examples of the target language model 825 include, but are not limited to, an N-gram model based on an N-gram syntax, an RNN-LM model based on a neural network, a JSGF model based on a regular syntax, and the like. This disclosure is not intended to limit a specific type of the language model.

Still refer to FIG. 5. In block 508, the first computing device generates a first decoding graph based on the target language model, where the first decoding graph indicates a plurality of decoding paths that satisfy a syntax constraint rule determined based on the target keyword and the synonym group.

Model combination is performed on the target language model, an acoustic model, and a pronunciation dictionary, to obtain the speech recognition model, where the speech recognition model is a decoding graph.

In some embodiments, after generating the target language model 525, the first computing device may generate the decoding graph based on the target language model 525 and the existing pronunciation dictionary and acoustic model. In some embodiments, the acoustic model may be trained offline or online. The acoustic model may also use a plurality of model structures such as DNN-HMM, LSTM-HMM, and TDNN-HMM. This disclosure is not intended to limit a type or a training process of the acoustic model.

Figure 9:
FIG. 9 is a schematic diagram of generating a decoding graph according to some embodiments of this disclosure.
Figure 9:
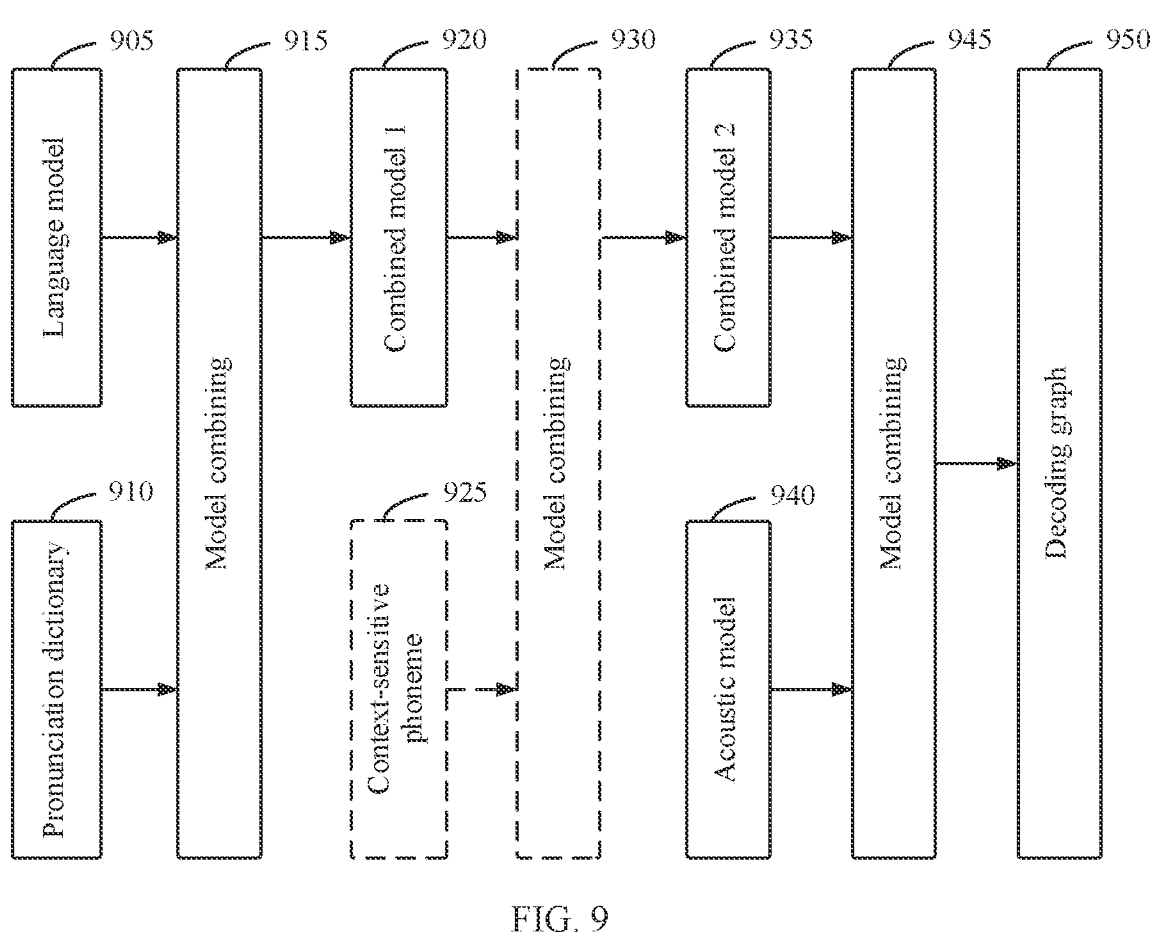

In some embodiments, for example, the first computing device generates the decoding graph based on an HCLG (HMM+Context+Lexicon+Grammar) decoding graph construction process. FIG. 9 is a schematic diagram 900 of an example process for generating a decoding graph according to an embodiment of this disclosure.

As shown in FIG. 9, the first computing device first combines a target language model 905 (for example, the target language model 825 in FIG. 8) with a pronunciation dictionary 910 by using a model combining unit 915, to generate a combined model 1 920.

Optionally, if an acoustic model 940 is trained with a single phoneme, the first computing device may directly combine the combined model 1 90920 with the acoustic model 940, regardless of a context-sensitive phoneme. On the contrary, if the acoustic model 940 considers context of a phoneme during training, for example, the acoustic model 940 is trained with a plurality of phonemes, the first computing device may first combine the combined model 1 920 with a context-sensitive phoneme 925 by using a model combining unit 930, to generate a combined model 2 935, and then combine the combined model 2 935 with the acoustic model 940 by using a model combining unit 945, to generate a decoding graph 950. The decoding graph 950, also referred to as an HCLG decoding model, is used to indicate the plurality of decoding paths of the syntax constraint rule determined based on the target keyword and the synonym group.

Still refer to FIG. 5. In block 510, the first computing device determines the speech recognition model based on the first decoding graph.

In some embodiments, the first computing device may directly use the decoding graph 950 as a final speech recognition model.

Figures 10, 11:
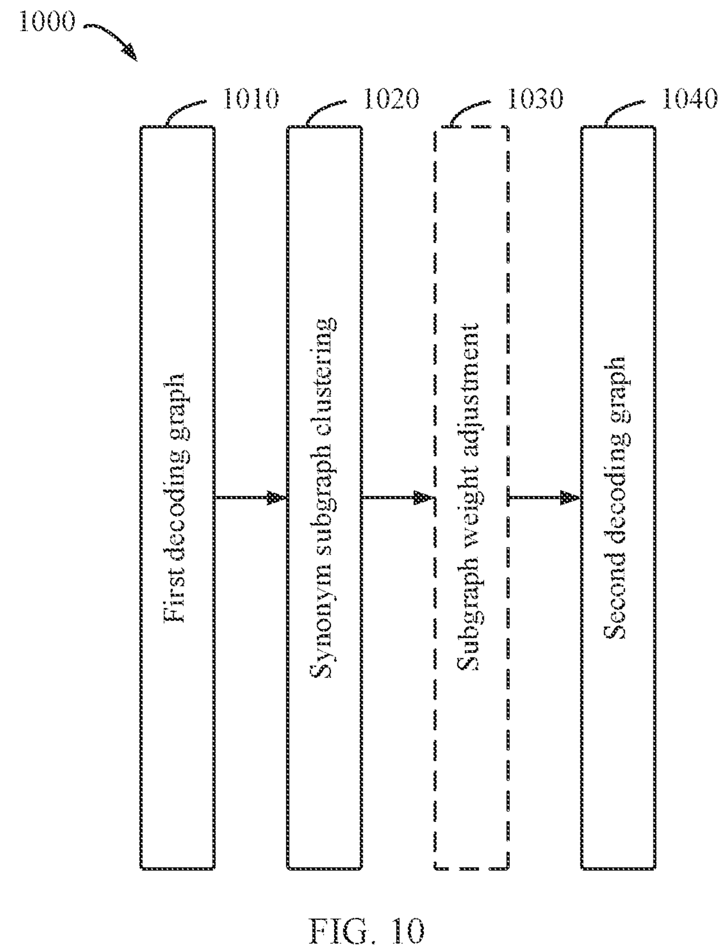
FIG. 10 is a schematic diagram of performing subgraph clustering on a decoding graph according to some embodiments of this disclosure.
FIG. 11 is a schematic diagram of an example subgraph according to some embodiments of this disclosure.

In some embodiments, for example, the target keyword may at least include a first keyword and a second keyword. To reduce efficiency of decoding search of the decoding graph, the first computing device may further perform synonym clustering on the obtained decoding graph. FIG. 10 is a schematic diagram 1000 of an example process for performing synonym clustering according to an embodiment of this disclosure.

As shown in FIG. 10, the first computing device may use a synonym subgraph clustering module 1020 to perform synonym clustering on a first decoding graph 1010 (for example, the decoding graph 950 in FIG. 9). Specifically, the first computing device may obtain a first group of decoding paths and a second decoding path from the first decoding graph, where the obtained first group of decoding paths includes a decoding path corresponding to the first keyword and a first synonym group semantically associated with the first keyword, and the second group of decoding paths includes a decoding path corresponding to the second keyword and a second synonym group semantically associated with the second keyword. Further, the first computing device may generate a first subgraph based on the first group of decoding paths and a second subgraph based on the second group of decoding paths. FIG. 11 is a schematic diagram of an example subgraph 1100) according to some embodiments of this disclosure. As shown in FIG. 11, the subgraph 1100 includes a decoding path corresponding to a keyword "increase sound" and a synonym group.

Further, the first computing device may determine the speech recognition model at least based on the first subgraph and the second subgraph. Specifically, for example, the first computing device may generate a second decoding graph based on the first subgraph and the second subgraph and use the second decoding graph as the speech recognition model. As shown in FIG. 10, in some embodiments, the decoding graph obtained after the subgraph clustering may be directly used as a second decoding graph 1040 and used as the final speech recognition model. When the target keyword includes a plurality of keywords, the generated second decoding graph 1040 may include a plurality of independent subgraphs corresponding to the plurality of keywords.

Alternatively, the first computing device may further use a subgraph weight adjustment module 1030 to perform subgraph weight adjustment on the decoding graph obtained after the subgraph clustering. Specifically, the first computing device enables a first decoding path corresponding to the target keyword to have a same weight as a second decoding path corresponding to the synonym in the synonym group, to obtain the final decoding graph 1040. FIG. 11 is used as an example. A decoding path corresponding to a target keyword "increase sound" has a same weight as a decoding path corresponding to a synonym "raise volume". Based on this manner, faster decoding search for the extended synonym can be implemented, thereby reducing computing overheads and storage overheads.

Based on the method discussed above, the first computing device can automatically extend the associated synonym group based on the target keyword and construct the decoding graph for the second computing device. In this way, the generated decoding graph can not only meet a lightweight requirement, but also enable the second computing device to have a keyword generalization recognition capability.

In some embodiments, the first computing device may further indicate to provide the speech recognition model for a target computing device (for example, the second computing device) for deployment of the speech recognition model on the target computing device. For example, the first computing device may send the speech recognition model to the second computing device through wired or wireless communication for deployment of the speech recognition model on the second computing device. Alternatively, the first computing device may further store the model in a predetermined storage device, so that the second computing device can automatically obtain the speech recognition model from the storage device for deployment.

According to embodiments of this disclosure, another solution for constructing a speech recognition model is provided. The solution constructs the speech recognition model based on a phoneme sequence. In embodiments of this disclosure, target language information is obtained, and a synonymous phoneme sequence group associated with the target language information is determined. Then, a language model is trained by using the synonymous phoneme sequence group, to obtain a target language model. The target language model may be combined with an acoustic model, to obtain the speech recognition model, where the speech recognition model is a decoding graph. In this way, according to embodiments of this disclosure, a speech recognition model with a phoneme sequence generalization recognition capability can be constructed.

Figure 12:
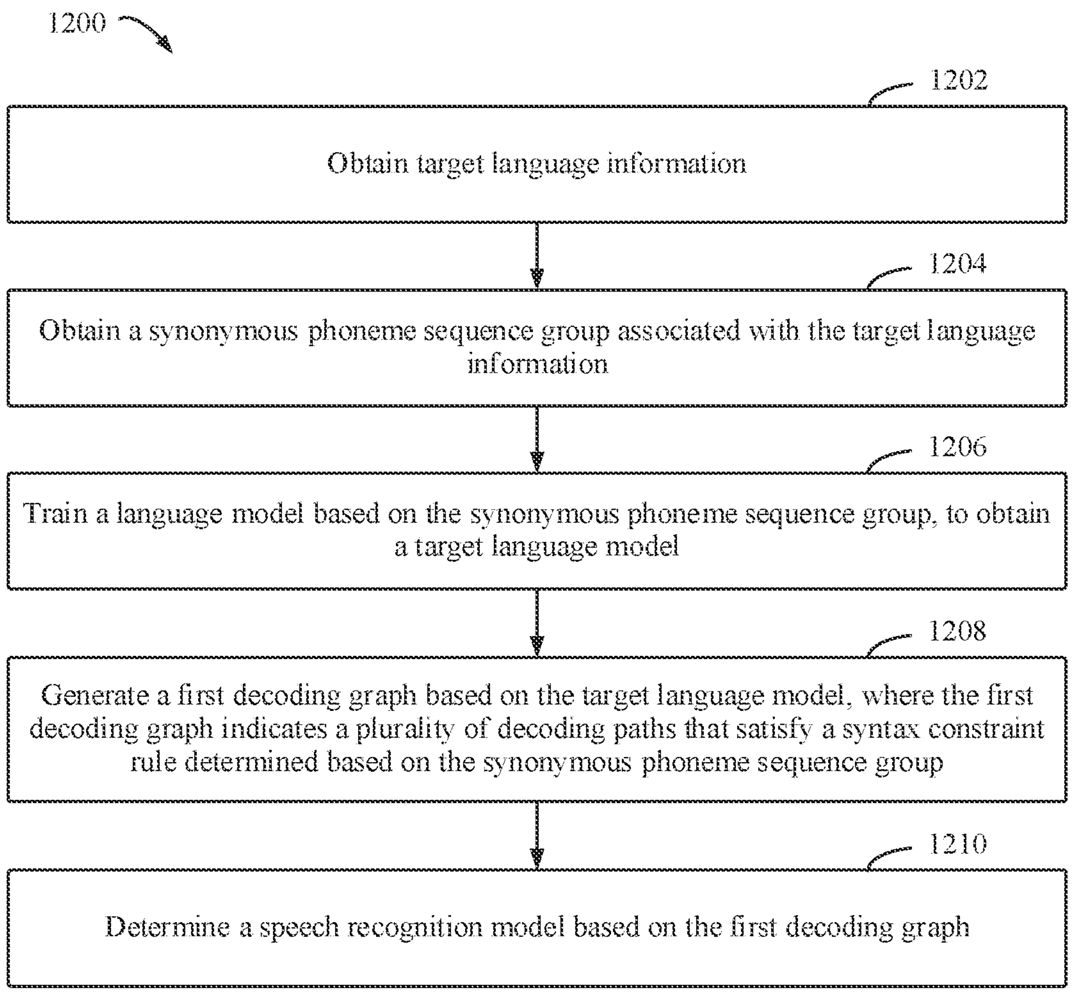
FIG. 12 is a flowchart of an example process of speech processing according to some embodiments of this disclosure.

The following describes a process of speech processing according to some embodiments of this disclosure with reference to FIG. 12 to FIG. 17. FIG. 12 is a flowchart of an example process 1200 of speech processing according to some embodiments of this disclosure. For example, the process 1200 may be performed by the first computing device as discussed above, such as the first computing device 130 in FIG. 1A to FIG. 1D, the first computing device 330 in FIG. 3A and FIG. 3B, or the first computing device 430 in FIG. 3A and FIG. 3B. For example, the process 1200 may also collaboratively be performed by a terminal device and a cloud-side device. For ease of description, the following describes the process 1200 by using the first computing device as an example.

As shown in FIG. 12, in block 1202, a first computing device obtains target language information. In some embodiments, the first computing device may determine, from different types of data (for example, text data or audio data), the target language information. The first computing device may obtain a speech input from an audio collector. In the example in FIG. 1A to FIG. 1D, the first computing device 130 may obtain the speech input 115 from the user terminal 110. In the example in FIG. 3A and FIG. 3B, for example, the first computing device 130 may obtain the speech input 320 from the second computing device 310 to which a speech recognition model is to be deployed. In the example in FIG. 4A to FIG. 4D, the first computing device 430 may be the terminal device, which may use a speech collector (for example, a microphone) to directly obtain the speech input 410.

Alternatively or additionally, the first computing device may also obtain a text input through a text collector. In the example in FIG. 1A to FIG. 1D, the first computing device 130 may obtain the text input 120 from the user terminal 110. In the example in FIG. 4A to FIG. 4D, the first computing device 430 may be the terminal device, which may use a text collector (for example, a touchscreen) to directly obtain the text input 420.

Alternatively or additionally, the target language information may further include pre-stored historical language information. The target language information may include speech or text. For example, the historical language information may include default system language information. For example, the system language information may be specified by a manufacturer of a second computing device. Alternatively, the pre-stored historical language information may further include historical language information customized by a user, for example, the speech or the text corresponding to "reduce sound" shown in FIG. 2B.

In some embodiments, to avoid that a generated speech recognition model is too complex, the first computing device may further limit a quantity of phoneme sequences in a synonymous phoneme sequence group used for training a language model.

After determining the target language information input by the user, the first computing device may determine to obtain a first language information group based on the target language information input by the user and the pre-stored historical language information. If a quantity of pieces of language information in the first language information group exceeds a predetermined threshold, the first computing device obtains the target language information from the first language information group based on the predetermined threshold. For example, the first computing device may retain only a predetermined threshold quantity of pieces of language information in the first language information group as the target phoneme sequence. Based on this manner, it can be avoided that a quantity of pieces of target language information used for training the language model is too large, thereby ensuring that a decoding graph is lightweight, and can be applied to a device with few computing resources.

In some embodiments, the first computing device may obtain the target language information from the first language information group based on an attribute of language information, where a quantity of pieces of target language information is the predetermined threshold. For example, such an attribute may include a language information type (for example, created by the system or customized by the user) or language information creation time. For example, the predetermined threshold quantity of pieces of language information may be retained from the first language information group based on the language information creation time, so that language information whose creation time is the earliest is deleted.

Alternatively, when the target language information includes the default system language information, the system language information may always be used as the target language information. Correspondingly, the first computing device may further select, based on a difference between the predetermined threshold and a quantity of pieces of system language information, one or more pieces of language information from language information customized by the user, to use the one or more pieces of language information as the target language information.

Alternatively, the pre-stored historical language information may include only the language information customized by the user. Correspondingly, the predetermined threshold may be used to limit a quantity of pieces of user-customized language information supported by the speech recognition model. In this way, if the first language information group already includes a predetermined quantity of pieces of user-customized language information, for example, the first computing device may select a predetermined threshold quantity of pieces of user-customized language information from the first language information group as the target language information.

In some embodiments, the first computing device may obtain the target language information from the first language information group based on a user input. FIG. 2B is used as an example. For example, the first computing device may allow the user to configure a maximum of three customized keywords. After the three customized keywords have been configured, if the user further expects to add a new customized keyword, the user terminal may require the user to select, from the three customized keywords that have been configured, which keywords should be retained/deleted. Phoneme sequences of the retained keyword and a synonym of the retained keyword can be used to train the target language model. In this manner, it can be ensured that the quantity of pieces of language information used for training is the predetermined threshold.

Based on this manner, embodiments of this disclosure can support personalized customization of the speech recognition model deployed on the second computing device.

Still refer to FIG. 12. In block 1204, the first computing device obtains a synonymous phoneme sequence group associated with the target language information. The synonymous phoneme sequence group includes at least one synonymous phoneme sequence. The at least one synonymous phoneme sequence is a phoneme sequence corresponding to a word semantically similar to the target language information.

The first computing device may determine the synonymous phoneme sequence group based on the semantics of the target language information, and determine the synonymous phoneme sequence group based on the semantics of the target language information. For example, target language information in a speech form may be mapped to a keyword by using a pronunciation dictionary, then a synonymous keyword is obtained from a lexicon, and then the synonymous keyword is mapped to a phoneme sequence by using the pronunciation dictionary. For target language information in a text form, a corresponding keyword may be directly obtained through word segmentation.

In some embodiments, the lexicon may be maintained locally at the first computing device, or may be maintained at a remote device that is different from the first computing device. For the pre-stored historical language information, for example, the first computing device may directly obtain a previously stored synonymous phoneme sequence group, without re-determining the synonymous phoneme sequence group.

Figure 13:
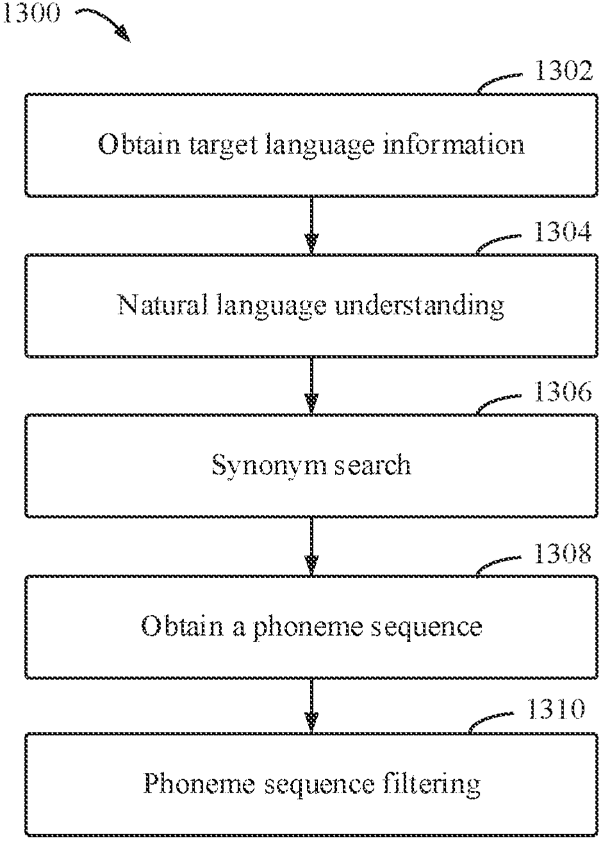
FIG. 13 is a flowchart of an example process for determining a synonymous phoneme sequence group according to an embodiment of this disclosure.

The following describes a detailed process of determining the synonymous phoneme sequence with reference to FIG. 13. FIG. 13 is a flowchart of an example process 1300 for determining a synonymous phoneme sequence group according to an embodiment of this disclosure.

As shown in FIG. 13, in block 1302, the first computing device may obtain target language information. In some embodiments, the target language information may be converted into a corresponding keyword. In block 1304, for example, the first computing device may use a natural language understanding technology to determine first semantics of the target language information. In block 1306, the first computing device may search for a plurality of candidate keywords similar to the first semantics based on the first semantics, for example, through the lexicon. Specifically, a difference between semantics of each determined candidate synonymous keyword and the first semantics is less than a predetermined difference threshold.

Then, in block 1308, for example, the first computing device may obtain phoneme sequences of the plurality of candidate keywords by using the pronunciation dictionary. In some embodiments, the phoneme sequences of the plurality of candidate keywords may be directly determined as the synonymous phoneme sequence group for training the language model.

In some embodiments, the process 1300 may also include block 1310 in which the first computing device may filter the phoneme sequences of the plurality of candidate synonymous keywords. In some embodiments, the first computing device may perform filtering based on a length difference between the phoneme sequence of the candidate synonymous keyword and a phoneme sequence of the target language information, so that a length difference between each synonymous phoneme sequence in the determined synonymous phoneme sequence group and the phoneme sequence of the target language information is less than a length threshold.

For example, the first computing device may determine only candidate synonymous phoneme sequences that are in the plurality of candidate synonymous phoneme sequences and have a same length as a target phoneme sequence as the synonymous phoneme sequence group to be used for training. Based on this manner, the generated decoding graph can have a simpler structure, and is more suitable for deployment on the second computing device with a low computing capability.

In some embodiments, the first computing device may further provide a plurality of candidate synonymous phoneme sequences or corresponding text for the user; and determine the synonymous phoneme sequence group from the plurality of candidate synonymous phoneme sequences based on a user input received from the user, where the user input indicates that at least one candidate synonymous phoneme sequence of the plurality of candidate synonymous phoneme sequences is excluded or confirmed.

For example, the first computing device may provide the plurality of candidate synonymous phoneme sequences for the user, for example, in an appropriate manner (for example, voice broadcast or screen display), and receive feedback information of the user for the plurality of candidate synonymous phoneme sequences. For example, such feedback information may indicate that at least one candidate synonymous phoneme sequence is confirmed or at least one candidate synonymous phoneme sequence is excluded. For example, the user may determine, by performing a tap operation on the screen on the displayed plurality of candidate synonymous phoneme sequences or the corresponding text, a synonymous phoneme sequence that should be retained or excluded and that is in the plurality of candidate synonymous phoneme sequences. Alternatively, the user indicates, through a speech input, a candidate synonymous phoneme sequence that should be retained or excluded and that is the plurality of candidate phoneme sequences.

Based on this manner, in this embodiment of this disclosure, the synonymous phoneme sequence used for training the speech recognition model can be adjusted based on the user feedback, so that the obtained speech recognition model can better conform to a usage habit of the user, and automatic extension of some synonymous phoneme sequences that are not expected by the user can be avoided.

In some embodiments, to avoid that the constructed speech recognition model is too complex, the first computing device may further enable a quantity of synonymous phoneme sequences included in the synonymous phoneme sequence group to not exceed a predetermined quantity. Correspondingly, when a quantity of a plurality of candidate synonymous phoneme sequences exceeds the predetermined quantity, for example, the first computing device may select, as the synonymous phoneme sequence group, candidate synonymous phoneme sequences that are the most semantically similar and that are of the predetermined quantity.

Still refer to FIG. 12. In block 1206, the first computing device trains the training model based on the synonymous phoneme sequence group, to obtain a target language model.

Specifically, the first computing device may construct, based on the synonymous phoneme sequence group, a training dataset used to train the language model, and obtain the target language model based on the training dataset. An example process of training the language model is similar to the process described with reference to FIG. 8. Details are not described herein again.

The target language model can indicate a syntax constraint rule determined based on the target keyword and the synonym group. Examples of the target language model include, but are not limited to, an N-gram model based on an N-gram syntax, an RNN-LM model based on a neural network, a JSGF model based on a regular syntax, and the like. This disclosure is not intended to limit a specific type of the language model.

Still refer to FIG. 12. In block 1208, the first computing device generates a first decoding graph based on the target language model, where the first decoding graph indicates a plurality of decoding paths that satisfy a syntax constraint rule determined based on the synonymous phoneme sequence group.

After generating the target language model, the first computing device may generate the decoding graph based on the target language model and the existing acoustic model. In some embodiments, the acoustic model may be trained offline or online. The acoustic model may also use a plurality of model structures such as DNN-HMM, LSTM-HMM, and TDNN-HMM. This disclosure is not intended to limit a type or a training process of the acoustic model.

Figure 14:
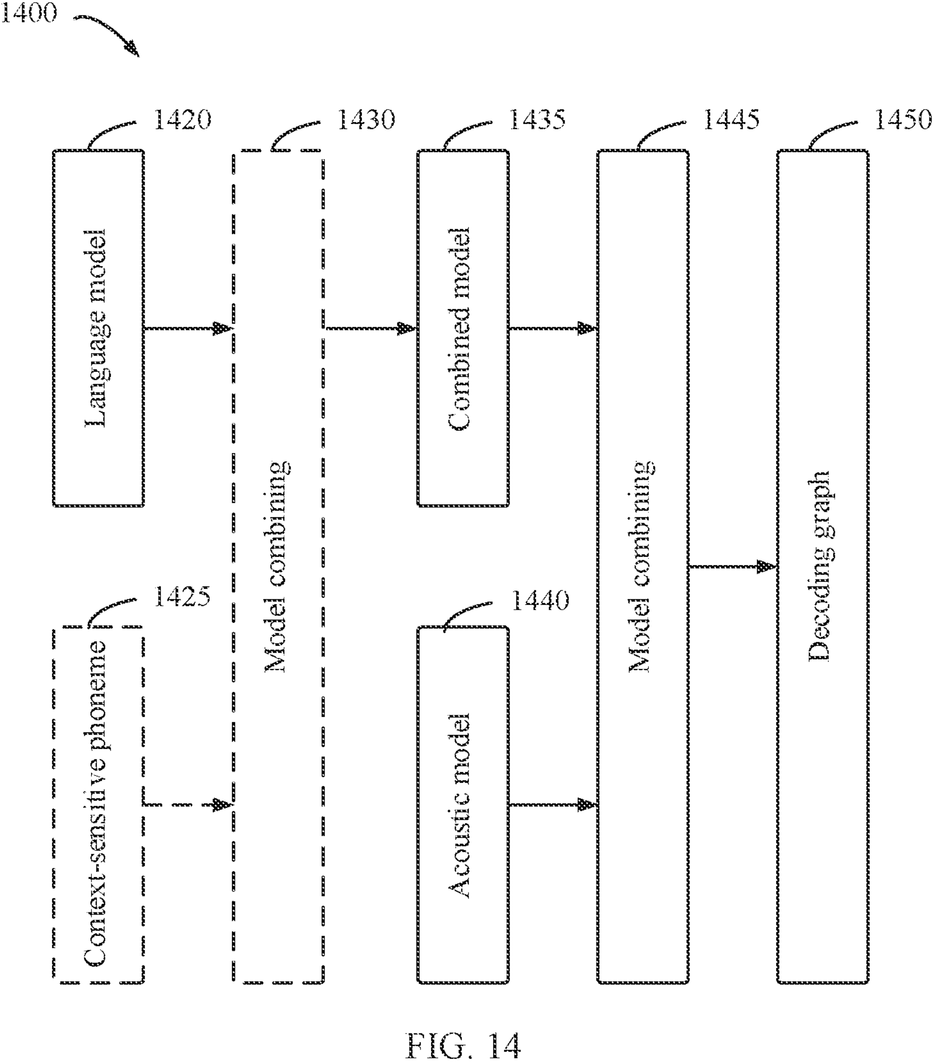
FIG. 14 is a schematic diagram of an example process for generating a decoding graph according to an embodiment of this disclosure.

FIG. 14 is a schematic diagram of an example process for generating a decoding graph according to an embodiment of this disclosure. Compared with the process shown in FIG. 9, a process 1400 does not need to use the pronunciation dictionary, and a language model 1520 is obtained based on phoneme sequence training.

If an acoustic model 1440 is trained with a single phoneme, the first computing device may directly combine a combined model 1435 with the acoustic model 1440, regardless of a context-sensitive phoneme. On the contrary, if the acoustic model 1440 considers context of a phoneme during training, for example, the acoustic model 1440 is trained with a plurality of phonemes, the first computing device may first combine the language model 1420 with a context-sensitive phoneme 1425 by using a model combining unit 1430, to generate a combined model 1435, and then combine the combined model 1435 with the acoustic model 1440 by using a model combining unit 1445, to generate a decoding graph 1450. The decoding graph 1450 is used to indicate the plurality of decoding paths of the syntax constraint rule determined based on the target phoneme sequence and the synonymous phoneme sequence group.

Still refer to FIG. 12. In block 1210, the first computing device determines the speech recognition model based on the first decoding graph.

In some embodiments, the first computing device may directly use the decoding graph 1450 as a final speech recognition model.

Figure 15:
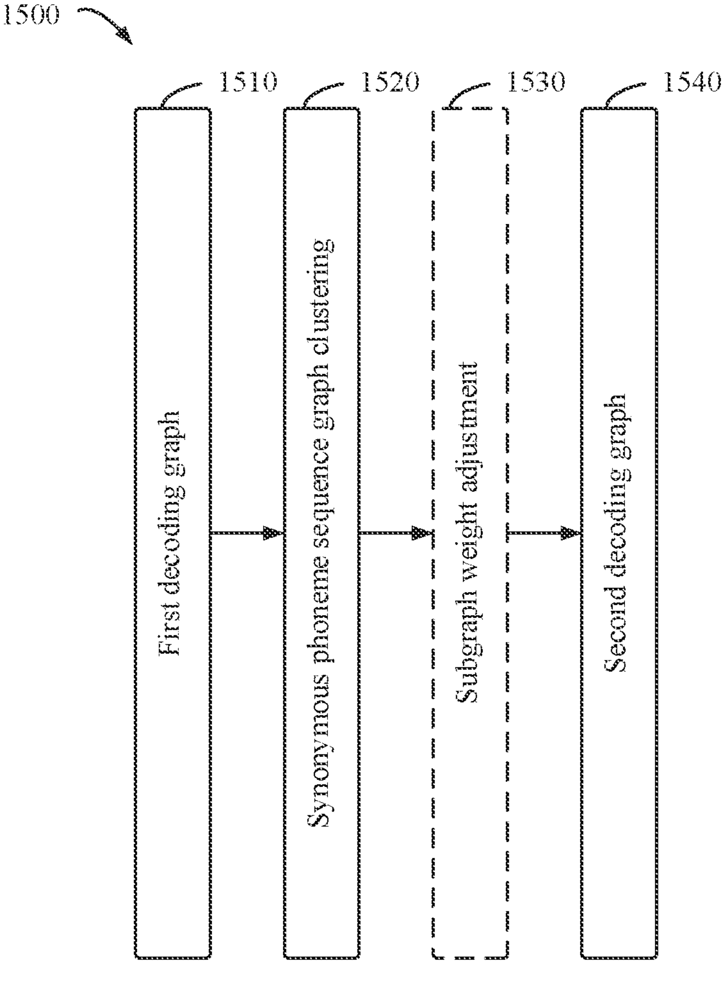
FIG. 15 is a schematic diagram of an example process for performing synonymous phoneme sequence clustering according to an embodiment of this disclosure.

In some embodiments, for example, the target phoneme sequence may at least include a first phoneme sequence and a second phoneme sequence. To reduce efficiency of decoding search of the decoding graph, the first computing device may further perform synonymous phoneme sequence clustering on the obtained decoding graph. FIG. 15 is a schematic diagram 1500 of an example process for performing synonymous phoneme sequence clustering according to an embodiment of this disclosure.

Figure 16:
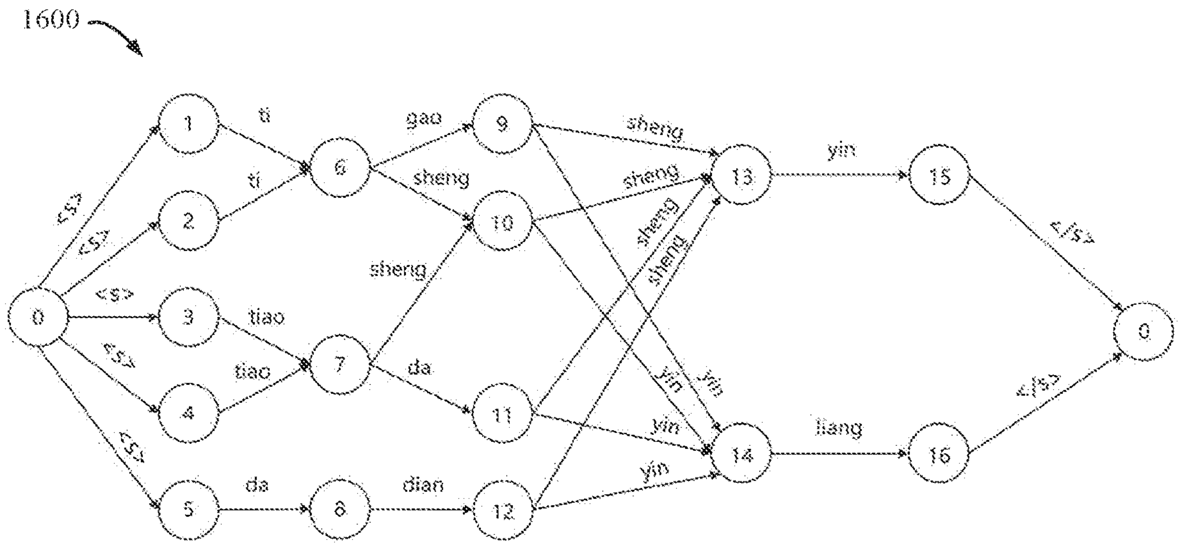
FIG. 16 is a schematic diagram of an example subgraph according to some embodiments of this disclosure.

As shown in FIG. 15, the first computing device may use a synonymous phoneme sequence subgraph clustering module 1520 to perform synonymous phoneme sequence clustering on a first decoding graph 1510 (for example, the decoding graph 1450 in FIG. 14). Specifically, the first computing device may obtain a first group of decoding paths and a second decoding path from the first decoding graph, where the obtained first group of decoding paths includes a decoding path corresponding to the first phoneme sequence and a first synonymous phoneme sequence group semantically associated with the first phoneme sequence, and the second group of decoding paths includes a decoding path corresponding to the second phoneme sequence and a second synonymous phoneme sequence group semantically associated with the second phoneme sequence. Further, the first computing device may generate a first subgraph based on the first group of decoding paths and a second subgraph based on the second group of decoding paths. FIG. 16 is a schematic diagram of an example subgraph 1600 according to some embodiments of this disclosure. As shown in FIG. 16, the subgraph 160 includes a decoding path corresponding to a phoneme sequence "ti gao sheng yin" (increase sound) and a synonymous phoneme sequence group.

Further, the first computing device may determine the speech recognition model at least based on the first subgraph and the second subgraph. Specifically, for example, the first computing device may generate a second decoding graph based on the first subgraph and the second subgraph and use the second decoding graph as the speech recognition model. As shown in FIG. 15, in some embodiments, the decoding graph obtained after the subgraph clustering may be directly used as a second decoding graph 1540 and used as the final speech recognition model. When the target phoneme sequence includes a plurality of phoneme sequences, the generated second decoding graph 1540 may include a plurality of independent subgraphs corresponding to the plurality of phoneme sequences.

Alternatively, the first computing device may further use a subgraph weight adjustment module 1530 to perform subgraph weight adjustment on the decoding graph obtained after the subgraph clustering. Specifically, the first computing device enables a first decoding path corresponding to the target phoneme sequence to have a same weight as a second decoding path corresponding to the synonymous phoneme sequence in the synonymous phoneme sequence group, to obtain the final decoding graph 1540. FIG. 16 is used as an example. A decoding path corresponding to a target phoneme sequence "ti gao sheng yin" has a same weight as a decoding path corresponding to a synonym "ti sheng yin liang" (raise volume). Based on this manner, faster decoding search for the extended synonymous phoneme sequence can be implemented, thereby reducing computing overheads and storage overheads.

Based on the method discussed above, the first computing device can automatically extend the associated synonymous phoneme sequence group based on the target phoneme sequence and construct the decoding graph for the second computing device. In this way, the generated decoding graph can not only meet a lightweight requirement, but also enable the second computing device to have a phoneme sequence generalization recognition capability.

In some embodiments, the first computing device may further indicate to provide the speech recognition model for a target computing device (for example, the second computing device) for deployment of the speech recognition model on the target computing device. For example, the first computing device may send the speech recognition model to the second computing device through wired or wireless communication for deployment of the speech recognition model on the second computing device. Alternatively, the first computing device may further store the model in a predetermined storage device, so that the second computing device can automatically obtain the speech recognition model from the storage device for deployment.

Use of Speech Recognition Model

According to embodiments of this disclosure, a solution for speech processing is further provided. In embodiments of this disclosure, a speech input is received; and text representation associated with the speech input is determined by using a speech recognition model, where the speech recognition model is obtained based on a process of obtaining a target keyword; obtaining a synonym group semantically associated with the target keyword; training a language model based on the target keyword and the synonym group, to obtain a target language model; and performing model combining on the target language model, an acoustic model, and a pronunciation dictionary, to obtain the speech recognition model, where the speech recognition model is a decoding graph. Based on this manner, in embodiments of this disclosure, for example, a computing device with small computing power can have a keyword generalization recognition capability, thereby improving speech interaction experience of a user.

Figure 17:
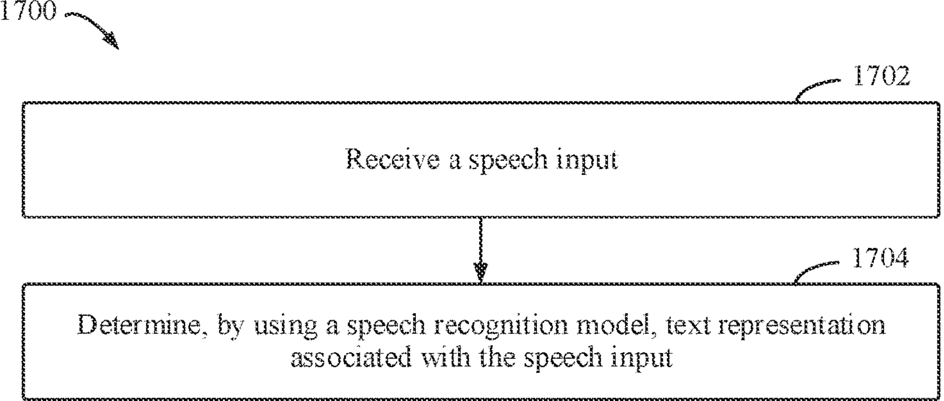
FIG. 17 is a flowchart of an example process of speech processing according to some embodiments of this disclosure.
Figure 18:
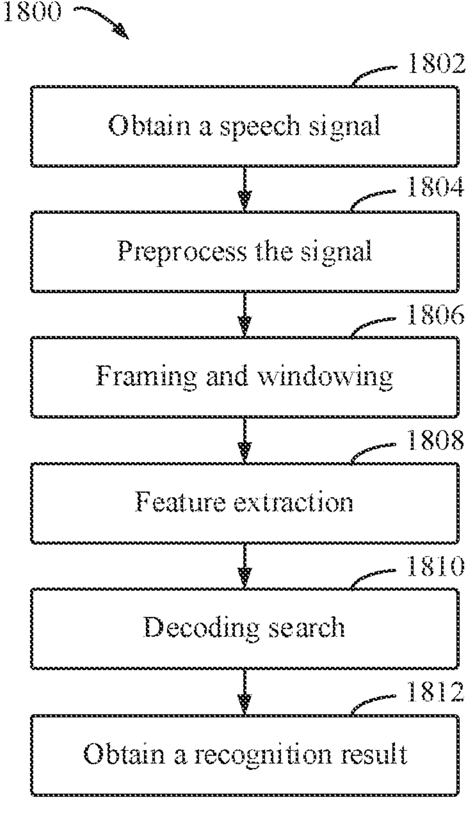
FIG. 18 is a flowchart of an example process for determining a speech recognition result according to an embodiment of this disclosure.
Figure 19:
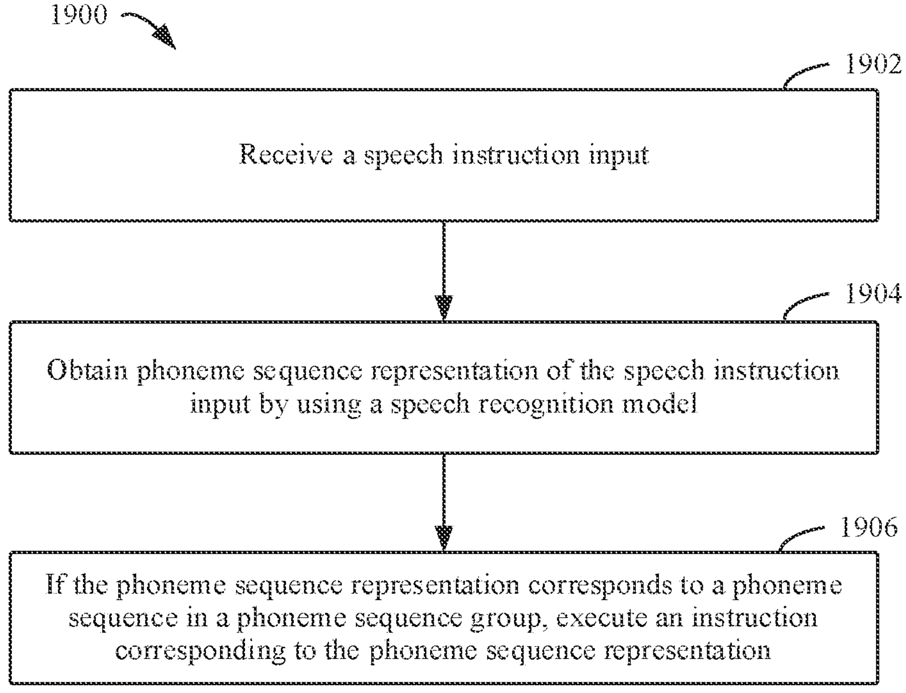
FIG. 19 is a flowchart of an example process of a method for speech processing according to an embodiment of this disclosure.

The following describes a process of speech processing according to some embodiments of this disclosure with reference to FIG. 17 to FIG. 19. FIG. 17 is a flowchart of an example process 1700 of speech processing according to some embodiments of this disclosure. For example, the process 1700 may be performed by the second computing device as discussed above, such as the second computing device 150 in FIG. 1A to FIG. 1D, the second computing device 310 in FIG. 3A and FIG. 3B, or the second computing device 450 in FIG. 3A and FIG. 3B.

As shown in FIG. 17, in block 1702, the second computing device receives a speech input. In some embodiments, the second computing device may receive the speech input by using an audio collector (for example, a microphone) located locally at the second computing device or an audio collector communicatively coupled to the second computing device.

For example, as discussed above, the second computing device 150 in FIG. 1A to FIG. 1D may receive the speech input 160 from the user 155, the second computing device 310 in FIG. 3A and FIG. 3B may receive the speech input 360 from the user 355, and the second computing device 450 in FIG. 4A to FIG. 4D may receive the speech input 460 from the user 455.

In block 1704, the second computing device determines, by using a speech recognition model, text representation associated with the speech input. The speech recognition model is obtained by the first computing device based on the foregoing discussed process through training data by using the keyword. For a specific construction process of the speech recognition model, refer to the content described in FIG. 5 to FIG. 11. Details are not described herein again. FIG. 18 is a flowchart of an example process for determining a speech recognition result according to an embodiment of this disclosure. As shown in FIG. 18, in block 1802, the second computing device may obtain a speech signal and preprocess the signal in block 1804. Then, in block 1806, the second computing device may perform framing and windowing processing on the preprocessed signal, in block 1808, the second computing device may extract a feature, in block 1810, the second computing device may perform decoding search by using a deployed decoding graph based on the extracted feature, and in block 18012, the second computing device may use the decoding graph to obtain a recognition result, that is, the text representation or phoneme sequence representation associated with the speech input.

In some embodiments, for the speech recognition model obtained through training data by using the keyword, the text representation may correspond to a target keyword or a synonym in a synonym group.

In some embodiments, the second computing device may further perform an action corresponding to the text representation. For example, the second computing device may query a predetermined action rule based on the determined text representation, to determine a corresponding action that the second computing device should perform. For example, the second computing device (for example, a smart speaker) may perform an action of increasing speaker volume based on text representation of "raising volume".

In some embodiments, the second computing device may further generate a corresponding control command based on the text representation, and send the control command to a third computing device, so that the third computing device performs a corresponding action. For example, the second computing device 150 may be a smart speaker. When the text representation is "turn on the television", the smart speaker may send a turn-on instruction to a corresponding smart television, so that the smart television is automatically turned on.

Based on this manner, the second computing device may process the speech input by using the speech recognition model with a keyword generalization recognition capability, to detect a keyword included in the speech input.

In some embodiments, the speech recognition model may alternatively be obtained through training data by using a phoneme sequence. For a specific construction process of the speech recognition model, refer to the content described in FIG. 12 to FIG. 16. Details are not described herein again. Compared with the process 1800, alternatively, after receiving the semantic input, the second computing device may determine, by using the speech recognition model, phoneme sequence representation associated with the speech input.

In some embodiments, for the speech recognition model obtained through training data by using the phoneme sequence, the phoneme sequence representation may correspond to a target phoneme sequence or a synonymous phoneme sequence in a synonymous phoneme sequence group.

In some embodiments, the second computing device may further perform an action corresponding to the phoneme sequence representation. For example, the second computing device may query a predetermined action rule based on the determined phoneme sequence representation, to determine a corresponding action that the second computing device should perform. For example, the second computing device (for example, a smart speaker) may perform an action of increasing speaker volume based on phoneme sequence representation of "ti sheng yin liang" (raise volume).

In some embodiments, the second computing device may further generate a corresponding control command based on the phoneme sequence representation, and send the control command to a third computing device, so that the third computing device performs a corresponding action. For example, the second computing device 150 may be a smart speaker. When the phoneme sequence representation is "da kai dian shi" (turn on the television), the smart speaker may send a turn-on instruction to a corresponding smart television, so that the smart television is automatically turned on.

Based on this manner, the second computing device may process the speech input by using the speech recognition model with a phoneme sequence generalization recognition capability, to detect a phoneme sequence included in the speech input.

FIG. 19 is a flowchart of an example process 1900 of a method for speech processing according to an embodiment of this disclosure. For example, the process 1900 may be performed by the second computing device as discussed above, such as the second computing device 150 in FIG. 1A to FIG. 1D, the second computing device 310 in FIG. 3A and FIG. 3B, or the second computing device 450 in FIG. 3A and FIG. 3B.

In block 1902, the second computing device receives a speech instruction input. In some embodiments, the second computing device may receive the speech input by using an audio collector (for example, a microphone) located locally at the second computing device or an audio collector communicatively coupled to the second computing device.

In block 1904, the second computing device obtains phoneme sequence representation by using the speech recognition model. Herein, the speech recognition model is configured to recognize a semantically associated phoneme sequence group. For a specific construction process of the speech recognition model, refer to the content described in FIG. 12 to FIG. 16.

In block 1906, if the phoneme sequence representation corresponds to a phoneme sequence in the phoneme sequence group, execute an instruction corresponding to the phoneme sequence representation.

In some embodiments, the speech recognition model is obtained based on a process of, obtaining target language information; obtaining a synonymous phoneme sequence group associated with the target language information, where the synonymous phoneme sequence group includes at least one synonymous phoneme sequence, and the at least one synonymous phoneme sequence is a phoneme sequence corresponding to a word semantically similar to the target language information; training a language model by using the synonymous phoneme sequence group, to obtain a target language model; generating a first decoding graph based on the target language model, where the first decoding graph indicates a plurality of decoding paths that satisfy a syntax constraint rule determined based on the synonymous phoneme sequence group; and determining the speech recognition model based on the first decoding graph.

In some embodiments, if the phoneme sequence representation does not match any phoneme sequence in the phoneme sequence group, the second computing device may provide a notification of no recognition result. The no recognition result may be expressed as an unknown result such as "SIL" and is discarded.

In some embodiments, the speech recognition model is configured to recognize a first phoneme sequence group with first associated semantics and a second phoneme sequence group with second associated semantics. The process 2000 may further include: if the phoneme sequence representation corresponds to a first phoneme sequence in the first phoneme sequence group, execute a first action; and if the phoneme sequence representation corresponds to a second phoneme sequence in the second phoneme sequence group, execute a second action different from the first action.

In some embodiments, that the phoneme sequence representation is obtained by using the speech recognition model may include: generating an emission probability of a speech feature of the speech input to a phoneme by using an acoustic model; recognizing the speech input by inputting the emission probability to the speech recognition model; and enabling the speech recognition model to output the phoneme sequence representation.

Example System and Device

Figure 20:
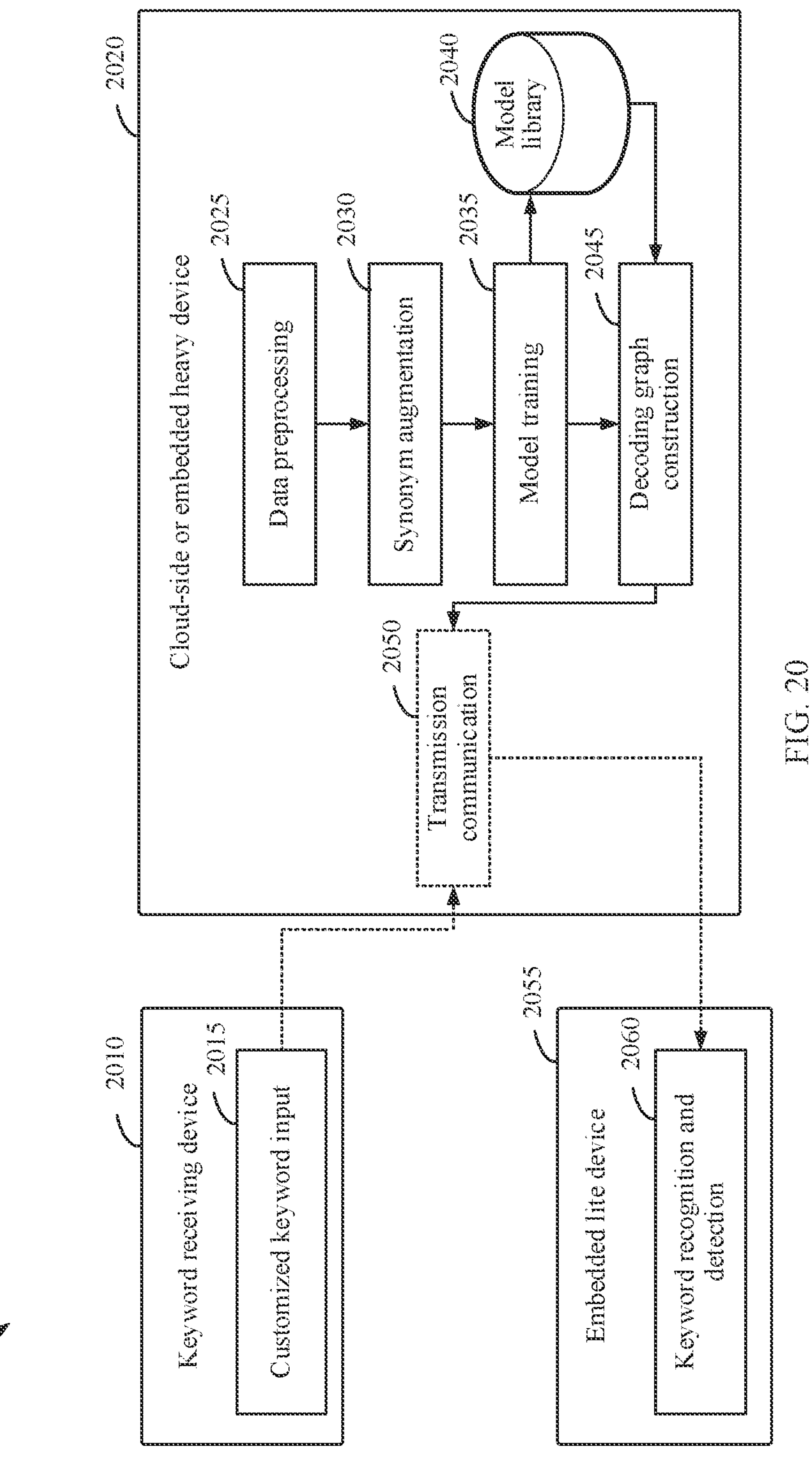
FIG. 20 is a schematic block diagram of an example speech recognition system according to some specific embodiments of this disclosure.

FIG. 20 is a schematic block diagram of an example speech recognition system 2000 according to some specific embodiments of this disclosure. As shown in FIG. 20, the speech recognition system 2000 may include a cloud-side or embedded heavy device 2020. Examples of the cloud-side or embedded heavy device 2020 include but are not limited to a cloud-side server, a smartphone, a notebook computer, a tablet computer, a desktop computer, an edge computing device, or the like.

As shown in FIG. 20, the cloud-side or embedded heavy device 2020 may obtain keyword input data. In some embodiments, for example, the keyword input data may be obtained by a customized keyword input module 2015 deployed in a keyword receiving device 2010. In some embodiments, for example, the keyword receiving device 2010 may be a device different from the cloud-side or embedded heavy device 2020, and send the keyword input data to a transmission communication module 2050 in the cloud-side or embedded heavy device 2020 through wired or wireless communication. In some embodiments, for example, the keyword receiving device 2010 may alternatively be an embedded lite device 2055 to which a speech recognition model is deployed.

Alternatively, the keyword receiving device 2010 may be a same device as the cloud-side or embedded heavy device 2020, and in this case, an output of the customized keyword input unit 2015 may be directly provided for a data preprocessing unit 2025.

As shown in FIG. 20, the data preprocessing module 2025 may determine a customized keyword based on the received keyword input data. For example, when the keyword input data is text data, the data preprocessing module 2025 may directly determine the customized keyword based on a text input. In addition, when the keyword input data is audio data, the data preprocessing module 2025 may first convert the audio data into text data by using an automatic speech recognition technology, and further determine the customized keyword from the text data.

In some embodiments, the data preprocessing module 2025 may determine a target keyword based on the customized keyword and a pre-stored historical keyword. In some embodiments, a synonym augmentation module 2030 may determine, from a lexicon and based on semantics of the target keyword, a synonym group associated with the target keyword.

In some embodiments, a model training module 2035 may train a language model based on the target keyword and the synonym group, and store the language model in a model library 2040. For example, the model library 2040 may maintain an acoustic model, a language model, and a pronunciation dictionary that have been trained. In some embodiments, for example, the model library 2040 may also be maintained on a cloud server.

Correspondingly, the trained language model may further be provided for a decoding graph construction module 2045, to generate a decoding graph for the embedded lite device 2055 based on the language model, and the acoustic model and the pronunciation dictionary stored in the model library 2040.

It should be understood that embodiments of constructing the speech recognition model discussed above with reference to FIG. 5 to FIG. 16 are also applicable to a process in which the cloud-side or embedded heavy device 2020 generates the decoding graph. Details are not described herein again.

In some embodiments, as shown in FIG. 20, the generated decoding graph may be sent to a keyword recognition and detection unit 2060 in the embedded lite device 2055 by using the transmission communication module 2050, so that the keyword recognition and detection unit 2160 can process a received speech input by using the decoding graph, to determine text representation corresponding to the speech input.

It should be understood that the speech recognition embodiments discussed above with reference to FIG. 17 to FIG. 19 are also applicable to a speech recognition process performed by the embedded lite device 2055. Details are not described herein again.

The example speech recognition system 2100 for the speech recognition based on the keyword is described above. This disclosure also provides an example speech recognition system for speech recognition based on a phoneme sequence. In the speech recognition system, a speech recognition model is constructed by using the phoneme sequence rather than the keyword in a text form, and the constructed speech recognition model recognizes a speech input as the phoneme sequence, and recognizes speech based on the phoneme sequence rather than the keyword. An entire structure of the speech recognition model is similar to that of the speech recognition model 2000 in FIG. 20. Details are not described herein again.

Figure 21:
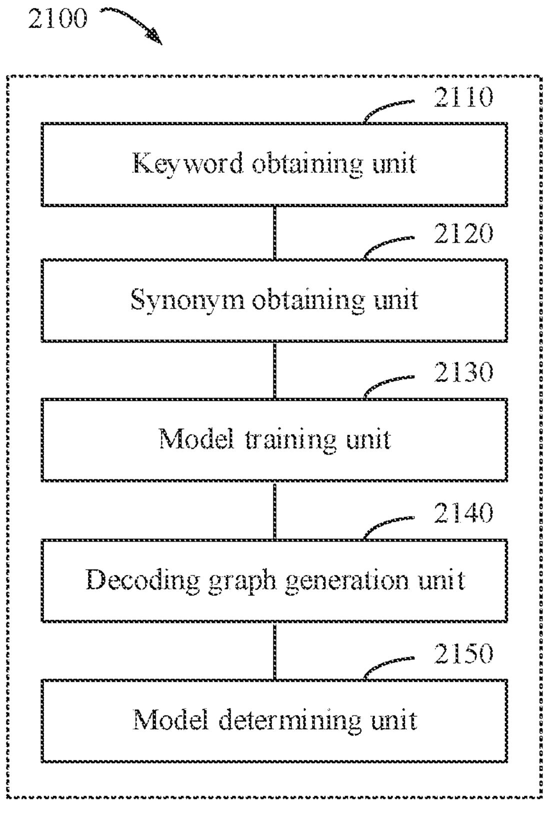
FIG. 21 is a schematic block diagram of a system for constructing a speech model according to an embodiment of this disclosure.

FIG. 21 is a schematic block diagram of a system 2100 for constructing a speech model according to an embodiment of this disclosure. The system 2100 for constructing a speech model may include a plurality of units configured to perform the corresponding steps in the process 500 discussed in FIG. 5. As shown in FIG. 21, the system 2100 for constructing a speech model includes a keyword obtaining unit 2110, configured to obtain a target keyword; a synonym obtaining unit 2120, configured to obtain a synonym group semantically associated with the target keyword; a model training unit 2130, configured to train a language model based on the target keyword and the synonym group, to obtain a target language model; a decoding graph generation unit 2140, configured to generate a first decoding graph based on the target language model, where the first decoding graph indicates a plurality of decoding paths that satisfy a syntax constraint rule determined based on the target keyword and the synonym group; and a model determining unit 2150, configured to determine the speech recognition model based on the first decoding graph.

In some embodiments, the target keyword includes a keyword of a speech input from an audio collector, and the audio collector is located at a user terminal.

In some other embodiments, the target keyword includes a keyword of a text input from a text collector, and the text collector is located at a user terminal.

In some embodiments, the synonym obtaining unit 2120 is further configured to: determine semantics of the target keyword; and determine the synonym group at least based on the semantics of the target keyword, where a difference between semantics of each synonym in the synonym group and the semantics of the target keyword is less than a difference threshold.

In some embodiments, the synonym obtaining unit 2120 is further configured to: determine the synonym group based on the semantics of the target keyword and a length of the target keyword, where a difference between a length of each synonym in the synonym group and the length of the target keyword is less than a length threshold. For example, a length of a keyword may indicate a quantity of characters or a quantity of words included in the keyword.

In some embodiments, the synonym obtaining unit 2120 is further configured to: obtain a plurality of candidate synonyms based on the semantics of the target keyword; provide the plurality of candidate synonyms for a user; and determine the synonym group from the plurality of candidate synonyms based on a user input received from the user, where the user input indicates that at least one candidate synonym in the plurality of candidate synonyms is excluded or confirmed.

In some embodiments, the target keyword at least includes a first keyword and a second keyword, and the model determining unit 1550 is further configured to: obtain a first group of decoding paths and a second group of decoding paths from the first decoding graph, where the first group of decoding paths includes decoding paths corresponding to the first keyword and a first synonym group semantically associated with the first keyword, and the second group of decoding paths includes decoding paths corresponding to the second keyword and a second synonym group semantically associated with the second keyword; generate a first subgraph based on the first group of decoding paths; generate a second subgraph based on the second group of decoding paths; and determine the speech recognition model at least based on the first subgraph and the second subgraph.

In some embodiments, the first subgraph indicates a first decoding path and a second decoding path, the first decoding path is a decoding path corresponding to the first keyword, the second decoding path is a decoding path corresponding to a synonym in the first synonym group, and the first decoding path and each second decoding path have a same weight in the first subgraph.

In some embodiments, the keyword obtaining unit 2110 is further configured to: obtain a first keyword group based on a pre-stored historical keyword and a received keyword; and in response to determining that a quantity of keywords in the first keyword group exceeds a predetermined threshold, delete at least one keyword in the first keyword group, where a remaining keyword in the first keyword group after the at least one keyword is deleted is the target keyword.

In some embodiments, the keyword obtaining unit 2110 is further configured to: delete at least one keyword in the target keyword based on an attribute of a keyword in the target keyword.

In some embodiments, the keyword obtaining unit 2110 is further configured to: delete at least one keyword in the target first keyword group based on a user indication.

In some embodiments, the system 2100 for constructing a speech model may further include a communication unit, configured to provide the speech recognition model for a second computing device for deployment of the speech recognition model on the second computing device.

It should be understood that the units in the system 2100 for constructing a speech model may be implemented by using a hardware unit, a software unit, or a combination of a hardware unit and a software unit.

Figure 22:
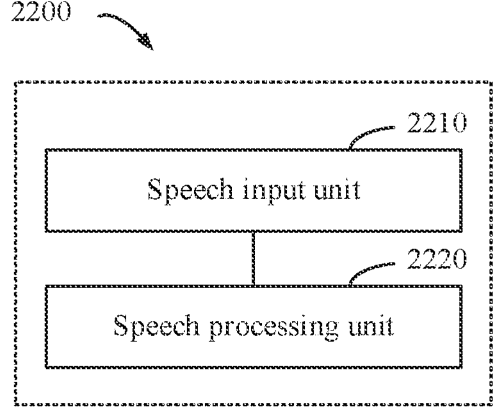
FIG. 22 is a block diagram of a system for speech processing according to an embodiment of this disclosure.

FIG. 22 is a block diagram of a system 2200 for speech processing according to an embodiment of this disclosure. The system 2200 for speech processing may include a plurality of units configured to perform the corresponding steps in the process 1700 discussed in FIG. 1700. As shown in FIG. 22, the system 2200 for speech processing includes a speech input unit 2210, configured to receive a speech input, and a speech processing unit 2220, configured to determine, by using a speech recognition model, text representation associated with the speech input. The speech recognition model is obtained based on a process of obtaining a target keyword; obtaining a synonym group semantically associated with the target keyword; generating a first decoding graph based on a target language model, where the first decoding graph indicates a plurality of decoding paths that satisfy a syntax constraint rule determined based on the target keyword and the synonym group; and determining the speech recognition model based on the first decoding graph.

In some embodiments, the target keyword includes a keyword of a speech input from an audio collector, and the audio collector is located at a user terminal.

In some other embodiments, the target keyword includes a keyword of a text input from a text collector, and the text collector is located at a user terminal.

In some embodiments, the determining a synonym group semantically associated with the target keyword includes: determining semantics of the target keyword; and determining the synonym group at least based on the semantics of the target keyword, where a difference between semantics of each synonym in the synonym group and the semantics of the target keyword is less than a difference threshold.

In some embodiments, the determining the synonym group at least based on the semantics of the target keyword includes: determining the synonym group based on the semantics of the target keyword and a length of the target keyword, where a difference between a length of each synonym in the synonym group and the length of the target keyword is less than a length threshold. For example, a length of a keyword may indicate a quantity of characters or a quantity of words included in the keyword.

In some embodiments, the determining the synonym group at least based on the semantics of the target keyword includes: obtaining a plurality of candidate synonyms based on the semantics of the target keyword; providing the plurality of candidate synonyms for a user; and determining the synonym group from the plurality of candidate synonyms based on a user input received from the user, where the user input indicates that at least one candidate synonym in the plurality of candidate synonyms is excluded or confirmed.

In some embodiments, the target keyword at least includes a first keyword and a second keyword, and the determining the speech recognition model based on the first decoding graph includes: obtaining a first group of decoding paths and a second group of decoding paths from the first decoding graph, where the first group of decoding paths includes decoding paths corresponding to the first keyword and a first synonym group semantically associated with the first keyword, and the second group of decoding paths includes decoding paths corresponding to the second keyword and a second synonym group semantically associated with the second keyword; generating a first subgraph based on the first group of decoding paths; generating a second subgraph based on the second group of decoding paths; and determining the speech recognition model at least based on the first subgraph and the second subgraph.

In some embodiments, the first subgraph indicates a first decoding path and a second decoding path, the first decoding path is a decoding path corresponding to the first keyword, the second decoding path is a decoding path corresponding to a synonym in the first synonym group, and the first decoding path and each second decoding path have a same weight in the first subgraph.

In some embodiments, obtaining a target keyword includes: obtaining a first keyword group based on a pre-stored historical keyword and a received keyword; and in response to determining that a quantity of keywords in the first keyword group exceeds a predetermined threshold, deleting at least one keyword in the first keyword group, where a remaining keyword in the first keyword group after the at least one keyword is deleted is the target keyword.

In some embodiments, deleting at least one keyword in the target keyword includes: deleting at least one keyword in the target keyword based on an attribute of a keyword in the target keyword. For example, an earliest created historical keyword may be deleted based on creation time of the historical keyword.

In some embodiments, deleting at least one keyword in the target first keyword group includes: deleting at least one keyword in the first keyword group based on a user indication.

In some embodiments, the system 2200 for speech processing may further include an action execution unit configured to perform an action corresponding to the text representation.

In some embodiments, the system 2200 for speech processing may further include a device control unit, configured to generate a corresponding control command based on the text representation, and send the control command to a third computing device, so that the third computing device performs a corresponding action.

In some embodiments, the text representation corresponds to the target keyword or a synonym in the synonym group.

It should be understood that the units in the system 2200 for speech processing may be implemented by using a hardware unit, a software unit, or a combination of a hardware unit and a software unit. An example of the speech input unit 2210 may include a microphone configured to receive the speech input, and an example of the speech processing unit 2220 may include a processing device configured to perform a speech recognition operation.

It should be understood that the system 2100 for constructing a speech model and/or the system 2200 for speech processing may be implemented by using an application-specific integrated circuit, one or more FPGAs (field programmable gate array), a PLD (programmable logic device), a controller, a state machine, gate logic, a discrete hardware component, any other suitable circuit, or any combination of circuits, a chip, a board, a communication device, or the like that can perform various processes of this disclosure.

Figure 23:
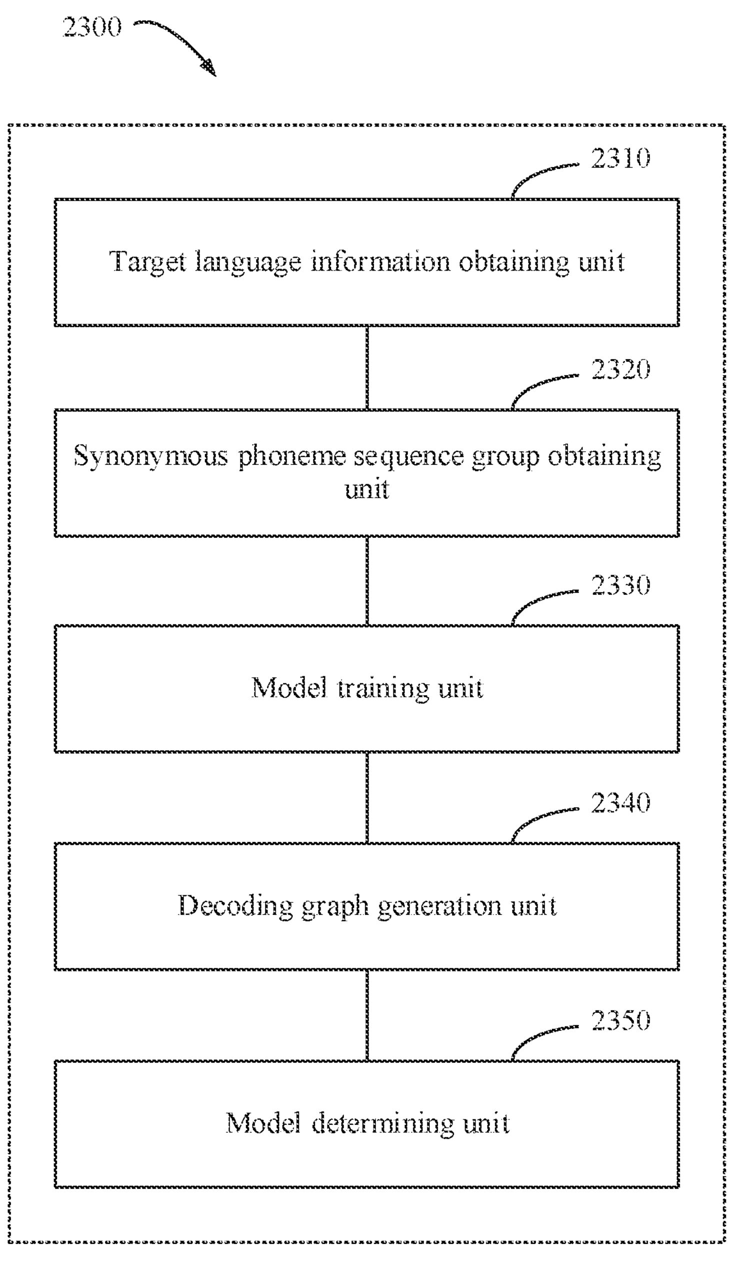
FIG. 23 is a block diagram of a system for constructing a speech model according to an embodiment of this disclosure.

FIG. 23 is a block diagram of a system 2300 for constructing a speech model according to an embodiment of this disclosure. The system 2300 for constructing a speech model may include a plurality of units configured to perform the corresponding steps in the process 1200 discussed in FIG. 12. As shown in FIG. 23, the system 2300 for constructing a speech model includes: a target language information obtaining unit 2310, configured to obtain target language information; a synonymous phoneme sequence group obtaining unit 2320, configured to obtain a synonymous phoneme sequence group associated with the target language information, where the synonymous phoneme sequence group includes at least one synonymous phoneme sequence, and the at least one synonymous phoneme sequence is a phoneme sequence corresponding to a word semantically similar to the target language information; a model training unit 2330, configured to train a language model by using the synonymous phoneme sequence group, to obtain a target language model; a decoding graph generation unit 2340, configured to generate a first decoding graph based on the target language model, where the first decoding graph indicates a plurality of decoding paths that satisfy a syntax constraint rule determined based on the synonymous phoneme sequence group; and a model determining unit 2350, configured to determine the speech recognition model based on the first decoding graph.

In some embodiments of, the target language information may include speech or text. In some embodiments, the target language information includes a speech input from an audio collector, and the audio collector is located at a user terminal. In some other embodiments, a keyword of a text input is obtained from a text collector at a user terminal. In some embodiments, the target language information may be some short instruction words or instruction statements, for example, “turn off”, “stop”, “pause”, “increase volume”, “turn up volume”, or the like.

For example, if a first computing device is a user terminal, for example, the user may directly provide a speech input or a text input for the user terminal, so that the user terminal can extract target language information from the speech input or the text input, to construct the speech recognition model.

For example, if the first computing device is a computing device different from the user terminal, for example, a cloud device or an edge computing device, the user may input speech or text, for example, through an interface provided by the user terminal. The speech input or text input may be sent to the first computing device, so that the first computing device can obtain the target language information, to construct the speech recognition model. Based on this manner, the user can customize a phoneme sequence that can be supported by the speech recognition model, so that a degree of personalization of the speech recognition model can be improved.

In some embodiments, the synonymous phoneme sequence group obtaining unit 2320 may be further configured to: determine semantics of the target language information; and determine the synonymous phoneme sequence group at least based on the semantics of the target language information, where a difference between semantics of each synonymous phoneme sequence in the synonymous phoneme sequence group and the semantics of the target language information is less than a difference threshold.

In some embodiments, the synonymous phoneme sequence group obtaining unit 2320 may be further configured to: determine a target phoneme sequence corresponding to the target language information; and determine the synonymous phoneme sequence group based on the semantics of the target phoneme sequence and a length of the target phoneme sequence, where a difference between a length of each synonymous phoneme sequence in the synonymous phoneme sequence group and the length of the target phoneme sequence is less than a length threshold. For example, the length of the phoneme sequence may indicate a quantity of phonemes (for example, initials or finals) included in the phoneme sequence. In some embodiments, if the target language information is text, a phoneme sequence corresponding to the text may be obtained by using a pronunciation dictionary and used as the target phoneme sequence. If the target language information is speech, a phoneme sequence of the speech may be obtained by using an acoustic model and used as the target phoneme sequence.

In some embodiments, the synonymous phoneme sequence group obtaining unit 2320 may be further configured to: obtain a plurality of candidate synonyms based on semantics of a target keyword corresponding to the target language information; provide the plurality of candidate synonyms for the user; determine a synonym group from the plurality of candidate synonyms based on a user input received from the user, where the user input indicates that at least one candidate synonym in the plurality of candidate synonyms is excluded or confirmed; and obtain the synonymous phoneme sequence group based on the pronunciation dictionary and the synonym group.

In some embodiments, the synonymous phoneme sequence group obtaining unit 2320 may be further configured to: receive a speech input from a user; and generate the synonymous phoneme sequence group based on the speech input. For example, semantics of a speech input is obtained based on a keyword corresponding to the speech input, to generate the synonymous phoneme sequence group.

In some embodiments, the target language information at least includes first language information and second language information, and the model determining unit 2330 may be further configured to: obtain a first group of decoding paths and a second group of decoding paths from the first decoding graph, where the first group of decoding paths includes a decoding path of a first synonymous phoneme sequence group associated with the first language information, and the second group of decoding paths includes a decoding path of a second synonymous phoneme sequence group associated with the second language information; generate a first subgraph based on the first group of decoding paths; generate a second subgraph based on the second group of decoding paths; and determine the speech recognition model at least based on the first subgraph and the second subgraph.

In some embodiments, the first subgraph indicates a first decoding path and a second decoding path, the first decoding path and the second decoding path are decoding paths in the first synonymous phoneme sequence group, and the first decoding path and the second decoding path have a same weight in the first subgraph. Based on this manner, faster decoding search for the extended synonymous phoneme sequence can be implemented, thereby reducing computing overheads and storage overheads.

In some embodiments, the target language information obtaining unit 2310 may be further configured to: obtain a first language information group based on pre-stored historical language information and received language information; and in response to determining that a quantity of pieces of language information in the first language information group exceeds a predetermined threshold, obtain the target language information from the first language information group based on the predetermined threshold.

In some embodiments, the target language information obtaining unit 2310 may be further configured to: obtain the target language information from the first language information group based on an attribute of language information in the target language information, where a quantity of pieces of target language information is the predetermined threshold. For example, one or more pieces of earliest created historical language information may be deleted from the first language information group, to obtain a predetermined threshold quantity of pieces of language information.

In some embodiments, the target language information obtaining unit 2310 may be further configured to: obtain the target language information from the first language information group based on a user indication, where the quantity of pieces of target language information is the predetermined threshold. For example, language information in the first language information group to be retained as the target language information may be selected based on a user input.

In some embodiments, the first computing device may further indicate to provide the speech recognition model for a target computing device (for example, a second computing device) for deployment of the speech recognition model on the target computing device.

Figure 24:
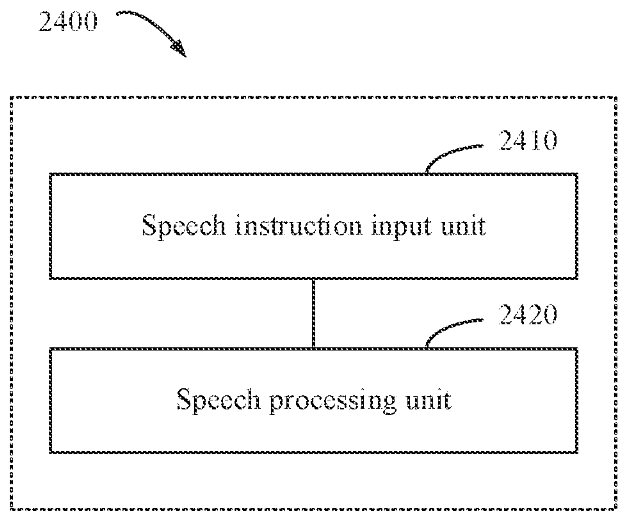
FIG. 24 is a block diagram of a system for speech processing according to an embodiment of this disclosure.

FIG. 24 is a block diagram of a system 2400 for speech processing according to an embodiment of this disclosure. The system 2300 for constructing a speech model may include a plurality of units configured to perform the corresponding steps in the process 1900 discussed in FIG. 19. As shown in FIG. 24, the system 2400 for speech processing includes: a speech instruction input unit 2410, configured to receive a speech instruction input; and a speech processing unit 2420, configured to obtain phoneme sequence representation of the speech instruction input by using a speech recognition model, where the speech recognition model is configured to recognize the speech instruction input based on a synonymous phoneme sequence group of semantics of the instruction, and when the phoneme sequence representation corresponds to a phoneme sequence in the phoneme sequence group, execute an instruction corresponding to the phoneme sequence representation.

In some embodiments, the speech recognition model may be obtained by a first computing device. For example, the first computing device may include a cloud-side or embedded heavy device, and the first computing device may have a strong computing capability, to execute construction of the speech recognition model. For example, the first computing device may further include a user terminal device.

In some embodiments, for example, the system 2400 for speech processing may be performed by a second computing device. For example, the second computing device may include an embedded lite device with a weak computing capability, to perform speech processing by using the deployed speech recognition model. Examples of the second computing device may include, but are not limited to, a smart home device (for example, an air conditioner, a refrigerator, a washing machine, a television, or a speaker), an intelligent wearable device (for example, a band, a watch, or glasses), a vehicle-mounted device, or the like.

In some embodiments, the speech recognition model is obtained based on a process of: obtaining target language information; obtaining a synonymous phoneme sequence group associated with the target language information, where the synonymous phoneme sequence group includes at least one synonymous phoneme sequence, and the synonymous phoneme sequence is a phoneme sequence corresponding to a word semantically similar to the target language information; training a language model by using the synonymous phoneme sequence group, to obtain a target language model; generating a first decoding graph based on the target language model, where the first decoding graph indicates a plurality of decoding paths that satisfy a syntax constraint rule determined based on the synonymous phoneme sequence group; and determining the speech recognition model based on the first decoding graph.

In some embodiments, the speech processing unit 2420 may be further configured to: if the phoneme sequence representation does not match any phoneme sequence in the phoneme sequence group, provide a notification of no recognition result. Based on this manner, user speech can be recognized in real time and efficiently, thereby improving speech interaction experience of the user.

In some embodiments, the speech recognition model is configured to recognize a first phoneme sequence group synonymous with first semantics and a second phoneme sequence group synonymous with second semantics. The speech processing unit 2420 may be further configured to: if the phoneme sequence representation corresponds to a first phoneme sequence in the first phoneme sequence group, execute a first instruction; and if the phoneme sequence representation corresponds to a second phoneme sequence in the second phoneme sequence group, execute a second instruction different from the first action.

In some embodiments, the speech processing unit may be further configured to: generate an emission probability of a speech feature of the speech instruction input to a phoneme by using an acoustic model; recognize the speech instruction input by inputting the emission probability to the speech recognition model; and enable the speech recognition model to output the phoneme sequence representation.

Figure 25:
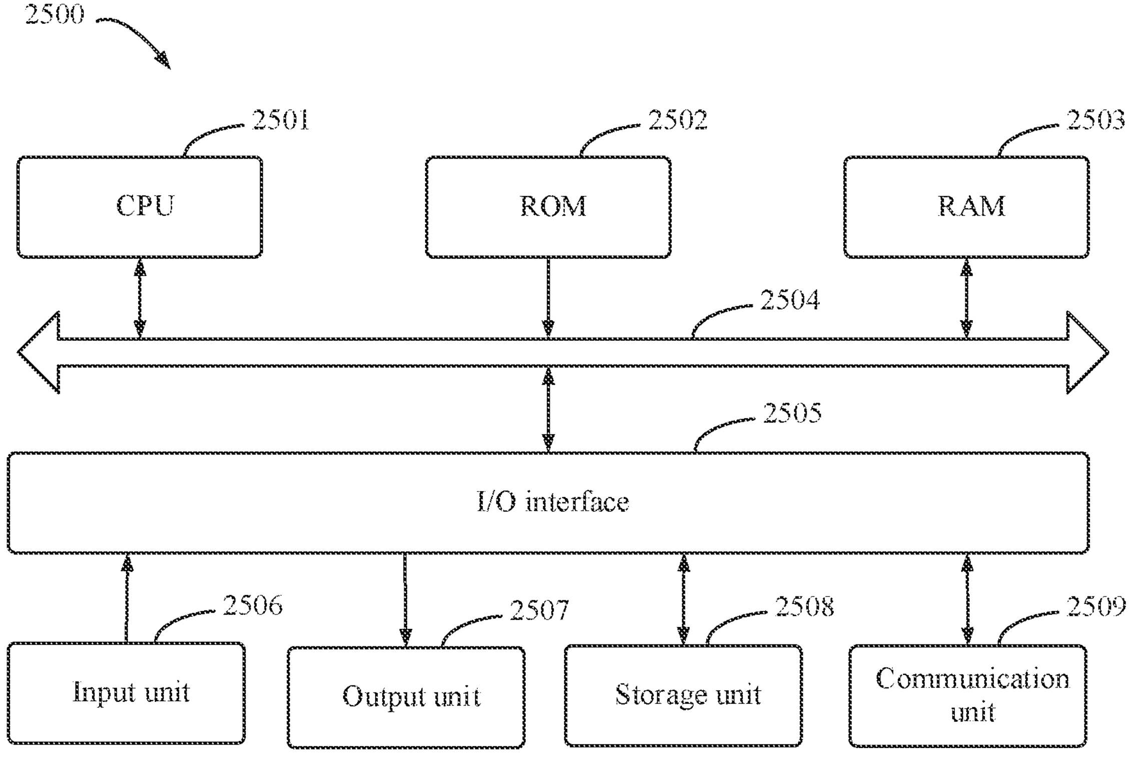
FIG. 25 is a schematic block diagram of an example device that may be configured to implement embodiments of this disclosure.

FIG. 25 is a schematic block diagram of an example device 2500 that may be configured to implement embodiments of this disclosure. For example, the first computing device (for example, the first computing device 130 in FIG. 1A to FIG. 1D, the first computing device 330 in FIG. 3A and FIG. 3B, or the first computing device 430 in FIG. 3A and FIG. 3B) and/or the second computing device (for example, the second computing device 150 in FIG. 1A to FIG. 1D, the second computing device 310 in FIG. 3A and FIG. 3B, or the second computing device 450 in FIG. 3A and FIG. 3B) according to embodiments of this disclosure may be implemented by the device 2500. As shown in the figure, the device 2500 includes a central processing unit (CPU) 2501 that may perform various appropriate actions and processing based on computer program instructions stored in a read-only memory (ROM) 2502 or computer program instructions loaded into a random access memory (RAM) 2503 from a storage unit 2508. In the RAM 2503, various programs and data required for operation of the device 2500 may also be stored. The CPU 2501, the ROM 2502, and the RAM 2503 are connected to each other through a bus 2504. An input/output (I/O) interface 2505 is also connected to the bus 2404.

A plurality of components in the device 2500 are connected to the I/O interface 2505, including an input unit 2506, for example, a keyboard or a mouse, an output unit 2507, for example, a display or a loudspeaker of various types, the storage unit 2508, for example, a magnetic disk or an optical disc, and a communication unit 2509, for example, a network adapter, a modem, or a wireless communication transceiver. The communication unit 2509 allows the device 2500 to exchange information/data with another device through a computer network such as the Internet and/or various telecommunication networks.

The various processes and processing described above, for example, the processes 500, 600, 700, 800, 900, 1000, 1200, 1300, 1400, 1500, 1700, 1800, and 1900, may be performed by the processing unit 2501. For example, in some embodiments, the processes described above may be implemented as a computer software program that is tangibly included in a machine-readable medium, such as the storage unit 2508. In some embodiments, a part or all of the computer program may be loaded onto and/or installed on the device 2500 by using the ROM 2502 and/or the communication unit 250). When the computer program is loaded into the RAM 2503 and executed by the CPU 2501, one or more actions of the processes described above may be performed.

This disclosure may be a method, an apparatus, a system, and/or a computer program product. The computer program product may include a computer-readable storage medium having computer-readable program instructions thereon for performing various aspects of this disclosure.

The computer-readable storage medium may be a tangible device that may retain and store instructions for use by an instruction execution device. The computer-readable storage medium may be, for example, but is not limited to, an electrical storage device, a magnetic storage device, an optical storage device, an electromagnetic storage device, a semiconductor storage device, or any suitable combination thereof. More specific examples (a non-exhaustive list) of the computer-readable storage media include: a portable computer disk, a hard disk, a random access memory (RAM), a read-only memory (ROM), an erasable programmable read-only memory (EPROM or a flash memory), a static random access memory (SRAM), a portable compact disk read-only memory (CD-ROM), a digital versatile disc (DVD), a memory stick, a floppy disk, a mechanical coding device, for example, a punching card or a groove protrusion structure storing instructions on the punched card or a groove protrusion structure that stores instructions, and any suitable combination thereof. The computer-readable storage medium used herein is not to be construed as a transient signal, such as a radio wave or another freely propagating electromagnetic wave, an electromagnetic wave (such as a light pulse through an optical fiber) propagating through a waveguide or another transmission medium, or an electrical signal transmitted through a wire.

The computer-readable program instructions described herein may be downloaded from the computer-readable storage medium to respective computing/processing devices or to an external computer or external storage device through a network such as the Internet, a local area network, a wide area network, and/or a wireless network. The network may include copper transmission cables, optical fiber transmission, wireless transmission, routers, firewalls, switches, gateway computers, and/or edge servers. A network adapter card or a network interface in each computing/processing device receives computer-readable program instructions from a network, and forwards the computer-readable program instructions for storage in a computer-readable storage medium in each computing/processing device.

The computer program instructions used to perform operations in this disclosure may be assembly instructions, instruction set architecture (ISA) instructions, machine instructions, machine-related instructions, microcode, firmware instructions, status setting data, or source code or target code written in any combination of one or more programming languages. The programming languages include object-oriented programming languages such as Smalltalk and C++, and a conventional procedural programming language such as "C" or a similar programming language. The computer-readable program instructions may be executed entirely on a user computer, partly on the user computer, as a stand-alone software package, partly on the user computer and partly on a remote computer, or entirely on the remote computer or a server. When a remote computer is involved, the remote computer may be connected to a user computer through any type of network, including a local area network (LAN) or a wide area network (WAN), or may be connected to an external computer (for example, connected by using an Internet service provider over the Internet). In some embodiments, an electronic circuit, for example, a programmable logic circuit, a field programmable gate array (FPGA), or a programmable logic array (PLA), is customized by using status information of computer-readable program instructions. The electronic circuit may execute the computer-readable program instructions, to implement various aspects of this disclosure.

The various aspects of this disclosure are described herein with reference to the flowcharts and/or block diagrams of the method, the apparatus (system), and the computer program product according to embodiments of this disclosure. It should be understood that each block in the flowcharts and/or the block diagrams and combinations of blocks in the flowcharts and/or the block diagrams may be implemented by computer-readable program instructions.

The computer-readable program instructions may be provided for a processing unit of a general-purpose computer, a dedicated computer, or another programmable data processing apparatus to produce a machine, so that the instructions, when executed by the processing unit of the computer or the another programmable data processing apparatus, create an apparatus for implementing functions/actions specified in one or more blocks in the flowcharts and/or the block diagrams. Alternatively, the computer-readable program instructions may be stored in a computer-readable storage medium. The instructions enable a computer, a programmable data processing apparatus, and/or another device to work in a specific manner. Therefore, the computer-readable medium storing the instructions includes an artifact that includes instructions for implementing various aspects of functions/actions specified in one or more blocks in the flowcharts and/or the block diagrams.

Alternatively, the computer-readable program instructions may be loaded onto a computer, another programmable data processing apparatus, or another device, so that a series of operation steps are performed on the computer, the another programmable data processing apparatus, or the another device to produce a computer-implemented process. Therefore, the instructions executed on the computer, the another programmable data processing apparatus, or the another device implement functions/actions specified in one or more blocks in the flowcharts and/or the block diagrams.

The flowcharts and the block diagrams in the accompanying drawings illustrate system architectures, functions, and operations of possible implementations of systems, methods, and computer program products according to a plurality of embodiments of this disclosure. In this regard, each block in the flowcharts or the block diagrams may represent a module, a program segment, or a part of the instructions, and the module, the program segment, or the part of the instructions includes one or more executable instructions for implementing a specified logical function. In some alternative implementations, the functions marked in the blocks may also occur in a sequence different from that marked in the accompanying drawings. For example, two consecutive blocks may actually be executed substantially in parallel, and sometimes may be executed in a reverse order, depending on a function involved. It should also be noted that each block in the block diagrams and/or the flowcharts, and the combination of the blocks in the block diagrams and/or the flowcharts may be implemented by a dedicated hardware-based system that performs a specified function or action, or may be implemented by a combination of special-purpose hardware and computer instructions.

The implementations of this disclosure are described above. The foregoing descriptions are examples, are not exhaustive, and are not limited to the disclosed implementations. Many modifications and variations are apparent to a person of ordinary skill in the art without departing from the scope and spirit of the described implementations. Selection of terms used in this specification is intended to best explain implementation principles, actual application, or improvements to technologies in the market, or to enable another person of ordinary skill in the art to understand the implementations disclosed in this specification.

What is claimed is:

1. A method for constructing a speech recognition model, wherein the method comprises:
obtaining a target keyword, wherein the target keyword comprises a first keyword and a second keyword;
obtaining a synonym group semantically associated with the target keyword, wherein the synonym group comprises a first synonym group semantically associated with the first keyword and a second synonym group semantically associated with the second keyword;
training, based on the target keyword and the synonym group, a language model to obtain a target language model;
generating, based on the target language model, a first decoding graph indicating a plurality of decoding paths that satisfy a syntax constraint rule that is based on the target keyword and the synonym group; and
determining, based on the first decoding graph, the speech recognition model, wherein determining the speech recognition model comprises:
obtaining, from the first decoding graph, a first group of decoding paths and a second group of decoding paths, wherein the first group comprises first decoding paths corresponding to the first keyword and the first synonym group, and wherein the second group comprises second decoding paths corresponding to the second keyword and the second synonym group;
generating, based on the first group, a first subgraph;
generating, based on the second group, a second subgraph; and
determining, based on the first subgraph and the second subgraph, the speech recognition model.

2. The method of claim 1, wherein obtaining the synonym group comprises:
determining first semantics of the target keyword; and
determining the synonym group based on the first semantics, wherein a first difference between second semantics of each synonym in the synonym group and the first semantics is less than a difference threshold.

3. The method of claim 2, wherein determining the synonym group comprises determining the synonym group further based on a first length of the target keyword, and wherein a second difference between a second length of each synonym in the synonym group and the first length is less than a length threshold.

4. The method of claim 2, wherein determining the synonym group further comprises:
obtaining, based on the first semantics, a plurality of candidate synonyms;
providing, for a user, the candidate synonyms;
receiving, from the user, a user input indicating that at least one candidate synonym in the candidate synonyms is excluded or confirmed; and
determining, from the candidate synonyms and based on the user input, the synonym group.

5. The method of claim 1, wherein the first subgraph indicates a first decoding path corresponding to the first keyword and a second decoding path corresponding to a synonym in the first synonym group, and wherein the first decoding path and the second decoding path have a same weight in the first subgraph.

6. The method of claim 1, wherein obtaining the target keyword comprises:
obtaining, based on a pre-stored historical keyword and a received keyword, a first keyword group;
determining that a quantity of keywords in the first keyword group exceeds a predetermined threshold; and
obtaining, in response to determining that the quantity of keywords exceeds the predetermined threshold, from the first keyword group, and based on the predetermined threshold, the target keyword.

7. The method of claim 6, wherein obtaining the target keyword comprises obtaining, further based on an attribute of a keyword in the target keyword, the target keyword, and wherein a quantity of target keywords is the predetermined threshold.

8. The method of claim 1, further comprising indicating to provide the speech recognition model to a target computing device for deployment of the speech recognition model on the target computing device.

9. The method of claim 1, wherein the second subgraph indicates a third decoding path corresponding to the second keyword and a fourth decoding path corresponding to a synonym in the second synonym group, and wherein the third decoding path and the fourth decoding path have a same weight in the second subgraph.

10. A method for speech processing comprising:
receiving a speech input;
obtaining a target keyword, wherein the target keyword comprises a first keyword and a second keyword;
obtaining a synonym group semantically associated with the target keyword, wherein the synonym group comprises a first synonym group semantically associated with the first keyword and a second synonym group semantically associated with the second keyword;
training, based on the target keyword and the synonym group, a language model to obtain a target language model;
generating, based on the target language model, a first decoding graph indicating a plurality of decoding paths that satisfy a syntax constraint rule that is based on the target keyword and the synonym group;
determining, based on the first decoding graph, a speech recognition model, wherein determining the speech recognition model comprises:
obtaining, from the first decoding graph, a first group of decoding paths and a second group of decoding paths, wherein the first group comprises first decoding paths corresponding to the first keyword and the first synonym group, and wherein the second group comprises second decoding paths corresponding to the second keyword and the second synonym group;
generating, based on the first group, a first subgraph;
generating, based on the second group, a second subgraph; and
determining, based on the first subgraph and the second subgraph, the speech recognition model; and
determining, using the speech recognition model, text representation associated with the speech input.

11. The method of claim 10, wherein obtaining the synonym group comprises:
determining first semantics of the target keyword; and
determining the synonym group based on the first semantics, wherein a first difference between second semantics of each synonym in the synonym group and the first semantics is less than a difference threshold.

12. The method of claim 11, wherein determining the synonym group comprises determining the synonym group further based on a first length of the target keyword, and wherein a second difference between a second length of each synonym in the synonym group and the first length is less than a length threshold.

13. The method of claim 11, wherein determining the synonym group further comprises:

obtaining, based on the first semantics, a plurality of candidate synonyms;

providing, for a user, the candidate synonyms;

receiving, from the user, a user input indicating that at least one candidate synonym in the candidate synonyms is excluded or confirmed; and determining, from the candidate synonyms and based on the user input, the synonym group.

14. The method of claim 10, wherein the first subgraph indicates a first decoding path corresponding to the first keyword and a second decoding path corresponding to a synonym in the first synonym group, and wherein the first decoding path and the second decoding path have a same weight in the first subgraph.

15. The method of claim 10, wherein obtaining the target keyword comprises:

obtaining, based on a pre-stored historical keyword and a received keyword, a first keyword group;

determining that a quantity of keywords in the first keyword group exceeds a predetermined threshold; and obtaining, in response to determining that the quantity of keywords exceeds the predetermined threshold, from the first keyword group, and based on the predetermined threshold, the target keyword.

16. The method of claim 15, wherein obtaining the target keyword further comprises obtaining, further based on an attribute of a keyword in the target keyword, the target keyword, and wherein a quantity of target keywords is the predetermined threshold.

17. The method of claim 10, further comprising performing an action corresponding to the text representation.

18. The method of claim 10, wherein the text representation corresponds to the target keyword or a synonym in the synonym group.

19. The method of claim 10, wherein the second subgraph indicates a third decoding path corresponding to the second keyword and a fourth decoding path corresponding to a synonym in the second synonym group, and wherein the third decoding path and the fourth decoding path have a same weight in the second subgraph.

20. An electronic device, comprising:

a memory configured to store instructions; and a processor coupled to the memory and configured to execute the instructions to cause the electronic device to:

obtain a target keyword, wherein the target keyword comprises a first keyword and a second keyword;

obtain a synonym group semantically associated with the target keyword, wherein the synonym group comprises a first synonym group semantically associated with the first keyword and a second synonym group semantically associated with the second keyword, and wherein obtaining the synonym group comprises:

determining first semantics of the target keyword; and determining the synonym group based on the first semantics, wherein a first difference between second semantics of each synonym in the synonym group and the first semantics is less than a difference threshold, and wherein determining the synonym group comprises determining the synonym group further based on a first length of the target keyword, and wherein a second difference between a second length of each synonym in the synonym group and the first length is less than a length threshold;

train, based on the target keyword and the synonym group, a language model to obtain a target language model;

generate, based on the target language model, a first decoding graph indicating a plurality of decoding paths that satisfy a syntax constraint rule that is based on the target keyword and the synonym group; and determine, based on the first decoding graph, a speech recognition model, wherein determining the speech recognition model comprises:

obtaining, from the first decoding graph, a first group of decoding paths and a second group of decoding paths, wherein the first group comprises first decoding paths corresponding to the first keyword and the first synonym group, and wherein the second group comprises second decoding paths corresponding to the second keyword and the second synonym group;

generating, based on the first group, a first subgraph;

generating, based on the second group, a second subgraph; and determining, based on the first subgraph and the second subgraph, the speech recognition model.

* * * * *